(12) United States Patent
Kang et al.

(10) Patent No.: US 12,041,265 B2
(45) Date of Patent: Jul. 16, 2024

(54) IMAGE ENCODING/DECODING METHOD AND APPARATUS, AND RECORDING MEDIUM IN WHICH BITSTREAM IS STORED

(71) Applicants: Electronics and Telecommunications Research Institute, Daejeon (KR); UNIVERSITY-INDUSTRY COOPERATION GROUP OF KYUNG HEE UNIVERSITY, Yongin-si (KR)

(72) Inventors: Jung Won Kang, Daejeon (KR); Ha Hyun Lee, Seoul (KR); Sung Chang Lim, Daejeon (KR); Jin Ho Lee, Daejeon (KR); Hui Yong Kim, Daejeon (KR); Gwang Hoon Park, Seongnam-si (KR); Tae Hyun Kim, Hwaseong-si (KR); Dae Young Lee, Ansan-si (KR)

(73) Assignees: Electronics and Telecommunications Research Institute, Daejeon (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 17/260,938

(22) PCT Filed: Jul. 16, 2019

(86) PCT No.: PCT/KR2019/008785
§ 371 (c)(1),
(2) Date: Jan. 15, 2021

(87) PCT Pub. No.: WO2020/017873
PCT Pub. Date: Jan. 23, 2020

(65) Prior Publication Data
US 2021/0274215 A1    Sep. 2, 2021

(30) Foreign Application Priority Data

Jul. 16, 2018  (KR) ........................ 10-2018-0082119
Jul. 16, 2018  (KR) ........................ 10-2018-0082120
(Continued)

(51) Int. Cl.
*H04N 19/56*     (2014.01)
*H04N 19/105*    (2014.01)
(Continued)

(52) U.S. Cl.
CPC .......... *H04N 19/56* (2014.11); *H04N 19/105* (2014.11); *H04N 19/139* (2014.11); *H04N 19/176* (2014.11); *H04N 19/96* (2014.11)

(58) Field of Classification Search
CPC .. H04N 19/176; H04N 19/105; H04N 19/159; H04N 19/52; H04N 19/577;
(Continued)

(56) References Cited

U.S. PATENT DOCUMENTS 9,648,334 B2    5/2017  Zheng et al.
10,939,099 B2 *  3/2021  Park .................... H04N 19/176
(Continued)

FOREIGN PATENT DOCUMENTS

JP    2015233294 A    12/2015
KR    100772576 B1    11/2007
(Continued)

OTHER PUBLICATIONS

Li Zhang et al., CE4-related: History-based Motion Vector Prediction, Joint Video Experts Team (JVET) of ITU-T SG 16 WP 3 and ISO/IEC JTC 1/SC 29/WG 11, 11th Meeting, JVET-K0104-v4, Jul. 10-18, 2018, pp. 1-6, Ljubljana, SI.

*Primary Examiner* — Daniel Chang
(74) *Attorney, Agent, or Firm* — William Park & Associates Ltd.

(57) ABSTRACT

An image is decoded by deriving a first candidate list for the current block by using motion information of neighboring
(Continued)

blocks of the current block; deriving a second candidate list for the current block by using previously reconstructed motion information; deriving a third candidate list by using the first candidate list and the second candidate list; and deriving a prediction block for the current block by using the third candidate list.

20 Claims, 65 Drawing Sheets

(30) Foreign Application Priority Data

| Aug. 6, 2018 | (KR) | ........................ 10-2018-0091364 |
| Sep. 20, 2018 | (KR) | ........................ 10-2018-0112866 |
| Sep. 21, 2018 | (KR) | ........................ 10-2018-0114286 |

(51) Int. Cl.
  *H04N 19/139* (2014.01)
  *H04N 19/176* (2014.01)
  *H04N 19/96* (2014.01)

(58) Field of Classification Search
  CPC .. H04N 19/593; H04N 19/109; H04N 19/139; H04N 19/513; H04N 19/61
  See application file for complete search history.

(56) References Cited

U.S. PATENT DOCUMENTS

| 2009/0220005 | A1* | 9/2009 | Kim | ................ H04N 19/517 |
| | | | | 375/240.16 |
| 2010/0305947 | A1* | 12/2010 | Schwarz | ............ G10L 15/1815 |
| | | | | 704/E15.001 |
| 2012/0044995 | A1* | 2/2012 | Demos | ................ H04N 19/162 |
| | | | | 375/E7.125 |
| 2013/0031162 | A1* | 1/2013 | Willis | ..................... H04L 67/02 |
| | | | | 709/203 |
| 2013/0083853 | A1* | 4/2013 | Coban | .................... H04N 19/55 |
| | | | | 375/E7.243 |
| 2015/0271515 | A1* | 9/2015 | Pang | ...................... H04N 19/70 |
| | | | | 375/240.16 |
| 2015/0296197 | A1* | 10/2015 | Paark | ..................... H04N 19/52 |
| | | | | 382/154 |
| 2017/0054996 | A1* | 2/2017 | Xu | .......................... H04N 19/52 |
| 2017/0188044 | A1 | 6/2017 | Takehara et al. | |
| 2017/0318312 | A1 | 11/2017 | Segall | |
| 2018/0131958 | A1* | 5/2018 | Sugio | ..................... H04N 19/52 |
| 2018/0324454 | A1* | 11/2018 | Lin | ........................ H04N 19/91 |
| 2019/0052886 | A1* | 2/2019 | Chiang | ................ H04N 19/105 |
| 2019/0174136 | A1* | 6/2019 | Jun | ......................... H04N 19/13 |
| 2019/0297337 | A1* | 9/2019 | Ramasubramonian | ...................... |
| | | | | H04N 19/85 |
| 2019/0306512 | A1* | 10/2019 | Zhang | .................. H04N 19/184 |
| 2019/0313113 | A1* | 10/2019 | Lee | ....................... H04N 19/107 |
| 2019/0379901 | A1* | 12/2019 | Chiang | ................ H04N 19/105 |
| 2019/0394459 | A1* | 12/2019 | Ye | ........................ H04N 19/105 |
| 2020/0014948 | A1* | 1/2020 | Lai | ....................... H04N 19/139 |

FOREIGN PATENT DOCUMENTS

| KR | 1020090094595 A | 9/2009 | | |
| KR | 1020160148005 A | 12/2016 | | |
| RU | 2547240 C1 | 4/2015 | | |
| RU | 2632155 C1 | 10/2017 | | |
| WO | 0186962 A1 | 11/2001 | | |
| WO | 2013052244 A1 | 4/2013 | | |
| WO | 2015169200 A1 | 11/2015 | | |
| WO | WO-2017086738 A1 * | 5/2017 | ........... H04N 19/103 |

* cited by examiner (a) example of UPU including a plurality of pictures (b) example of UPU set in a unit of picture (c) example of setting UPU by performing quarter-partition on picture horizontally (d) example of setting UPU by performing quarter-partition on picture vertically (e) example of setting UPU by performing quarter-partition on picture (a) encoder to which candidate list applied (b) decoder to which candidate list applied (a): encoder using candidate list    (b): decoder using candidate list

FIG.17

| seq_parameter_set_rbsp( ) { | Descriptor |
|---|---|
| sps_seq_parameter_set_id | ue(v) |
| ... | |
| amvol_enable_flag | u(1) |
| if( amvol_enable_flag ) { | |
| upu_type_idx | ue(v) |
| if( upu_type_idx == UPU_TYPE_COSTOM ) { | |
| upu_width | ue(v) |
| upu_height | ue(v) |
| } | |
| } | |
| ... | |
| } | |

FIG.18

| pic_parameter_set_rbsp( ) { | Descriptor |
|---|---|
|   pps_pic_parameter_set_id | ue(v) |
|   pps_seq_parameter_set_id | ue(v) |
|   ... | |
|   amvol_enable_flag | u(1) |
|   if( amvol_enable_flag ) { | |
|     upu_type_idx | ue(v) |
|     if( upu_type_idx == UPU_TYPE_COSTOM ) { | |
|       upu_width | ue(v) |
|       upu_height | ue(v) |
|     } | |
|   } | |
|   ... | |
| } | |

FIG.19

| slice_header( ) { | Descriptor |
|---|---|
|   slice_pic_parameter_set_id | ue(v) |
|   slice_address | u(v) |
|   slice_type | ue(v) |
|   if( slice_type != I ) { | |
|     log2_diff_ctu_max_bt_size | ue(v) |
|     ... | |
|     amvol_enable_flag | u(1) |
|     if( amvol_enable_flag ) { | |
|       upu_type_idx | ue(v) |
|       if( upu_type_idx == UPU_TYPE_COSTOM ) { | |
|         upu_width | ue(v) |
|         upu_height | ue(v) |
|       } | |
|     } | |
|     ... | |
|   } | |
|   ... | |
| } | |

FIG.20

| coding_unit( x0, y0, cbWidth, cbHeight ) { | Descriptor |
|---|---|
|   if( slice_type != I ) { | |
|     pred_mode_flag | ae(v) |
|   } | |
|   if( CuPredMode[ x0 ][ y0 ] == MODE_INTRA ) { | |
|     ... | |
|   } else { | |
|     ... | |
|     cu_inter_pred_mode | ae(v) |
|     ... | |
|     if( amvol_enable_flag ) { | |
|       if( cu_inter_pred_mode == MODE_AMVOL ) { | |
|         amvol_idx | ae(v) |
|       } | |
|     } | |
|     ... | |
|   } | |
|   ... | |
| } | |

(a) encoder to which candidate list is applied (b) decoder to which candidate list is applied (a): encoder to which candidate list is applied (b): decoder to which candidate list is applied (a): encoder using candidate list          (b): decoder using candidate list (a): encoder using candidate list (b): decoder using candidate list (a): encoder to which candidate list is applied (b): decoder to which candidate list is applied (a): encoder using candidate list (b): decoder using candidate list (a): encoder using candidate list (b): decoder using candidate list (a): encoder using candidate list (b): decoder using candidate list (a) an example in which candidate of candidate list of each coding block is generated from common candidate list (b) an example in which candidate of common candidate list of each coding block is generated from common candidate list (a) Example of candidate list of the current frame consisting of a single UPU (b) Example of candidate list of the current frame consisting of plurality vertical-divided UPU Current Block Intra Mode : 7

MPM List = { 11, 8, 0 }

Current Block Intra Mode : 7

MPM List = { 11, 8, 0, 9, 17, 5 }

FIG.48

| 5 | 4 | 3 | 4 |
|---|---|---|---|
| 4 | 3 | 4 | 5 |
| 3 | 4 | 5 | 3 |
| 4 | 5 | 3 | 4 |

Intra mode : 0 1 2 3 4 5 6 ...
Count : | 0 | 0 | 0 | 5 | 7 | 4 | 0 | ...

count-based
optimal prediction mode list

Index : 0 1 2 3
Intra mode : | 4 | 3 | 5 | 0 |

| 35 | 34 | 8  | 37 |
|----|----|----|----|
| 33 | 9  | 10 | 35 |
| 11 |    |    |    |
|    |    |    |    |

Current Block

History Mode List

| 35 | 34 | 8 | 37 | 33 | 9 | 10 | 11 |

Cost List

| 35 | 24 | 2 | 27 | 23 | 1 | 0 | 1 | cost-based
optimal prediction mode list

| 8 | 9 | 10 | 11 |

FIG.51

Intra prediction list [ ] = { 0, 22 , 3, 11, 7 }

↓

Input intra mode : 3

↓

Intra prediction list [ ] = { 3, 0, 22 , 11, 7 }

FIG. 59

(a) example of configuration of single intra prediction mode list (b) example of configuration of multiple intra prediction mode lists for each regions (b) 4 directional (a) 2 directional (a) flowchart of method in encoder    (b) flowchart of method in decoder (a) example of referencing intra prediction mode list in MPM (b) another example of referencing intra prediction mode list in MPM (a) flowchart in encoder      (b) flowchart in decoder (a) example of configuring intra prediction mode list on the basis of count for each prediction mode (b) example of configuring intra prediction mode list on the basis of average of residual signals for each prediction mode (a) flowchart in encoder    (b) flowchart in decoder (a) flowchart in encoder  (b) flowchart in decoder Intra prediction list [ ] = { PLANAR_IDX, DC_IDX, VER_IDX, HOR_IDX , VER_IDX + offset, VER_IDX − offset, HOR_IDX + offset, HOR_IDX − offset, VER_IDX + offset2, VER_IDX − offset2, HOR_IDX + offset2, HOR_IDX − offset2,

| coding_unit( ) { | Descriptor |
|---|---|
| ... | ... |
| for( j = 0; j < nCbS; j = j + pbOffset ) | |
|   for( i = 0; i < nCbS; i = i + pbOffset ) | |
|     if( no_dim_flag[ x0 + i ][ y0 + j ] ) { | |
|       if( prev_intra_luma_pred_flag[ x0 + i ][ y0 + j ] ) | |
|         mpm_idx[ x0 + i ][ y0 + j ] | ae(v) |
|       else { | |
|         intra_mode_list_flag[ x0 + i ][ y0 + j ] | ae(v) |
|         if(intra_mode_list_flag[ x0 + i ][ y0 + j ]) | |
|           intra_mode_list_idx[ x0 + i ][ y0 + j ] | ae(v) |
|         else | |
|           rem_intra_luma_pred_mode[ x0 + i ][ y0 + j ] | ae(v) |
|       } | |
| ... | |

IMAGE ENCODING/DECODING METHOD AND APPARATUS, AND RECORDING MEDIUM IN WHICH BITSTREAM IS STORED

TECHNICAL FIELD

The present invention relates to a method and apparatus for encoding/decoding an image, and a recording medium storing a bitstream. More particularly, present invention relates to a method and apparatus for encoding/decoding an image, and a recording medium storing a bitstream on the basis of a candidate list and an intra prediction mode list.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency, etc. Image data may be effectively compressed by using such image compression technology, and may be transmitted or stored.

DISCLOSURE

Technical Problem

An object of the present invention is to provide a method and apparatus for encoding/decoding an image having an improved compression efficiency, and a recording medium storing a bitstream generated by the method and apparatus for encoding/decoding the image.

In addition, an object of the present invention is to provide a method and apparatus for encoding/decoding an image, and a recording medium storing a bitstream, which have an improved compression efficiency using a candidate list.

Another object of the present invention is to provide a method and apparatus for encoding/decoding an image, and a recording medium storing a bitstream, which have an improved compression efficiency using an intra prediction mode list.

Technical Solution

According to the present invention, image decoding method comprises deriving a first candidate list of a current block by using motion information of a neighboring block of the current block to derive a first candidate list for the current block, deriving a second candidate list for the current block by using previously reconstructed motion information, deriving a third candidate list by using the first candidate list and the second candidate list and generating a prediction block for the current block by using the third candidate list In the image decoding method, wherein the neighboring block includes at least one of a spatial neighboring block and a temporal neighboring block.

In the image decoding method, wherein the deriving of the second candidate list includes adding the previously reconstructed motion information to the second candidate list, wherein the previously reconstructed motion information is motion information of a coding block decoded immediately before decoding of the current block.

The image decoding method further comprises initializing the second candidate list, wherein the second candidate list is initialized on the basis of a boundary of a coding tree unit (CTU) row.

The image decoding method further comprises when the number of pieces of motion information included in the second candidate list is a predetermined value, deleting motion information included in the second candidate list first among the pieces of motion information included in the second candidate list.

In the image decoding method, wherein the previously reconstructed motion information is added in a next order of motion information included in the second candidate list last.

The image decoding method further comprises when same motion information as the previously reconstructed motion information is already included in the second candidate list, deleting the same motion information from the second candidate list.

In the image decoding method, wherein the previously reconstructed motion information is added in a next order of motion information included in the second candidate list last.

In the image decoding method, wherein a maximum number of pieces of motion information capable of being included in the second candidate list is predetermined.

The image decoding method further comprises deriving average motion information by calculating an average of a plurality of pieces of motion information included in the third candidate list and adding the average motion information to the third candidate list.

The image decoding method further comprises dividing the current block into a first region and a second region, wherein the generating of the prediction block for the current block includes generating prediction blocks for the first region and the second region using the third candidate list.

In the image decoding method, wherein the third candidate list is used to generate an intra block copy (IBC) prediction block for the current block.

According to the present invention, image encoding method comprises determining motion information of a current block, deriving a first candidate list for the current block by using motion information of a neighboring block of the current block, deriving a second candidate list for the current block by using previously encoded motion information and deriving a third candidate list by using the first candidate list and the second candidate list.

In the image encoding method, wherein the deriving of the second candidate list includes adding the previously encoded motion information to the second candidate list, wherein the previously encoded motion information is motion information of a coding block encoded immediately before encoding of the current block.

The image encoding method further comprises initializing the second candidate list, wherein the second candidate list is initialized on the basis of a boundary of a coding tree unit (CTU) row.

The image encoding method further comprises when the number of pieces of motion information included in the second candidate list is a predetermined value, deleting motion information included in the second candidate list first among the pieces of motion information included in the second candidate list.

The image encoding method further comprises when same motion information as the previously encoded motion information is already included in the second candidate list, deleting the same motion information from the second candidate list.

In the image encoding method, wherein the number of pieces of motion information capable of being included in the second candidate list is predetermined.

According to the present invention, a computer readable recording medium storing a bitstream that is received by an image decoding apparatus and used to reconstruct a current block included in a current picture, wherein the bitstream includes information about prediction of the current block, the information about the prediction is used to derive a first candidate list for the current block by using motion information of a neighboring block of the current block, the information about the prediction is used to derive a second candidate list for the current block by using previously reconstructed motion information and the first candidate list and the second candidate list are used to derive a third candidate list used to generate a prediction block for the current block.

Advantageous Effects

According to the present invention, it is possible to provide a method and apparatus for encoding/decoding an image having the improved compression efficiency, and a recording medium storing a bitstream generated by the method and apparatus for encoding/decoding the image.

In addition, according to the present invention, it is possible to provide a method and apparatus for encoding/decoding an image, and a recording medium storing a bitstream, which have an improved compression efficiency using a candidate list.

In addition, according to the present invention, it is possible to provide a method and apparatus for encoding/decoding an image, and a recording medium storing a bitstream, which have an improved compression efficiency using an intra prediction mode list.

DESCRIPTION OF DRAWINGS

FIGS. 17 to 20 are diagrams illustrating a syntax structure according to some embodiments of the present invention.

FIG. 48 is another diagram illustrating a method of configuring an intra prediction mode list, according to an embodiment of the present invention.

FIG. 49 illustrates a method illustrating a count-based intra prediction mode list according to an embodiment of the present invention.

FIG. 50 is a diagram illustrating a method of configuring a cost-based intra prediction mode list according to an embodiment of the present invention.

FIGS. 51 and 52 are diagrams illustrating a method of changing an index of an intra prediction mode list according to some embodiments of the present invention.

FIG. 59 is a diagram illustrating a method of configuring a plurality of intra prediction modes lists, according to an embodiment of the present invention.

FIG. 73 is a diagram illustrating intra prediction mode list syntax according to an embodiment of the present invention.

BEST MODE

Figure 1:
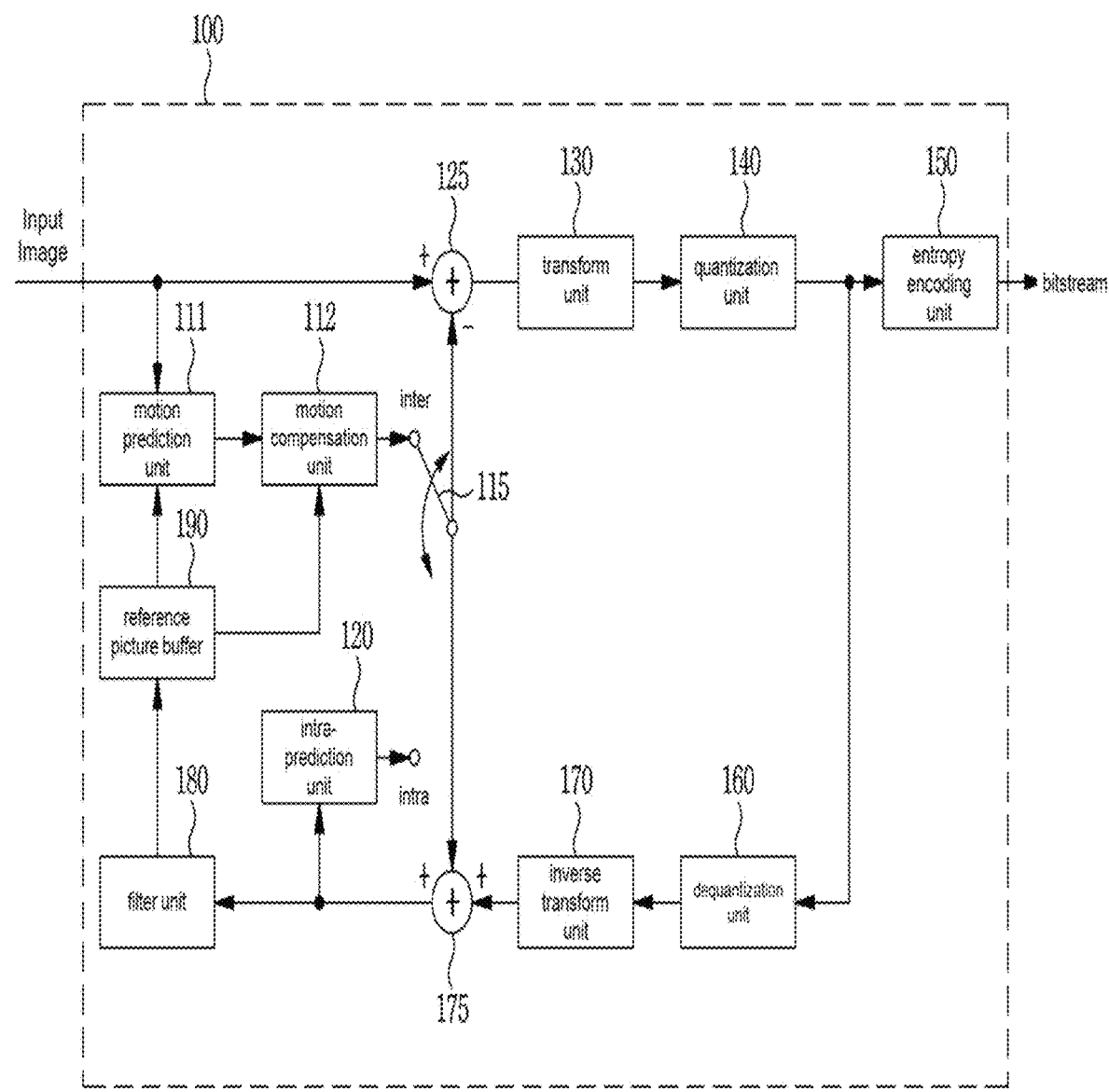
FIG. 1 is a view of a block diagram showing a configuration of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably. Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level(quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode(intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary(first) transform is used, information of whether or not a secondary transform is used, a primary transform index, a secondary transform index, information of whether or not a residual signal is present, a coded block pattern, a coded block flag(CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
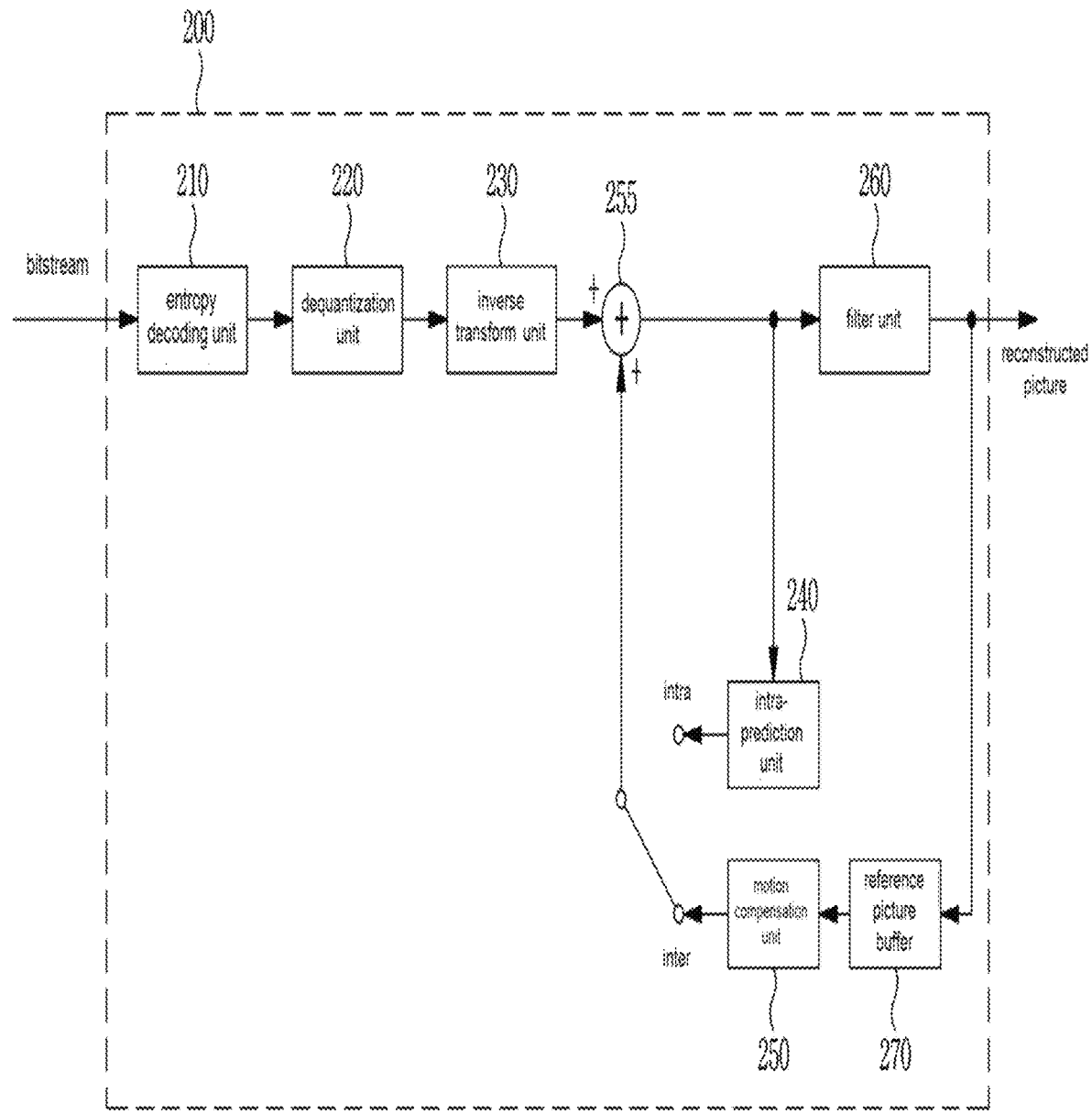
FIG. 2 is a view of a block diagram showing a configuration of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level(quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
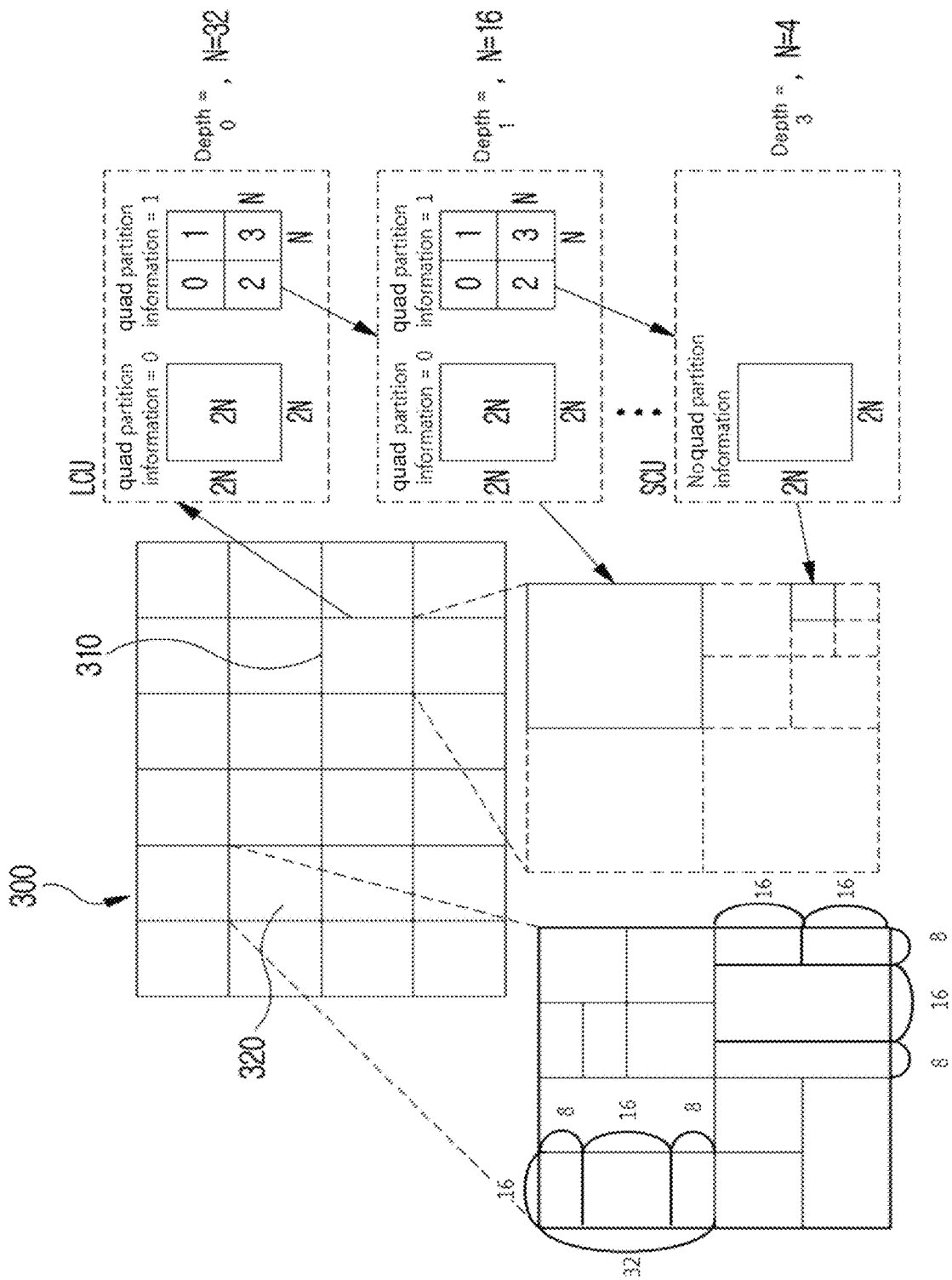
FIG. 3 is a view schematically showing a partition structure when encoding and decoding an image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N⇐64) Binary tree partitioning in horizontal direction for coding units

N×128 (N⇐64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
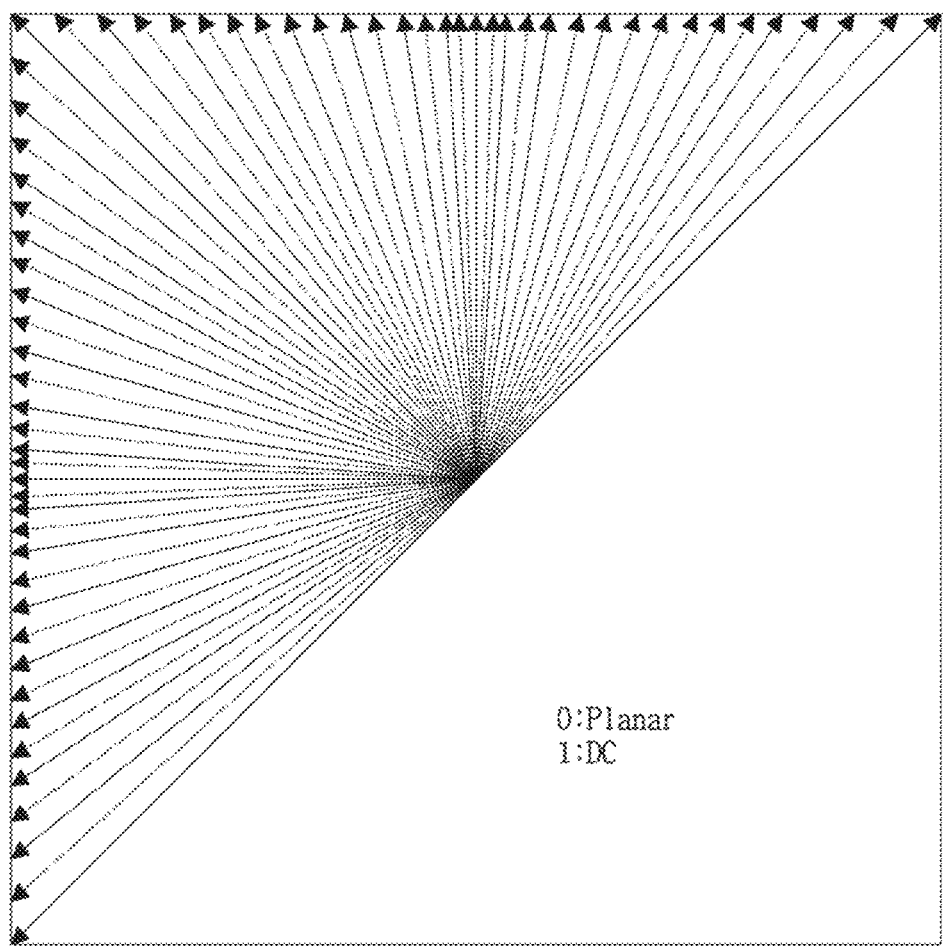
FIG. 4 is a view showing an example of intra-prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
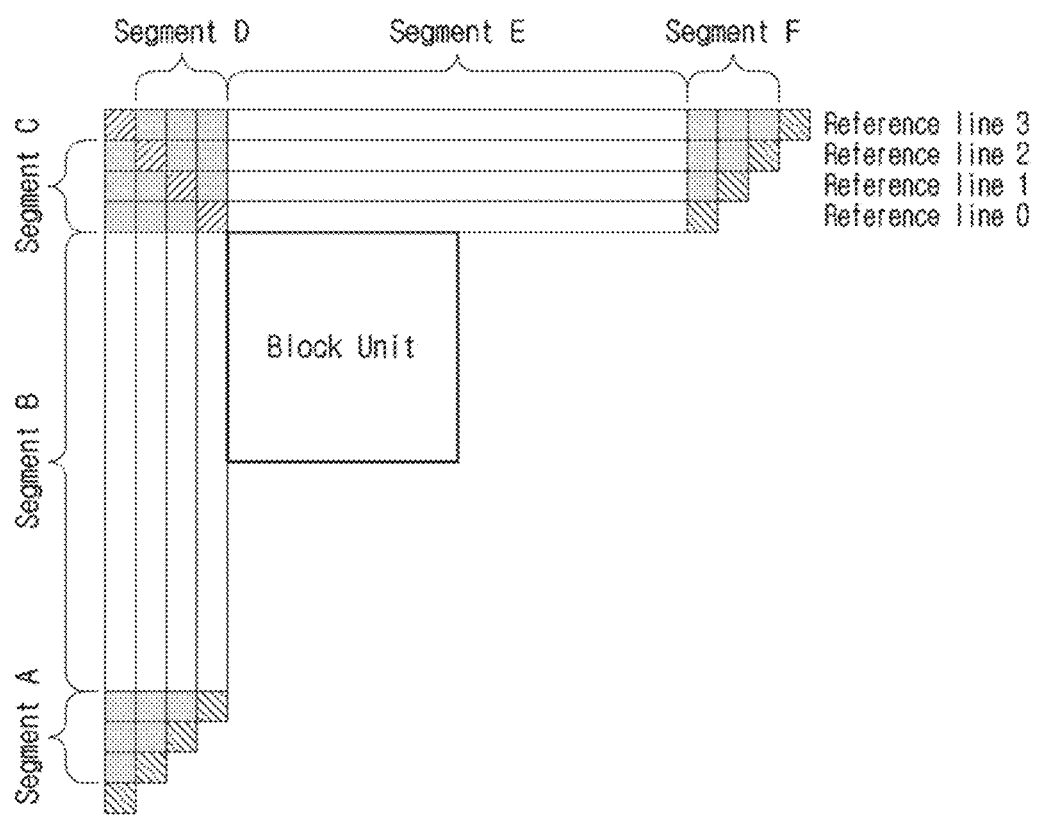
FIG. 7 is a view showing reference samples that are usable for intra-prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction is (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
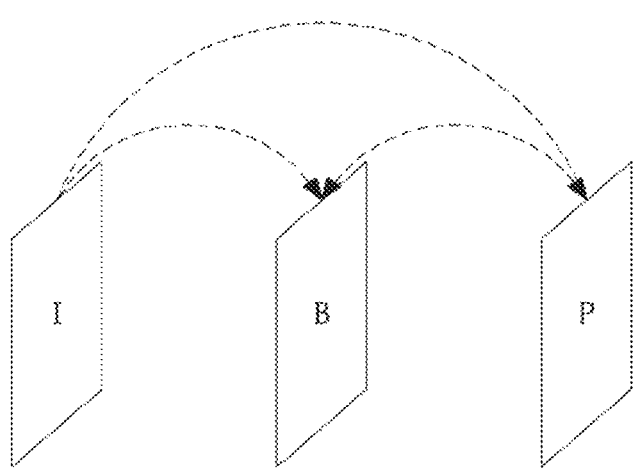
FIG. 5 is a view showing an example of inter-prediction.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information existing in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
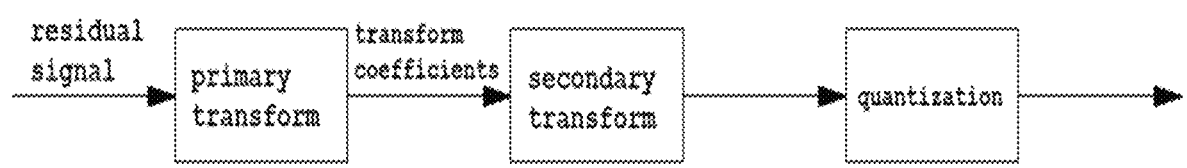
FIG. 6 is a view showing an example of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M⇐64, N⇐64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, an image encoding/decoding method according to the present invention will be described on the basis of the above description.

In the present invention, a method of generating a candidate list for performing motion prediction will be described. In the following embodiment, the candidate list may mean an adaptive motion vector occurrence list (AMVOL). As another example, in the following embodiment, the candidate list may mean a history based motion vector predictor (HMVP) list. The encoder or the decoder may perform motion prediction more accurately and efficiently by generating and utilizing a candidate list according to the present invention, thereby increasing encoding efficiency.

According to the present invention, when performing the motion prediction, the encoder or the decoder may perform the motion prediction using the motion information derived in a predetermined section or region.

Motion information may be stored and used in a unit having higher level than a unit in which motion information prediction is performed. An example of a unit in which motion prediction is performed includes a CU, a PU, a block, a macroblock, and the like. The unit having higher level than a unit in which motion information prediction is performed may be all units larger than a unit in which motion information prediction is performed. For example, the unit having higher level herein may include at least one of a block, a CTU, a brick, a tile, a slice, a subpicture, a picture, a frame, and a group of picture (GOP) composed of one or more CUs.

In the following embodiments, an upper unit larger than a unit in which motion information prediction is performed may be represented by an upper prediction unit (UPU). That is, in the following embodiments, the UPU may mean at least one of a block, a CTU, a brick, a tile, a slice, a subpicture, a picture, a frame, and a group of picture (GOP) composed of one or more CUs.

Figure 8:
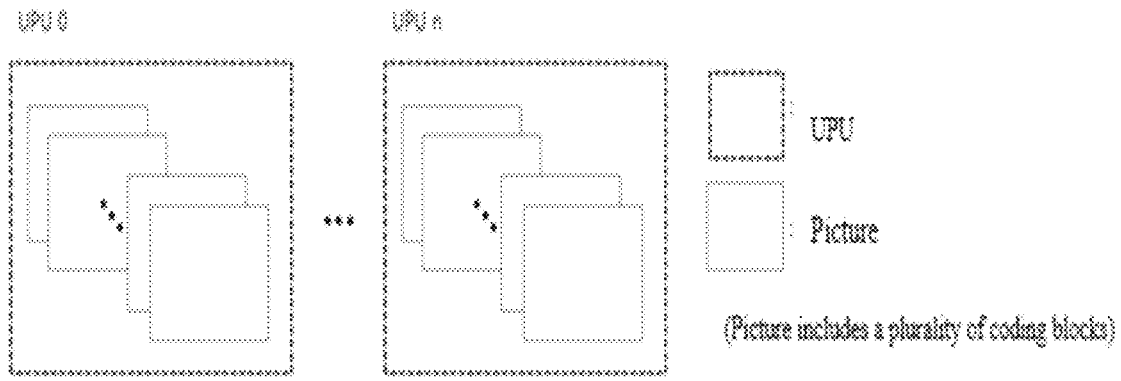
FIG. 8 is a diagram illustrating an upper prediction unit (UPU) used in some embodiments of the present invention.
Figure 8:
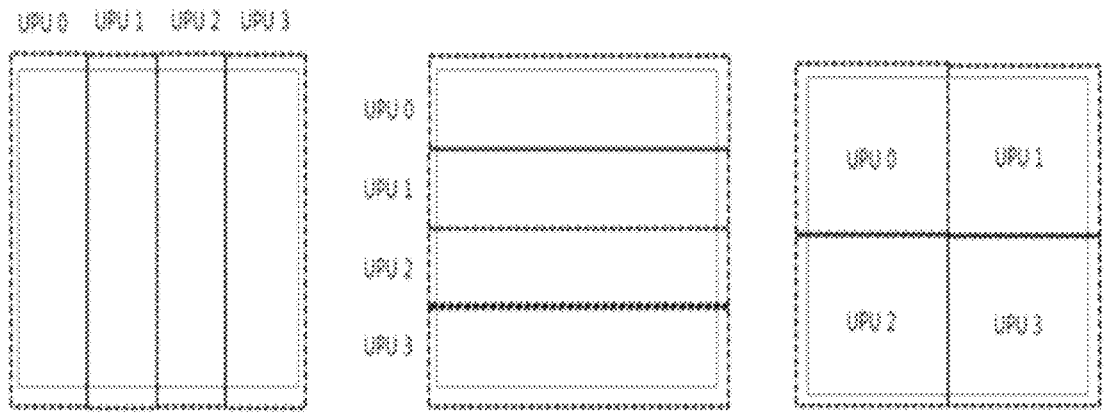

FIG. 8 is a diagram illustrating an upper prediction unit (UPU) used in some embodiments of the present invention.

In the present specification, a UPU may mean a set of units in which motion prediction is performed and a structure having one or more candidate lists. Hereinafter, a block belonging to a specific UPU may be expressed as a block having lower level than the corresponding UPU or a block included in the UPU. The candidate list for a specific UPU may be constructed using motion information generated from blocks having lower level than the UPU. The candidate list may be configured to store all or part of motion information generated from blocks having lower level than the UPU. The sizes or units of different UPUs may be the same or may be set differently.

Referring to FIG. 8, a UPU that may be used in some embodiments of the present invention is described. The picture in FIG. 8 includes a plurality of coding blocks.

FIG. 8(a) illustrates a case where a plurality of pictures belongs to one UPU. That is, FIG. 8(a) illustrates a case where the UPU is a GOP unit. In this case, the UPU may have a candidate list generated using motion information generated from pictures included in the UPU.

FIG. 8(b) illustrates a case where one picture belongs to one UPU. In this case, the UPU may have a candidate list generated by using motion information generated in each picture.

FIGS. 8(c) to 8(e) illustrate cases in which one picture includes a plurality of UPUs. That is, FIGS. 8(c) to 8(e) illustrate cases in which the UPU is a unit having lower level than a picture. For example, the UPU may be set by performing quarter-partition on the picture horizontally (FIG. 8(d)) or by performing quarter-partition on the picture vertically. As another example, the UPU may be set by performing n-partition on the picture.

Meanwhile, FIG. 8(d) may be an example in which the UPU is composed of CTUs forming one row. That is, the UPU may be set in a unit of row of the CTU. Herein, the UPU may have a candidate list generated by using motion information generated in each CTU row.

Although not shown in FIG. 8, the UPU may be set in a unit of CTU and may be set in a unit of slice, brick, and a plurality of CUs.

Hereinafter, the motion information included in the candidate list may include at least one of information required for motion prediction, such as a motion vector, a reference picture number (index, identifier, etc.), a reference picture list, a motion prediction direction, and the like.

A unit in which motion information generated in blocks included in the UPU is stored may be referred to as a candidate list. The motion information stored in the candidate list may be utilized when the encoder or the decoder operates in the inter prediction mode or the IBC mode. The candidate list may include additional information that may be used to utilize the candidate list in addition to the motion information. The additional information that may be included in the candidate list may include, for example, occurrence frequency information of motion information, position information where motion information occurs, and the like.

Figure 9:
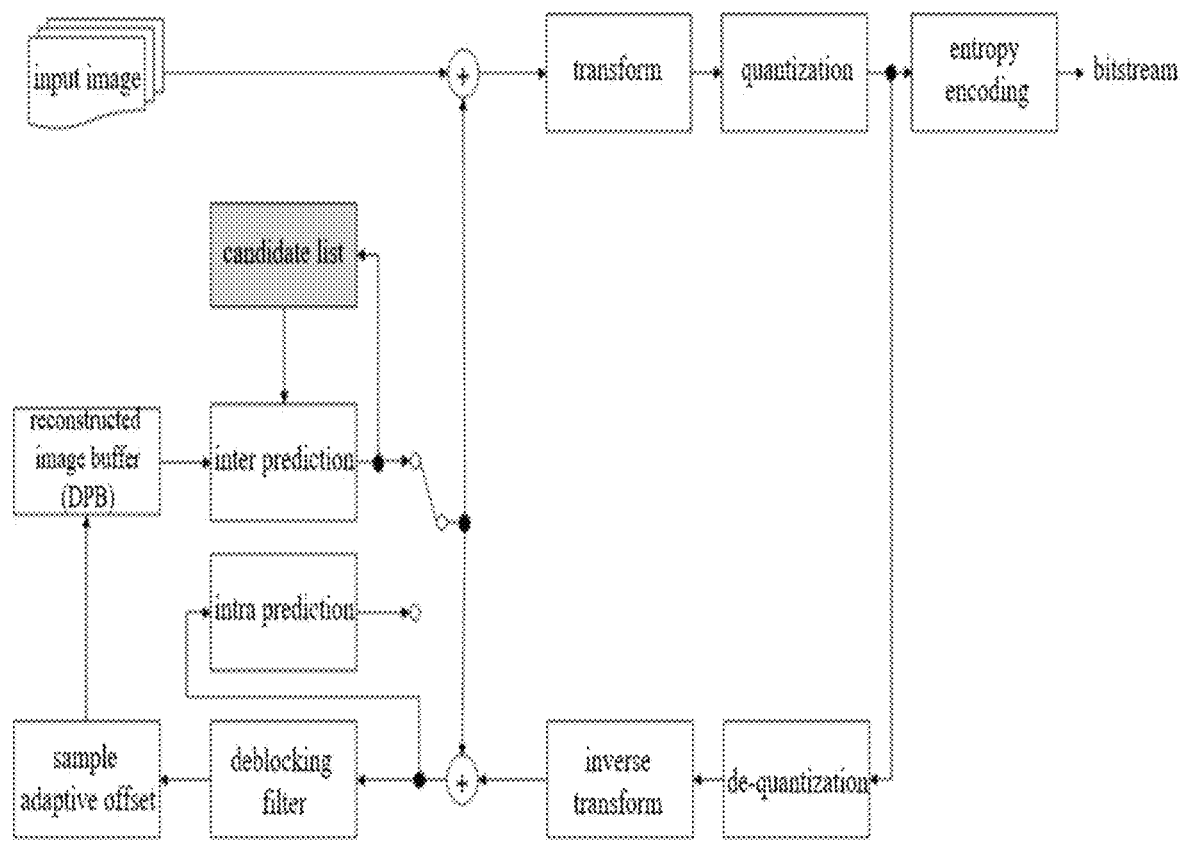
FIG. 9 is a diagram illustrating a structure of an encoder according to an embodiment of the present invention.

FIG. 9 is a diagram illustrating a structure of an encoder according to an embodiment of the present invention.

According to FIG. 9, motion information generated as a result of inter prediction may be added to a candidate list according to the present invention. As another example, although not shown in FIG. 9, motion information generated as a result of IBC prediction may be added to a candidate list according to the present invention. Subsequently, the candidate list may be used for inter prediction or IBC, thereby improving coding efficiency.

Figure 10:
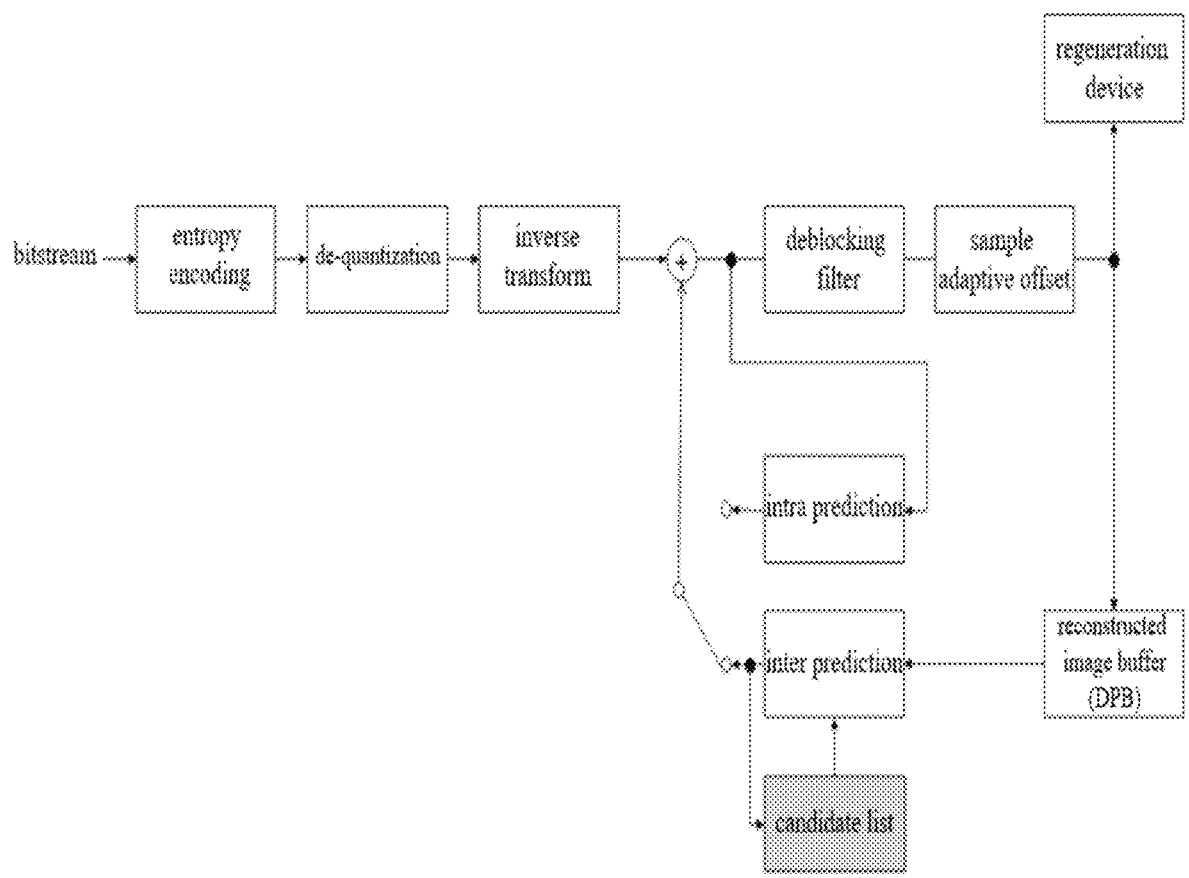
FIG. 10 is a diagram illustrating a structure of a decoder according to an embodiment of the present invention.

FIG. 10 is a diagram illustrating a structure of a decoder according to an embodiment of the present invention.

According to FIG. 10, motion information reconstructed through inter prediction may be added to a candidate list according to the present invention. As another example, although not shown in FIG. 10, motion information reconstructed through IBC prediction may be added to a candidate list according to the present invention. Subsequently, the candidate list may be used in inter prediction or IBC again to reconstruct motion information for the current block.

Figure 11:
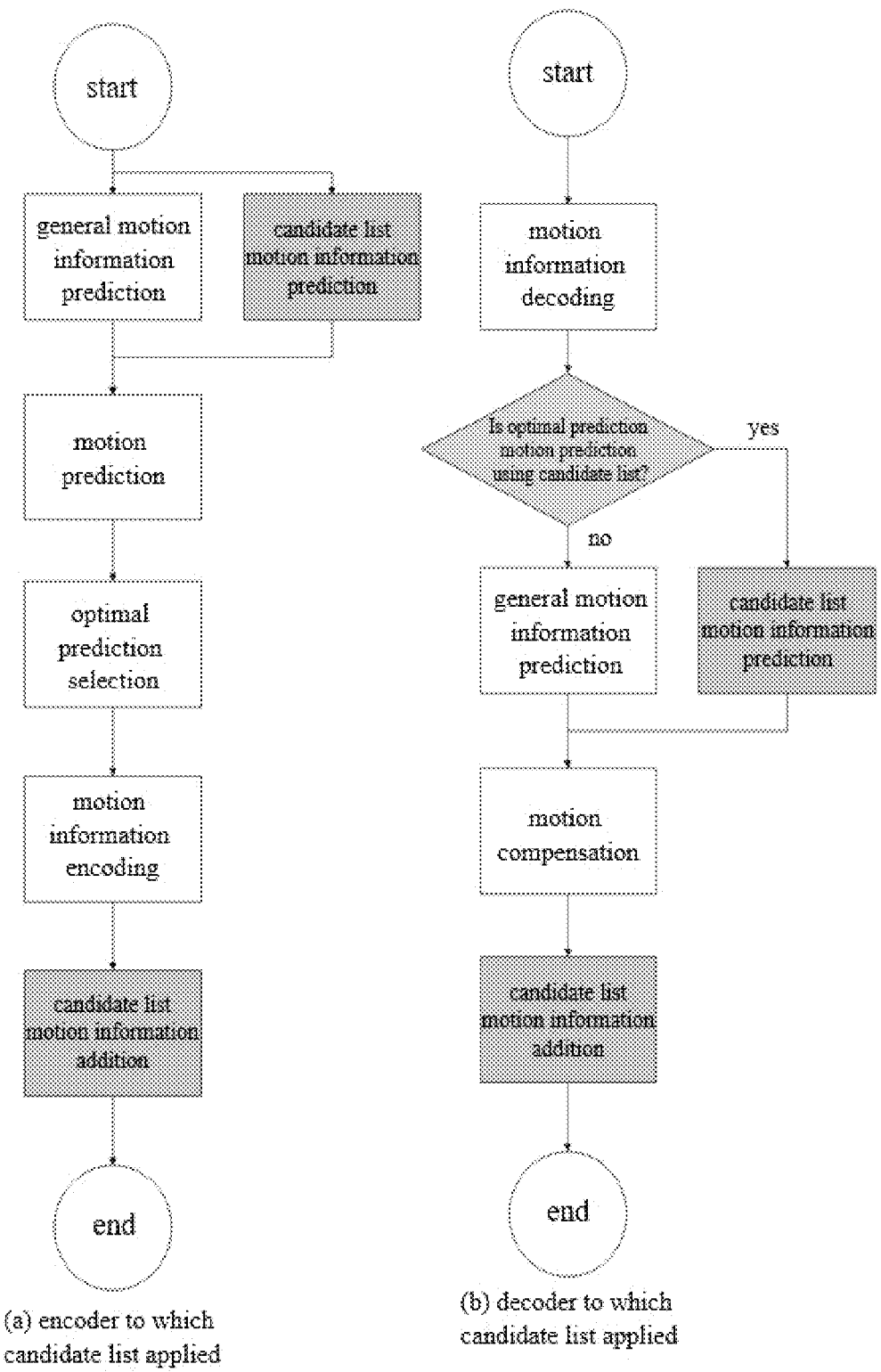
FIG. 11 is a flowchart illustrating a coding/decoding method according to an embodiment of the present invention.

FIG. 11 is a flowchart illustrating a coding/decoding method according to an embodiment of the present invention.

FIG. 11(*a*) shows an encoding method of an encoder to which the present invention is applied. General motion information prediction of an encoder may refer to a motion information prediction method performed by the encoder in the related art. The candidate list motion information prediction may mean motion information prediction using a candidate list according to the present invention. The motion prediction step means a step of predicting the motion of the current block, and the result of the motion information prediction may be utilized in this process. The optimal prediction selection may mean selecting prediction most optimal for encoding from among motion information prediction results derived from the general motion information prediction and motion information prediction results derived from the motion information prediction using the candidate list. The encoding of the motion information may mean a step of encoding method according to a result of the optimal prediction selection, additional information related thereto, and information related to motion information. The adding of the candidate list motion information may include adding previously generated motion information to the candidate list. The motion information added in the adding of the candidate list motion information may be used later in inter prediction of the encoder.

FIG. 11(*b*) shows a decoding method of a decoder to which the present invention is applied. The decoding of the motion information may be a step of decoding a signal encoded by the encoder. The decoded signal may include a decoding method of decoding the current block, additional information about the decoding method, and information related to the motion information. General motion information prediction may refer to a motion information prediction method performed in a conventional decoder. The candidate list motion information prediction may mean motion information prediction using a candidate list according to the present invention. There are multiple results of the general motion information prediction and the candidate list motion information prediction. The decoder may determine whether the optimal prediction is motion information prediction using a candidate list, thereby selecting a motion information prediction method to be used for decoding among a candidate list motion information prediction method and a general motion information prediction method. The motion information prediction method may be determined through information signaled by the encoder. The compensating of the motion may mean a step of decoding motion information of an actual block, and may mean a step of decoding motion information of a current block by using the decoded signal and the result of motion information prediction. The adding of the candidate list motion information may be a step of adding the finally decoded motion information to the candidate list. The motion information added in the adding of the candidate list motion information may be used later in inter prediction of the decoder.

Figure 12:
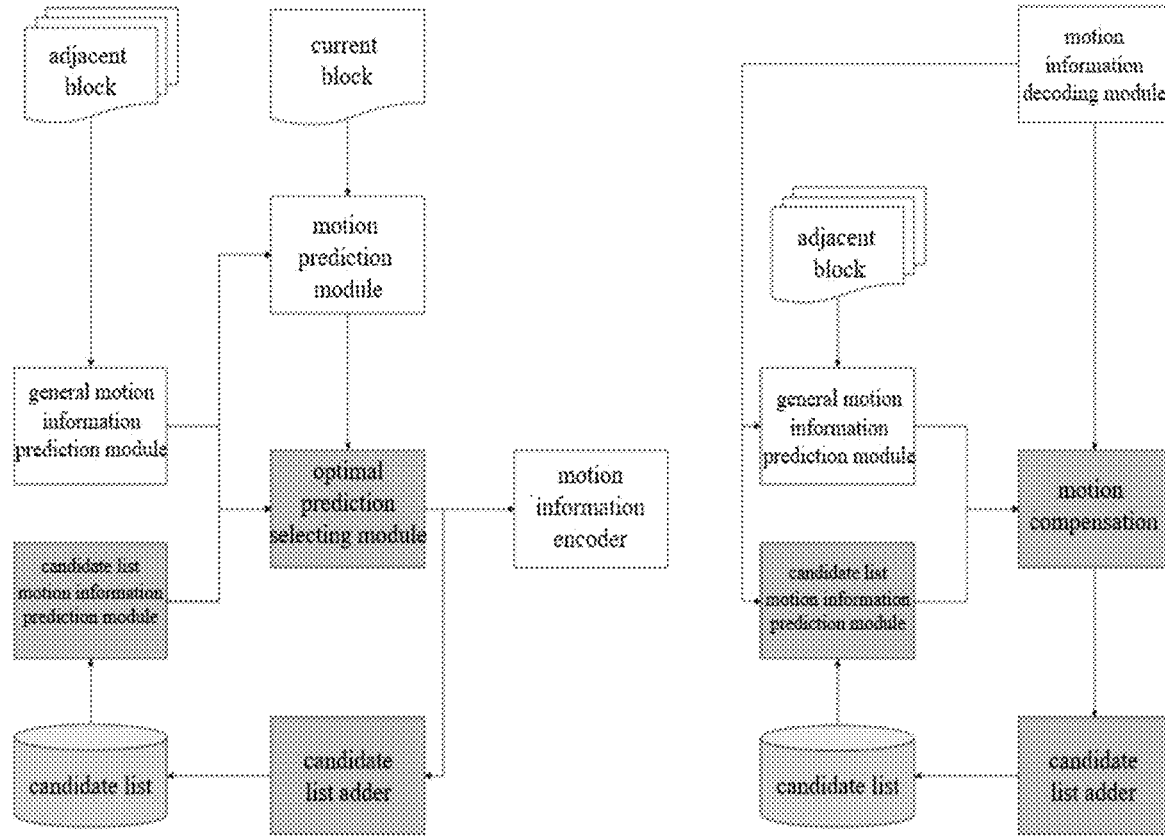
FIG. 12 is a diagram illustrating an encoder and decoder structure according to another embodiment of the present invention.

FIG. 12 is a diagram illustrating structures of an encoder and a decoder according to another embodiment of the present invention.

FIG. 12(*a*) shows a configuration of an encoder to which the present invention is applied. The general motion information prediction module may mean a motion information prediction module performed by the encoder. The candidate list motion information prediction module may refer to a configuration for performing motion information prediction using motion information stored in a candidate list according to the present invention. There are multiple motion information prediction results of the general motion information prediction module and the candidate list motion information prediction module. The motion prediction module refers to a configuration for predicting the motion of the current block, and in this process, the result of motion information prediction may be utilized. The optimum prediction selecting module may be configured to select prediction optimal for encoding of the current block among motion information prediction results derived from general motion information prediction and motion information prediction results derived from candidate list motion information prediction. The motion information encoding module may be configured to encode an encoding method according to a selection result of the optimum prediction selecting module, additional information related thereto, and information related to motion information. The candidate list adding module may be configured to add previously generated motion information to the candidate list. The motion information added by the candidate list adding module may be used later in inter prediction or IBC of the encoder.

FIG. 12(*b*) is a diagram showing an inter prediction apparatus of a decoder to which the present invention is applied. The motion information decoding module may be configured to decode a signal encoded by the encoder. The decoded signal may include a decoding method for decoding the current block, additional information about the decoding method, and information related to motion information. The general motion information prediction module may refer to a configuration that performs a motion information prediction method performed by a conventional decoder. The candidate list motion information prediction module may refer to a configuration for performing motion information prediction by using motion information stored in a candidate list. There are multiple results of the general motion information prediction and the candidate list motion information prediction. The motion compensator may decode the motion information of the current block by using the signal decoded by the motion information decoding module and the result of the motion information prediction. The candidate list adding module may be configured to add the finally decoded motion information to the candidate list. The motion information added by the candidate list adding module may be used later in inter prediction or IBC of the decoder.

When new motion information or a candidate is stored in the candidate list, the same motion information or candidate may not be stored in the candidate list. The encoder or the decoder may determine whether the motion information overlapping with the new motion information is included in the current candidate list. The encoder or the decoder may perform different operations according to whether they overlap.

Herein, the criterion for determining the same motion information may be related to whether all the information included in the motion information is the same, and whether some of them are the same. For example, considering that motion information consists of a motion vector and a reference picture number, when only the motion vector is compared and the motion vectors are the same, the encoder or decoder may determine that the motion information to be added is the same as the motion information included in the candidate list. In addition, the encoder or the decoder may determine that the motion information to be added is the same as the motion information included in the candidate list only when both the motion vector and the reference picture number are the same.

The motion information of the candidate list according to the present invention may determine the prediction potential of the motion information, and store and update the information representing the same. Herein, candidates of the candidate list may be arranged according to the prediction potential of the motion information. A method of determining the prediction potential of the candidate list will be described later.

The size of the candidate list according to the present invention may be limited. Here, the size of the candidate list may mean the maximum motion information or the number of candidates that may be stored in the candidate list. When the number of pieces of motion information stored in the candidate list reaches the maximum value, the encoder or decoder may add (store) or omit storing new motion information to the candidate list according to the following example.

The size of the candidate list may be limited by a preset value in the encoder or decoder. For example, the preset value may be a value between 1 and 6. As another example, the size of the candidate list may be limited by a value signaled from the encoder to the decoder. Information on values for limiting the size of the candidate list may be signaled at a higher level of a bitstream, such as a sequence parameter set, a picture parameter set, a slice header, a tile header, and a tile group header.

For example, when the number of pieces of motion information stored in the candidate list reaches the maximum value, newly derived motion information may be omitted without being stored in the candidate list.

As another example, when the number of pieces of motion information stored in the candidate list reaches a maximum value, the prediction potential of the newly derived motion information is compared with the prediction potential of the motion information stored in the existing candidate list, so that the motion information with high prediction potential is added to the candidate list, and the motion information with the lowest prediction potential may be removed from the candidate list. Herein, when the prediction potential of the newly derived motion information is lower than the prediction potential of the motion information stored in the existing candidate list, the newly derived motion information may be omitted without being stored in the candidate list.

As another example, when the number of pieces of motion information stored in the candidate list reaches a maximum value, the motion information stored first among the motion information stored in the candidate list is removed, and newly derived motion information may be added to the candidate list. That is, newly generated motion information may be added to the candidate list by a first in first out (FIFO) rule.

That is, when the number of pieces of motion information stored in the candidate list reaches the maximum value, the motion information indicated by candidate list index 0 may be removed, and newly derived motion information may be added to the candidate list. Herein, the index of the motion information included in the candidate list may be decreased by one. The newly added motion information may be added to the candidate list to be indicated by the largest index among the motion information included in the candidate list.

The process of adding motion information to the candidate list may be omitted.

For example, when the same motion information is already stored in the candidate list, newly derived motion information may not be added to the candidate list. As another example, when similar motion information is already stored in the candidate list, newly derived motion information may not be added to the candidate list. As another example, when the number of pieces of motion information stored in the candidate list has already reached the maximum, newly derived motion information may not be added to the candidate list. As another example, when the prediction potential of the motion information to be stored is low, newly derived motion information may not be added to the candidate list.

As another example, when motion information to be newly added has been already stored in the candidate list, pre-stored overlapping motion information may be removed from the candidate list, and newly derived motion information may be added to the candidate list. Herein, the indexes of the motion information of the candidate list having an index value larger than the removed motion information may be decreased by one. The newly added motion information may be added to the candidate list to be indicated by the largest index among the motion information included in the candidate list.

Here, that the motion information is similar may mean a case where a position difference of the reference region indicated by the motion information is equal to or less than a predefined threshold value. The motion vector may be expressed as a combination (dx, dy) of the x-axis displacement dx and the y-axis displacement dy. dx represents how far the reference region is separated from the position of the current block on the x-axis, and dy represents how far the reference region is separated from the position of the current block on the y-axis. For example, MV1 is (2, 3), MV2 is (3, 3), MV3 is (10, 5), and a predefined threshold value may be 3 on the x axis and 3 on the y axis. Herein, since MV1 and MV2 have a difference of 1 in the x-axis and 0 in the y-axis, all of which are less than or equal to a threshold value, MV1 and MV2 may be determined to have similar motion information to each other. Meanwhile, since MV1 and MV3 have a difference of 8 in the x-axis and 2 in the y-axis, which exceeds a threshold value in the x-axis, it is determined that MV1 and MV3 are not similar motion information.

The process of comparing the difference between the threshold value and the motion information pair, and the process of comparing the difference between the motion information pair and the difference between the other motion information pair may be referred to as similarity comparison of motion information. Herein, the similarity comparison may be performed on all information that the motion information has, and the similarity comparison may be performed only on some information of the motion information. For example, when the motion information is made up of information that shows the motion vector and the reference picture, the similarity comparison may be performed only for the motion vector, and the similarity comparison may be performed by comparing all information showing the motion vector and the reference picture.

The motion information stored in the candidate list may be used as a candidate for motion information prediction. That is, the motion information may be used as a candidate for all motion information prediction methods that predicts current motion information with reference to other motion information. For example, the motion information stored in the candidate list may be used as one of the motion information candidates when the encoder or the decoder operates in the merge mode, and the encoder or the decoder operates in the AMVP mode or the IBC mode.

When using motion information stored in a candidate list as a motion information prediction candidate, motion information used as a candidate may be defined as a candidate of a candidate list according to the present invention.

A candidate utilized for conventional motion information prediction and a candidate in a candidate list may be used simultaneously, and motion information prediction may be performed using only candidates of the candidate list.

For example, when a candidate of a candidate list is used together with a conventional motion information prediction candidate, candidates in the candidate list may be generated excluding motion information of a candidate list having a higher priority than a candidate of the candidate list or having the same motion information as a previously generated candidate. Here, the priority may mean a priority of motion information candidates referenced in inter prediction or IBC. As the priority of the motion information candidate is higher, the encoder may perform signaling by assigning a smaller bit amount to the candidate.

In addition, in configuring an AMVP or merge candidate list, when the size of an AMVP candidate or merge candidate list is limited, an AMVP or merge candidate list may be configured according to priority. For example, starting from the candidate with higher priority, it may be added to the AMVP or merge candidate list. When the candidate motion information is stored in the candidate list as much as the maximum size of the AMVP or the merge candidate list, the candidate with low priority is not added to the candidate list and may not be used for motion information prediction.

In addition, when the AMVP or merge candidate list is configured using motion information with high priority, the encoder or decoder may signal information indicating a specific candidate.

Figure 13:
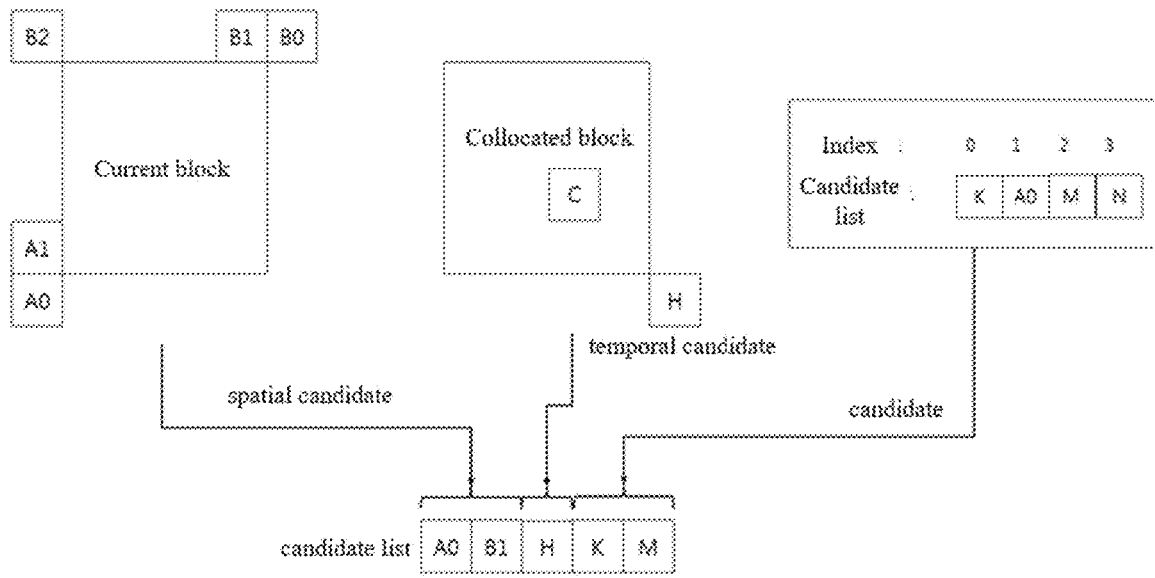
FIG. 13 is a diagram illustrating a candidate list according to an embodiment of the present invention.

FIG. 13 is a diagram illustrating a candidate list according to an embodiment of the present invention.

FIG. 13 illustrates a case where an embodiment of the present invention is applied to a merge mode and an AMVP mode.

In the merge candidate list, the priority may be set in order of a spatial candidate, a temporal candidate, a mixed list candidate, and a zero vector candidate. The spatial candidates may have priority in order of A1, B1, B0, A0, and B2. The temporal candidate may have a priority in order of H and C, and at least one candidate of two may be added to the merge candidate list. A mixed list candidate for bidirectional prediction may be generated by combining a spatial candidate and a temporal candidate added to the candidate list. The zero vector candidate may generate a candidate having a motion vector as a zero vector indicating that there is no motion.

Accordingly, the merge candidate may have priority in order of A1, B1 B0, A0, B2, H, or C, mixed list candidate, and zero vector candidate, and the candidates available in the order of high priority may be added to the merge candidate list. Herein, when candidates are added as much as the maximum size of the candidate list, no more candidates may be added to the candidate list.

Herein, candidates of the candidate list according to the present invention may be added to the merge candidate list. The candidates added to the merge candidate list may be positioned in any positions, such as front, rear, middle, etc. of candidates not using the candidate list according to the present invention, and a plurality of candidates may be added through different priorities. FIG. 13 illustrates a situation in which candidates of two candidate lists are added to the merge candidate list after the spatial candidate and the temporal candidate. The candidates in the candidate list may be added at various positions, such as in front of the spatial candidates, between the spatial candidates, in front of the temporal candidates, in rear of the temporal candidates, and also may be added at two or more positions. Herein, candidates of one or more candidate lists may be added to the merge candidate list.

The candidate list may be configured by applying various methods described herein using motion information of all blocks encoded before the current block. In addition, by subsampling the motion information of the blocks in the picture (e.g., selecting the motion information of the blocks including the M-th motion information or the position of the M-th pixel), or by subsampling the position of the pixel in the picture at regular intervals and selecting motion information of a block including a corresponding pixel position, various methods described herein are applied using the selected motion information, thereby configuring a candidate list.

Herein, the motion information of the first coded block in one picture is referred to as first motion information, and the motion information of the M-th coded block is referred to as M-th motion information. M may be a positive integer greater than zero.

Some or all of the motion information included in the candidate list configured as described above may be selected as candidates of the candidate list according to various methods included herein and then added to the merge candidate list. Alternatively, a candidate list for motion information prediction may be configured using only candidates of the candidate list according to the present invention, and an index (indicator) indicating a candidate required for decoding the corresponding block may be signaled.

In order to encode blocks included in a K-th CTU row to be currently encoded, motion information of blocks adjacent to a lower boundary of the K−1-th CTU row may be used as candidates in a merge and AMVP mode. For this purpose, motion information and position information of the corresponding blocks need to be stored in a buffer (hereinafter referred to as a line buffer) (K is any integer greater than 1).

For example, by using the candidates of the candidate list according to the present invention, not the corresponding motion information (information of the neighboring block located at the boundary of the CTU row), the encoder or decoder will not use the line buffer. In other words, when using motion information included in the K−1-th CTU row among blocks included in the K-th CTU row as a merge or AMVP candidate, the corresponding motion information is not used, and the candidate of the candidate list according to the present invention is used.

For example, candidates of the candidate list may store only motion information of blocks adjacent to the lower boundary of the K−1-th CTU row. In addition, only some of the motion information of blocks adjacent to the lower boundary of the K−1-th CTU row may be stored. For example, only motion information of a block including the position of the N-th pixel from the left of the picture may be included in the candidate list. Herein, N is an integer value of 4 or more, and may be 4, 8, 16, 32, 64, or 128.

In the AMVP mode, a priority may be given in order of a spatial candidate, a temporal candidate, and a zero vector candidate. One candidate may be selected in a region A and a region B as the spatial candidate. The region A may mean candidates A0 and A1, and has a priority in order of A0, A1, Scaled A0, and Scaled A1, and at least one candidate may be selected among them. Herein, the scaled candidate refers to a candidate generated by correcting the motion vector, when the reference picture of the spatial motion vector is different from the reference picture of the block currently being searched. The region B may mean a candidate B0, B1, or B2, and at least one candidate among B0, B1, B2, Scaled B0, Scaled B1, and Scaled B2 may be selected. The temporal candidate may have a priority order of H and C, and at least one of the two may be added to an AMVP candidate list. The zero vector candidate may generate a candidate having a motion vector as a zero vector indicating that there is no motion.

Therefore, the candidate may have a priority of the region candidate A, the region candidate B, H or C, zero vector candidate, and the available candidates may be added to the AMVP candidate list in the order of high priority. Herein, when candidates are added as much as the maximum size of the AMVP candidate list, no more candidates may be added to the candidate list.

Herein, the candidates of the candidate list according to the present invention may be added to the AMVP candidate list. The candidates of the candidate list according to the present invention added to the AMVP candidate list may positioned in any positions, such as before, after, and the middle, etc. of the candidate that does not use the candidate list according to the present invention, and the plurality of candidates may be added to the AMVP candidate list as priorities different from each other. FIG. 13 illustrates a situation in which candidates of two candidate lists are added to the AMVP candidate list after a spatial candidate and a temporal candidate. The candidates in the candidate list may be added at various positions, such as in front of the spatial candidates, between the spatial candidates, in front of the temporal candidates, behind the temporal candidates, and etc. or may be added at two or more positions. In addition, in candidates in one or more candidate lists may be added to the AMVP candidate list.

As another example, candidates of a candidate list according to the present invention may be added to a candidate list for IBC prediction. The candidates of the candidate list added to the IBC candidate list according to the present invention may be positioned at any positions, such as before, after, the middle, etc. of the candidates that do not use the candidate list according to the present invention, and the plurality of candidates have different priorities, and may be added to the IBC candidate list. In addition, candidates of one or more candidate lists may be added to the IBC candidate list.

Figure 14:
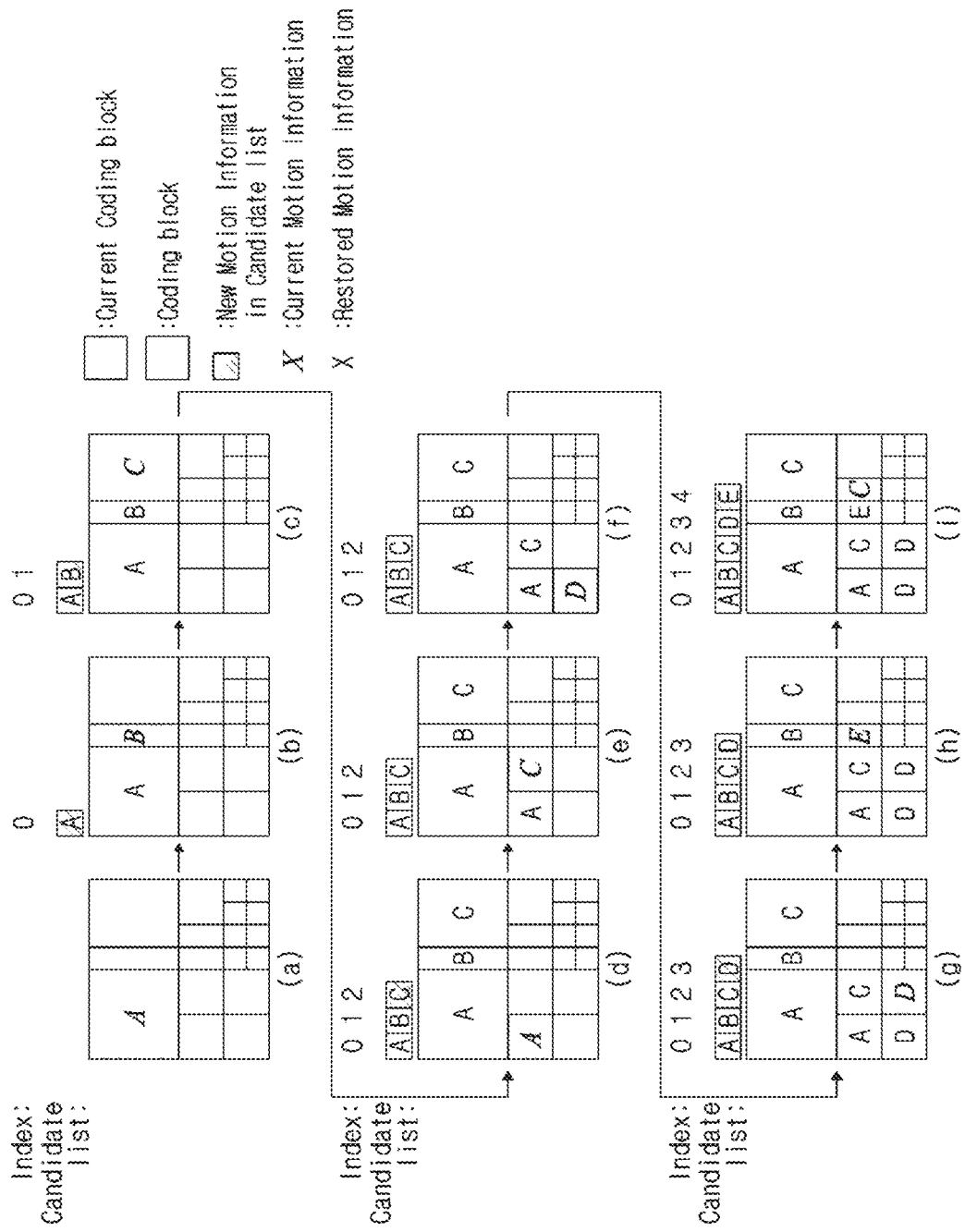
FIG. 14 is a diagram illustrating a method of adding motion information to a candidate list according to one embodiment of the present invention.

FIG. 14 is a diagram illustrating a method of adding motion information to a candidate list according to one embodiment of the present invention.

FIG. 14 shows a process in which motion information generated as a prediction is added to a candidate list. In FIG. 14, (a), (b), (c), (d), (e), (f), (g), (h), and (i) mean the temporal order of the encoding/decoding process, encoding/decoding proceeds in the direction of the arrow between the steps. Each rectangular region may mean a coding unit or a prediction unit, and may mean a unit in which prediction is performed so that motion information is generated. The gray coding block may refer to a current block in which encoding/decoding is in progress at the current time point in each drawing. In FIG. 14, the entire region means a UPU, and the UPU may consist of a set of coding blocks. The candidate list for each stage is shown at the top, and each column of the candidate list may mean stored motion information. Herein, the number shown on the candidate list may indicate an index value of the candidate list. The colored information among the motion information stored in the candidate list may mean newly added motion information at the corresponding step. The capitalized alphabet written in the coding block and the candidate list may mean motion information of the corresponding coding block, and different alphabets may mean different motion information. The blurred motion information refers to the pre-reconstructed motion information, and the motion information displayed in dark color may mean newly generated motion information in the current coding block.

In FIG. 14, step (a) shows a process in which the first coded block among the coding blocks included in the UPU is decoded. Since there is no motion information pre-constructed yet, there is no motion information stored in the candidate list. In step (b), the motion information A reconstructed in step (a) is added to the candidate list. Therefore, in predicting motion information of a current coding block, the motion information A stored in a candidate list may be referenced.

Then, as the step progresses, the motion information reconstructed in the previous step may be added to the candidate list in turn. Herein, motion information overlapping with motion information already present in the candidate list may not be newly added to the candidate list. For example, motion information generated in step (d) is already included in the candidate list as A and thus not added. Therefore, in step (e), newly added motion information may not exist in the candidate list. Similarly, the motion information generated in step (e) is already included in the candidate list as C and thus not added. Therefore, newly added motion information in the candidate list may not exist in step (f).

As another example, even if motion information already exists in the candidate list, such as motion information generated in steps (d) and (e), motion information may be sequentially added to the candidate list. In this case, the candidate list in step (e) may be A, B, C, A, and C sequentially from index 0.

Figure 15:
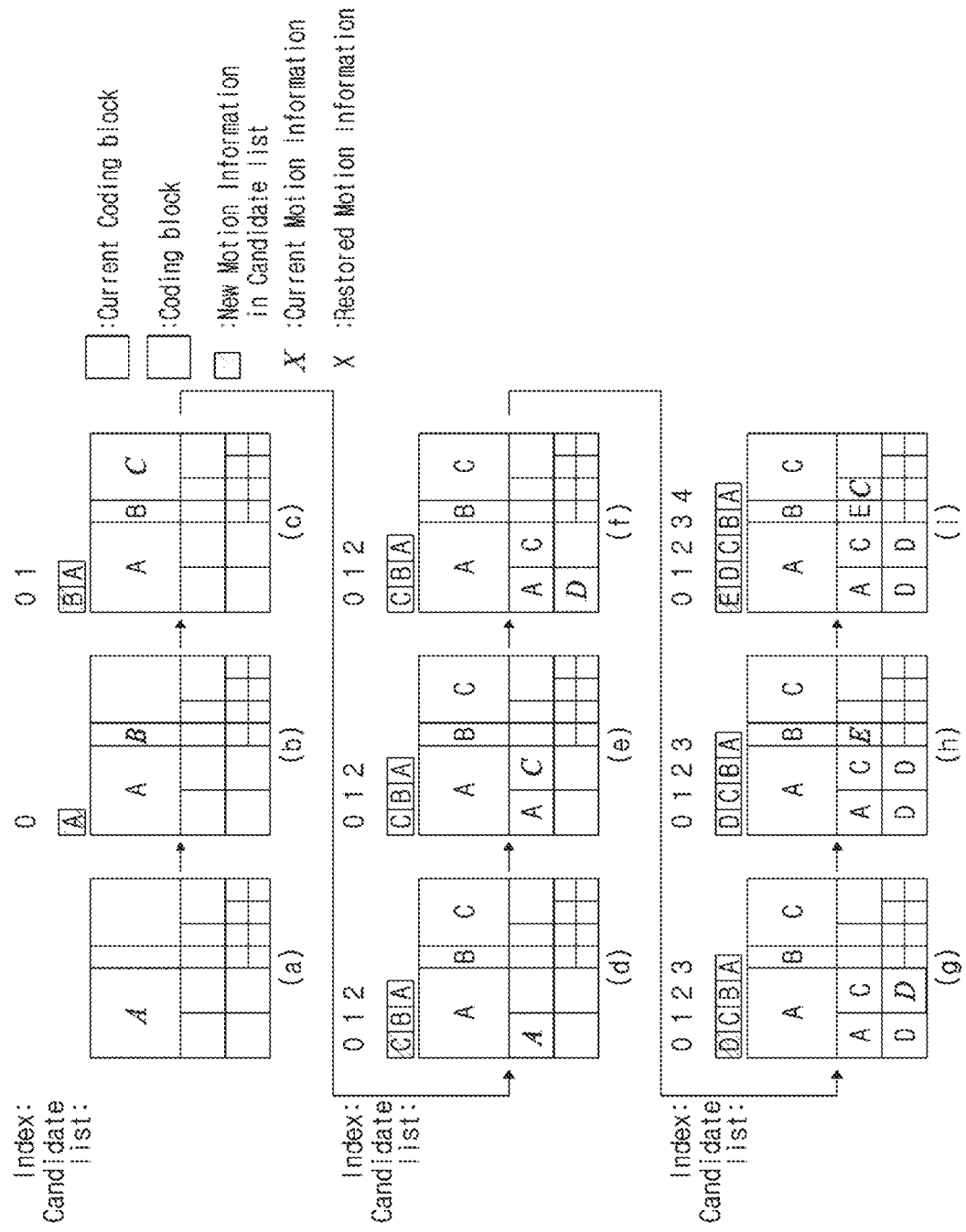
FIG. 15 is another diagram illustrating a method of adding motion information to a candidate list according to one embodiment of the present invention.

FIG. 15 is another drawing illustrating a method in which motion information is added to a candidate list according to the present invention.

FIG. 15 shows another example in which motion information is added to a candidate list. According to FIG. 15, motion information may be generated in the same manner as in FIG. 14, and motion information may be added to a candidate list at the same time. However, FIG. 15 illustrates a method of adding motion information to a candidate list through a method different from that of FIG. 14.

In FIG. 14, motion information is added to the last index position of the candidate list, but in the example of FIG. 15, newly derived motion information may be added to the index 0 position of the candidate list. In addition, the motion information stored in the candidate list existing at the index 0 position may change the order in the candidate list by adding one to index when new motion information is added. In other words, by changing the order of the candidate list, the order or priority of referencing the candidate list in motion prediction may be changed.

Figure 16:
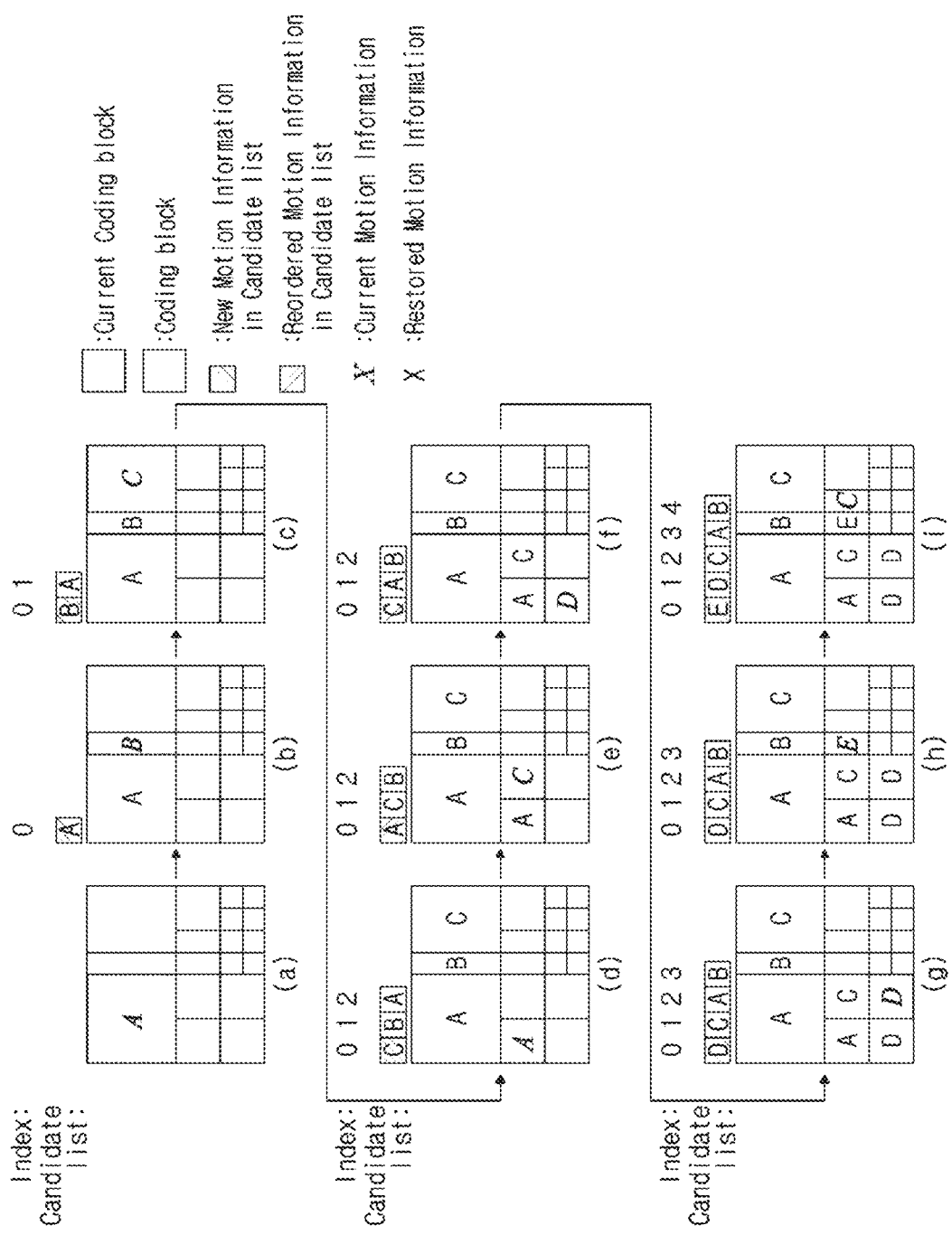
FIG. 16 is a diagram illustrating a method of adding motion information to a candidate list according to one embodiment of the present invention.

FIG. 16 is another diagram illustrating a method of adding motion information to a candidate list according to one embodiment of the present invention.

FIG. 16 illustrates a method of reconfiguring the motion information order of a candidate list when the same motion information as the newly input motion information exists among the previously input motion information in the method of FIG. 15. The motion information A generated in step (d) is the same motion information as the motion information added to the candidate list in step (b). Therefore, in FIG. 16, in step (e), motion information A may not be added to the candidate list. In step (e) of FIG. 16, the order in the candidate list of motion information A may be changed to Index 0. Alternatively, the existing motion information A may be deleted and motion information A may be newly added at the index 0 position. The index of other previously input motion information is obtained by adding one, and the order and index between candidates may be changed.

This may be a method of changing the priority with new input information when the same motion information newly occurs upon considering the priority according to the order in which the motion information is input. Herein, it may be confirmed in step (f) that when the order (index) of the motion information in the candidate list is later than the overlapping motion information (when the index is larger), the order is not changed. That is, in the example of FIG. 16, when overlapping motion information C occurs, when the order of C is changed to Index 0, the index of A, which is lower than that of C, becomes +1, whereas the index of B, which is higher than that of C, may not be changed.

Meanwhile, at least one of an indicator (flag, index) indicating whether to use the candidate list according to the present invention, a type of UPU applied, a size of the UPU may be signaled through at least one of parameter set such as a sequence parameter set or a picture parameter set, or slice header.

FIGS. 17 to 20 are diagrams illustrating a syntax structure according to some embodiments of the present invention.

In the following, the syntax presented is one example, and the scope of the present invention is not limited by the following syntax expression. Syntax having the same meaning or function as syntax for a candidate list according to the present invention may be included in the scope of the present invention.

FIG. 17 shows an example in which candidate list enable signaling is included in a sequence parameter set (SPS) syntax. FIG. 18 illustrates an example in which candidate list enable signaling is included in a picture parameter set (PPS) syntax.

The candidate list enable signal may mean a signal indicating whether the candidate list according to the present invention is used in encoding/decoding. In tables of FIGS. 17 and 18, amvol_enable_flag may be a candidate list enable signal indicating whether a candidate list is used in encoding/decoding. When amvol_enable_flag is true, encoding and decoding using a candidate list may be performed.

upu_type_idx may be a signal signaled when encoding and decoding using a candidate list are performed. upu_type_idx is a signal that determines a type of the UPU, and may be a signal that determines a unit to which the UPU is applied. Herein, the unit to which the UPU is applied may be at least one of a block, a CTU, a brick, a tile, a slice, a subpicture, a picture, a frame, and a group Of picture (GOP) composed of one or more CUs, and the UPU may have region that is the same as that of the determined unit.

Herein, encoding may be performed by designating a unit to which the UPU is applied in advance and assigning a specific value thereto. UPU_TYPE_COSTOM may be a syntax indicating that a unit of the UPU is not a predetermined unit among units to which the UPU is applicable. When the unit to which the UPU is applied is UPU_TYPE_COSTOM, additional signaling for setting a range of the UPU may be performed. For example, upu_width and upu_height signals of FIGS. 17 and 18 may be syntax for signaling the size, to which the UPU is applied, in width and height.

upu_type_idx may be omitted when the UPU forms a candidate list with a fixed size or a type of UPU may be derived from another signal. When the UPU is applied only in a unit or size specified in advance, signaling of syntax for setting the UPU_TYPE_COSTOM and the range of the UPU may be omitted.

FIG. 19 illustrates a case in which candidate list enable signaling is included in a slice header syntax. amvol_enable_flag may be a signal indicating whether a candidate list according to the present invention is used for encoding/decoding. When amvol_enable_flag is true, encoding and decoding may be performed using a candidate list according to the present invention.

Upu_type_idx may be a signal that may be transmitted and received when encoding and decoding using a candidate list is performed. upu_type_idx is a signal that determines a type of the UPU, and may be a signal that determines a unit to which the UPU is applied. Herein, the unit to which the UPU is applied may be at least one of a block, a CTU, a brick, a tile, a slice, a subpicture, a picture, a frame, and a group of picture (GOP) composing of one or more CUs, and the UPU may have a region that is the same as that of the determined unit.

Herein, encoding may be performed by designating a unit to which the UPU is applied in advance and assigning a specific value thereto. UPU_TYPE_COSTOM may be a syntax indicating that a unit of the UPU is not a predetermined unit among units to which the UPU is applicable. When the unit to which the UPU is applied is UPU_TYPE_COSTOM, additional signaling for setting the range of the UPU may be performed. For example, upu_width and upu_height signals of FIGS. 17 and 18 may be syntax for signaling the size, to which the UPU is applied, in width and height.

upu_type_idx may be omitted when the UPU forms a candidate list with a fixed size or a type of UPU may be derived from another signal. When the UPU is applied only in a unit or size specified in advance, signaling of syntax for setting the UPU_TYPE_COSTOM and the range of the UPU may be omitted.

Herein, all signaling regarding the candidate list may be omitted when a type of the slice is a specific type. For example, all signaling related to the candidate list may be omitted when a type of the current slice is I-slice. Since the candidate list is an encoding and decoding method used for motion prediction, signaling may be omitted in the case of an I-slice that does not perform motion prediction.

FIG. 20 shows an example when a candidate list index is included in coding unit syntax. The candidate list index signal according to the present invention may be syntax indicating which candidate motion information of candidates of the candidate list is used for motion information prediction when motion information prediction using the candidate list is used.

As an example, the candidate list index signal may be used in combination with a merge mode, an AMVP mode, an IBC mode, etc., and may be used together with other signals without any separate signaling. Alternatively, signaling may be omitted using previously designated candidate motion information. As another example, the candidate list index signal may be omitted when the current coding block is not in the inter prediction mode.

In FIG. 20, cu_inter_pred mode may be a signal indicating which encoding method the current block is encoded/decoded when the current CU is in an Inter mode. When cu_inter_pred mode indicates an encoding/decoding method using a candidate list according to the present invention, a candidate list index signal may be signaled. As another example, signaling of cu_inter_pred mode may be omitted and a coding/decoding method of the current coding block may be selected by a predetermined method. The encoding/decoding method of the current coding block is selected by a predetermined method, and when the predetermined encoding/decoding method is an encoding/decoding method using the candidate list according to the present invention, a candidate list index signal may be signaled.

As an example, MODE AMVOL may be syntax indicating an encoding/decoding method using a candidate list according to the present invention. amvol_idx may indicate a candidate list index. Through the signaled amvol_idx, it may be determined which motion information among the motion information stored in the candidate list is used as a candidate for motion prediction.

Hereinafter, a method of approximating motion information included in a candidate list according to the present invention will be described.

Motion information stored in the candidate list according to the present invention may be similar to each other. When similar motion information exists in a large number of candidate lists, a problem may occur that characteristics of motion information that is a candidate are biased so that the efficiency of motion information prediction is lowered. Herein, the aforementioned problem may be solved by converting and using similar candidates into one approximated motion information.

A time point when the approximated motion information is generated is one of a time point when motion information is stored in the candidate list according to the present invention, a time point when the candidate of the candidate list is generated from the candidate list, and a time point when the motion information stored in the candidate list for each period is approximated.

Figure 21:
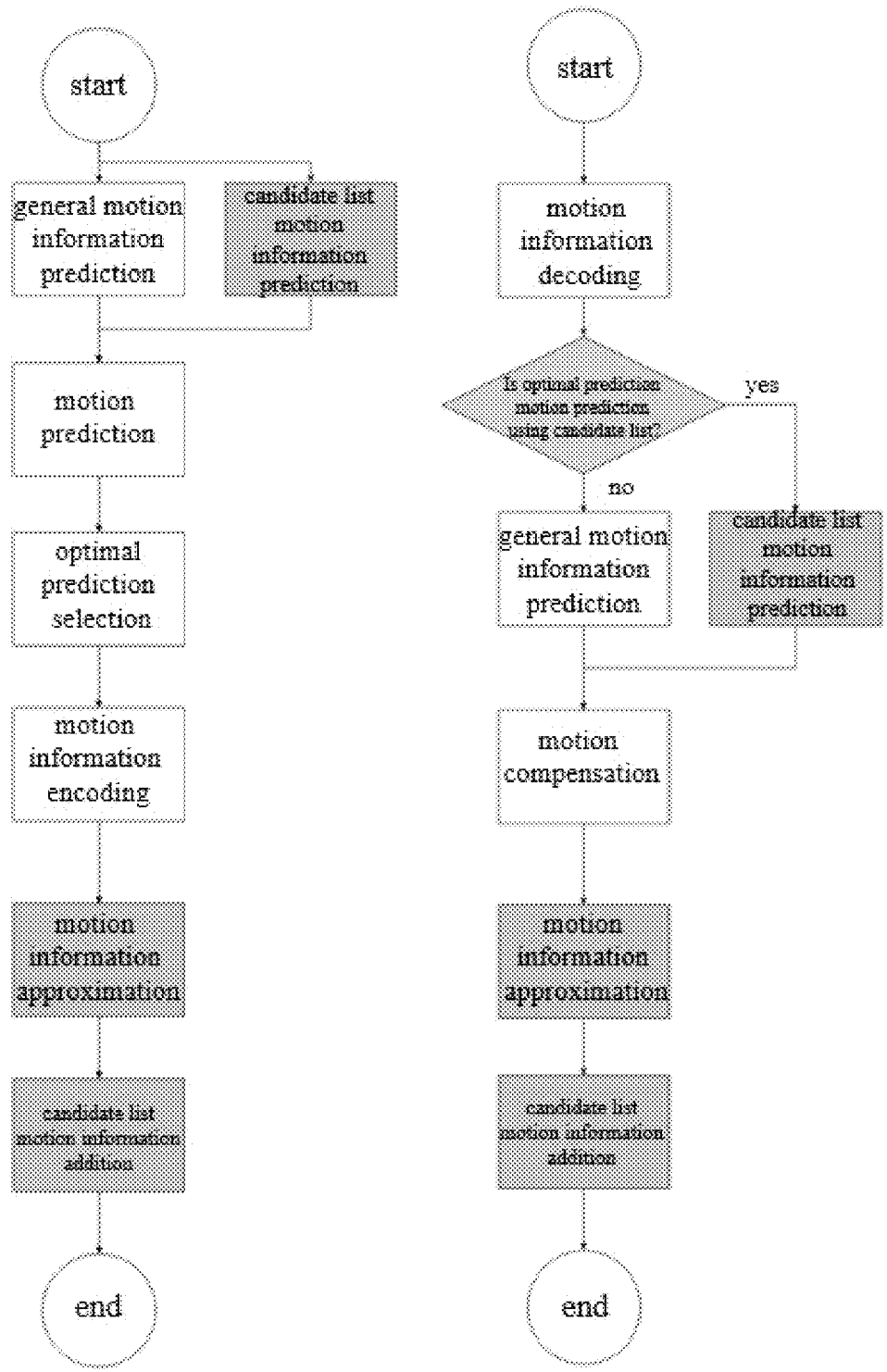
FIGS. 21 and 22 are diagrams illustrating flowcharts of an encoder and a decoder for approximating motion information according to some embodiments of the present invention.
Figure 22:
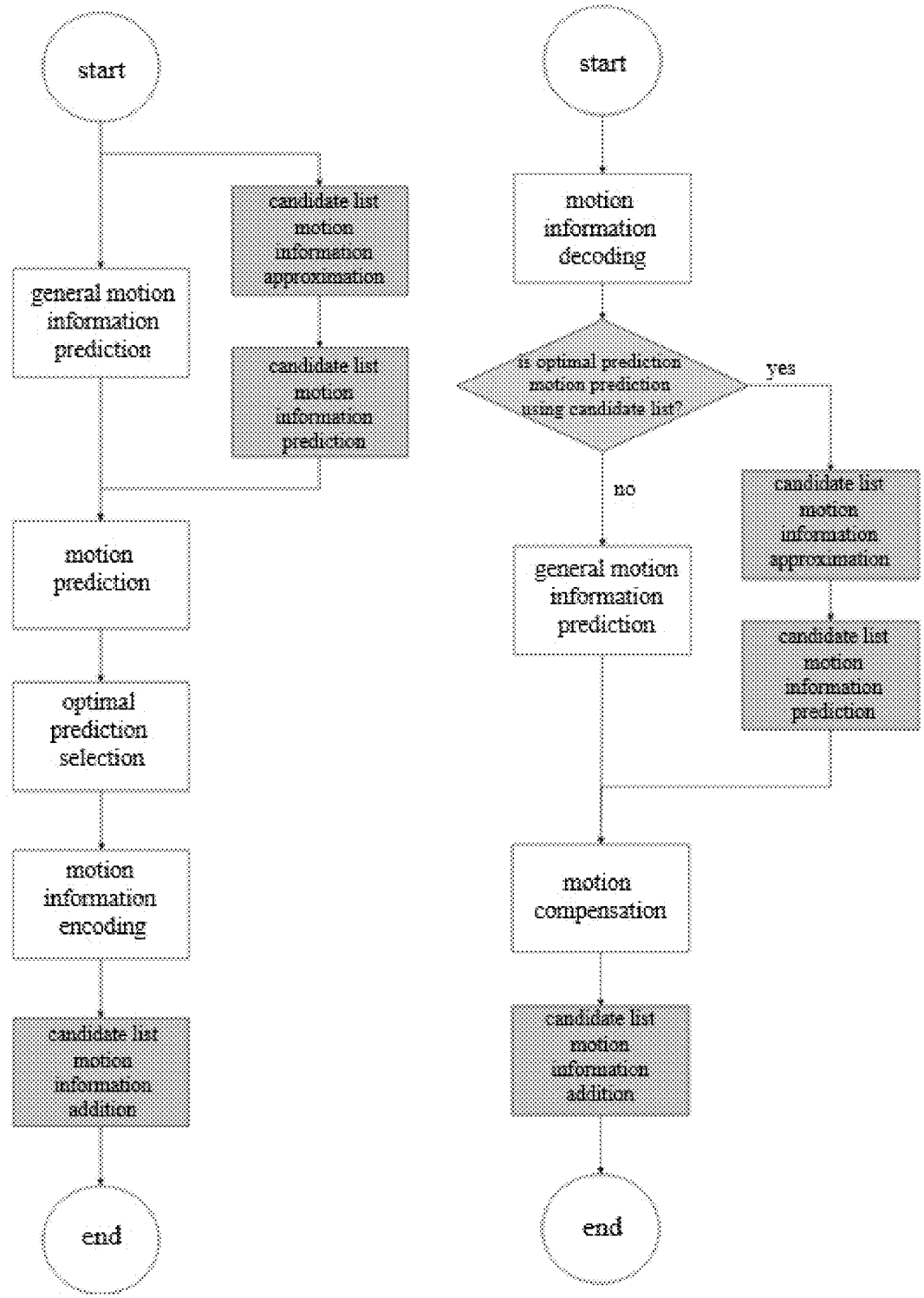

FIGS. 21 and 22 are diagrams illustrating flowcharts of an encoder and a decoder that approximate motion information according to some embodiments of the present invention.

FIGS. 21 and 22 illustrate flowcharts of encoder/decoder using the candidate list motion information approximation method according to the present invention. FIG. 21 illustrates a case where the motion information of the candidate list is approximated at the time of adding motion information to the candidate list, and FIG. 22 illustrates a case where the motion information of the candidate list is approximated at the time of generating candidates of the candidate list.

FIGS. 21 and 22 may be examples in which a motion information approximation step is added to the flowchart of FIG. 11. The encoder or decoder may approximate the motion information at the time of adding the motion information to the candidate list. The motion information approximated in the motion information approximation step may be newly added to the candidate list in the candidate list motion information addition step.

In FIG. 22, when the encoder or the decoder generates a candidate of the candidate list from the motion information in the candidate list, the encoder or decoder may approximate the motion information of the candidate of the candidate list. The candidate list motion information prediction step may be performed through candidates of a candidate list having approximated motion information. In addition, since each step of FIGS. 21 and 22 may be the same as each step of FIG. 11, description thereof will be omitted.

Figure 23:
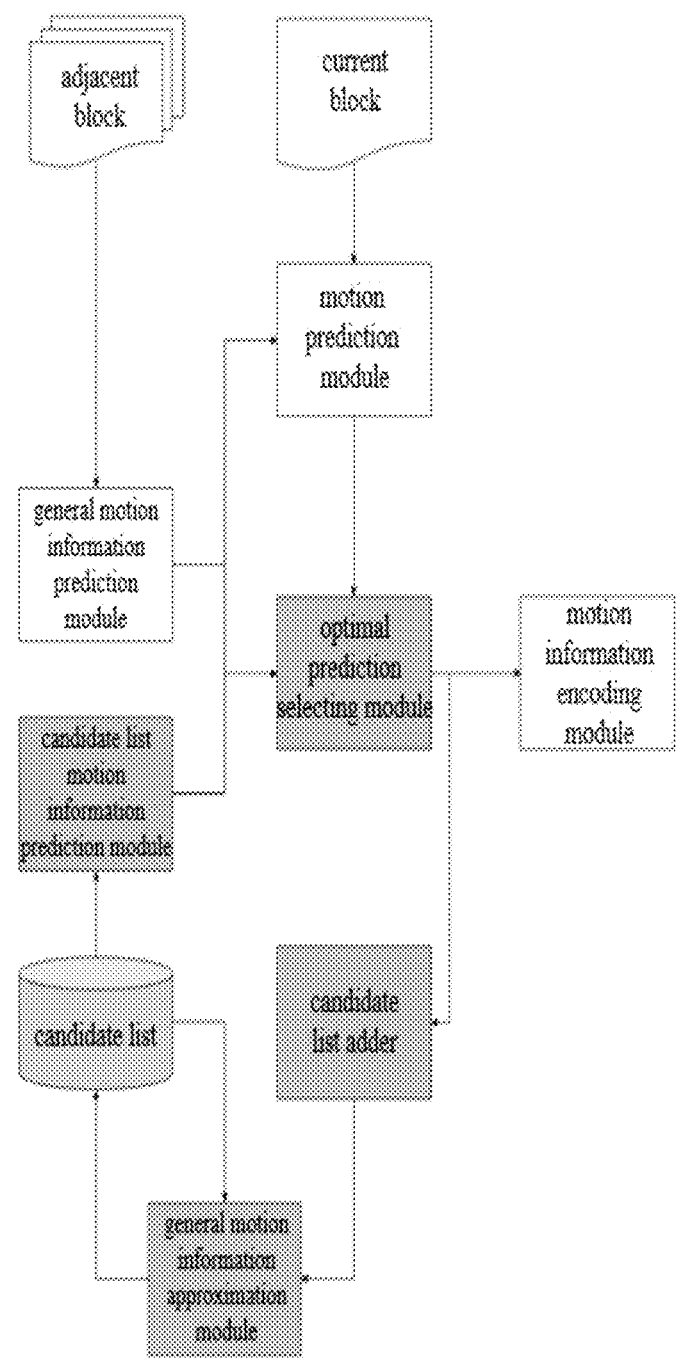
FIGS. 23 and 24 are diagrams illustrating an encoder and decoder structure for approximating motion information, according to some embodiments of the present invention.
Figure 23:
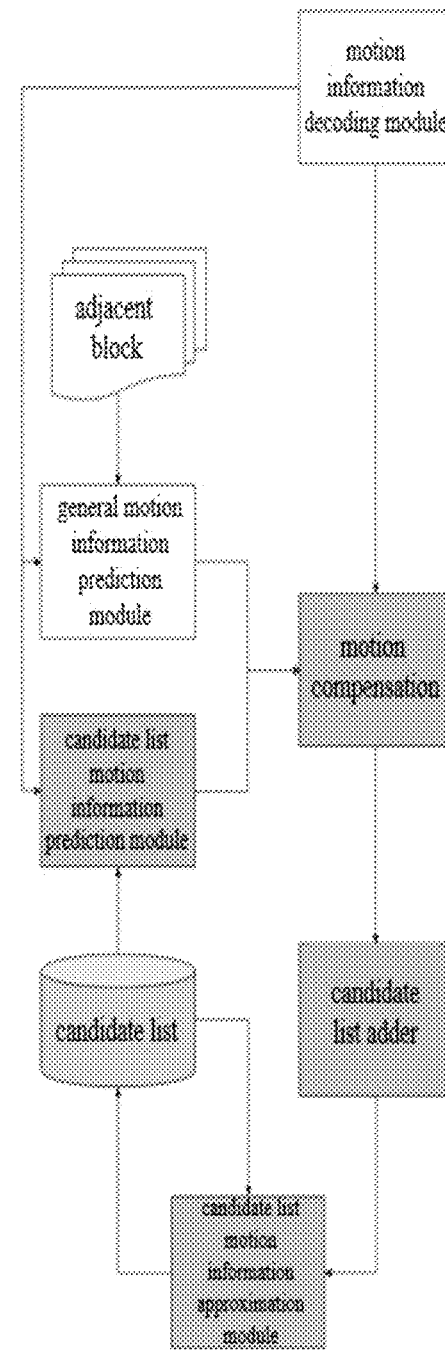
Figure 24:
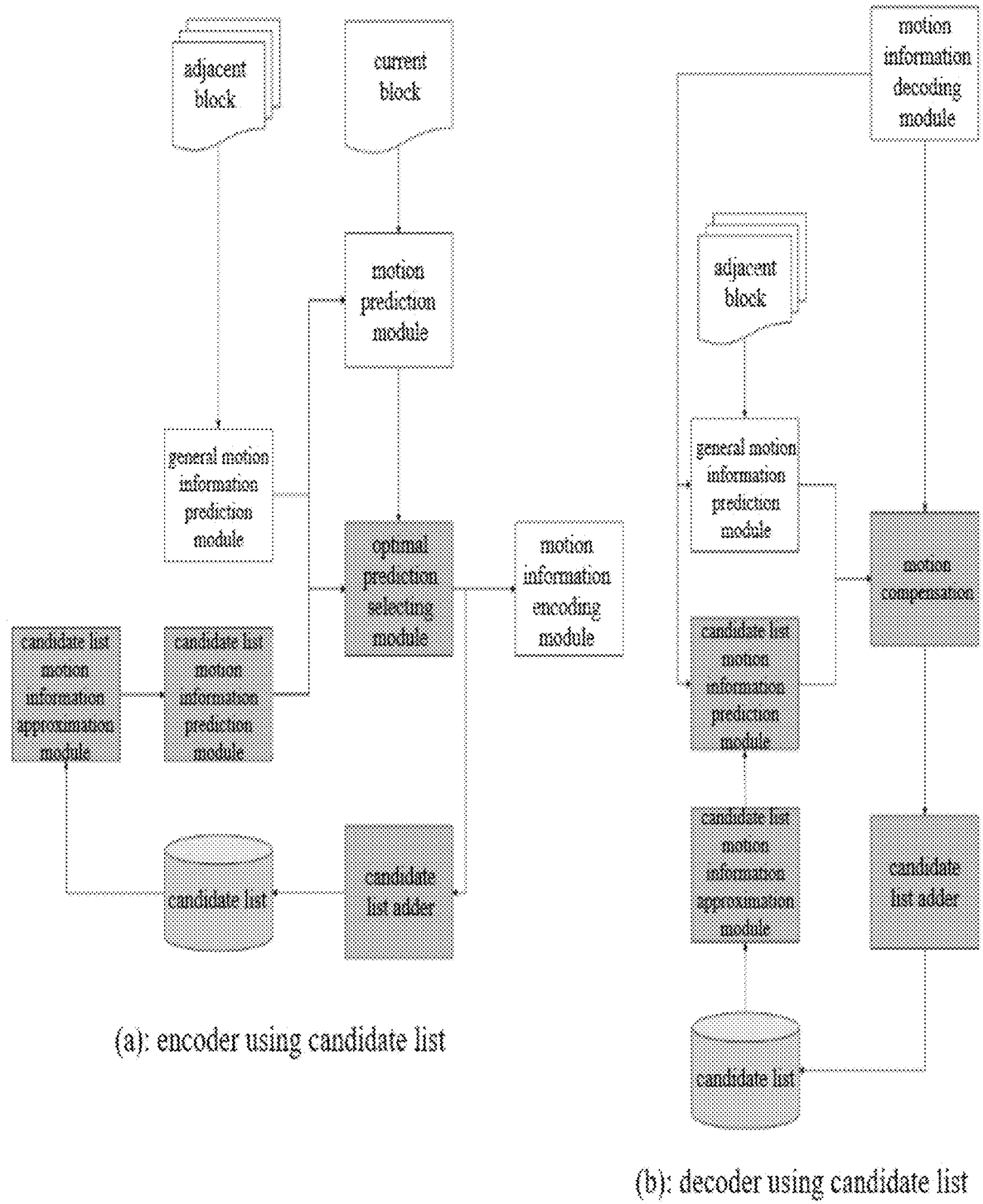

FIGS. 23 and 24 are diagrams illustrating an encoder and decoder structure for approximating motion information according to some embodiments of the present invention.

FIGS. 23 and 24 show examples of device diagrams of sub-decoders using the candidate list motion information approximation method. FIG. 23 illustrates a case where the motion information of the candidate list is approximated at the time of adding motion information to the candidate list, and FIG. 24 illustrates a case where the motion information of the candidate list is approximated at the time of generating the candidate of the candidate list.

FIGS. 23 and 24 illustrate examples in which a candidate list motion information approximation module is added to the device diagram of FIG. 12. The candidate list motion information approximation module may approximate the motion information when the motion information is added to the candidate list. The motion information approximated by the candidate list motion information approximation module may be newly added to the candidate list by the candidate list motion information adding unit.

The candidate list motion information approximation module of FIG. 24 may approximate the motion information of candidates in the candidate list when generating a candidate list candidate from the motion information in the candidate list. The candidate list motion information prediction unit may perform motion information prediction using candidates of a candidate list having approximated motion information. In addition, since each component of FIGS. 23 and 24 may be the same as each component of FIG. 12, description thereof will be omitted.

Hereinafter, a method of approximating motion information by an encoder or decoder according to some embodiments of the present invention will be described.

As an example, the motion information may be approximated using an average of motion information. The encoder or decoder may approximate the motion information corresponding to the determined similarity range by obtaining an average value of the motion information corresponding to the determined similarity range. Herein, at least one of an arithmetic mean, a weighted average, and a median may be used as a method of calculating the average. In addition, an average of motion information may be calculated within a range determined regardless of similarity.

As another example, the motion information may be approximated through the representative selection by the frequency of occurrence of the motion information. After obtaining the same number of pieces of motion information within a predetermined range, the encoder or decoder may approximate the same motion information within the predetermined range by determining the largest number of pieces of motion information as the representative motion information. For example, when the predetermined range is CTU, the encoder or decoder may compare all the motion information generated in one CTU, and determine the motion information with the highest number of occurrences as representative motion information of the current CTU. The representative motion information may be used as approximated motion information.

In addition, the above-described representative motion information determination may be made by using similar motion information instead of the same motion information. In this case, the similar motion information may mean motion information having a difference within a specific threshold value from the reference motion information. The encoder or decoder may confirm the number of occurrences by treating similar motion information as the same motion information described above and determine the representative motion information based on the same.

As another example, the motion information may be approximated in consideration of the region from which the motion information is derived. The region from which the motion information is derived may be different for each piece of motion information. The encoder or decoder may approximate the motion information in consideration of the region from which the motion information is derived. For example, the motion information is derived through the large region, the encoder or decoder may calculate a weighted average by giving higher weight, or approximate the motion information by selecting the motion information derived through the largest region as the representative motion information. In this case, when motion information derived from different regions from each other have the same motion to each other, the regions may be summed and considered.

As another example, the motion information may be approximated in consideration of the prediction potential of the motion information. The encoder or decoder may compare pieces of prediction potential information of the motion information to be added to the candidate list, to select the motion information having a high prediction potential as the representative motion information, or calculate the representative motion information by using a weighted average according to the prediction potential. Herein, the encoder or the decoder may set a range for comparing the prediction potential or approximate the motion information by comparing the prediction potential only between similar pieces of motion information.

Herein, the prediction potential of the motion information may be information indicating how high the motion information has prediction precision or coding efficiency when the motion information prediction using the candidate list according to the present invention is utilized. A method of determining the prediction potential of the motion information will be described later.

As another example, the motion information may be approximated by setting the resolution of the motion information in a specific pixel unit. The motion vector to be added to the candidate list may be approximated to a specific pixel unit. For example, the specific pixel may be one of an integer pixel unit, a ½ pixel unit, a ¼ pixel unit, and a four-pixel unit. For example, when the resolution of the motion vector to be added to the candidate list is approximated to a 1/16 pixel unit and an integer pixel unit, a value of the motion vector may be approximated to the nearest integer value. As another example, when approximating to a ½ pixel unit, the motion vector value may be approximated to the nearest ½ unit value. For example, when the value of the motion vector is (2.6, 3.7), when approximating to the nearest ½ unit value, the motion vector value may be approximated to (2.5, 3.5).

Approximation of motion information may be performed by using the above-described embodiments individually. In addition, approximation of motion information may be performed through at least one combination of the above-described embodiments.

Hereinafter, a method of performing prediction by using prediction potential of motion information of a candidate list according to the present invention will be described.

The motion information stored in the candidate list according to the present invention may include additional information for more efficiently utilizing the candidate list in addition to the information for motion prediction. The prediction potential of the motion information included in the candidate list may be determined using some or all of the motion information and additional information included in the candidate list.

In the present specification, the prediction potential may be information indicating how high the motion information has prediction precision or encoding efficiency when being used for motion information prediction using a candidate list. Therefore, it is possible to improve the encoding efficiency by first selecting motion information having a high prediction potential and generating candidates for a candidate list.

A method of determining the prediction potential of motion information according to the present invention may include a method of calculating the global potential of motion information belonging to a candidate list in a UPU, and a method of calculating local potential for a block (unit) to be currently encoded.

The method of calculating the global potential may be a method of estimating how promising each piece of motion information included in the candidate list is for the entire UPU. The method of calculating the local potential may be a method of estimating how promising each piece of motion information included in the candidate list is for predicting motion information of a specific block.

Figure 25:
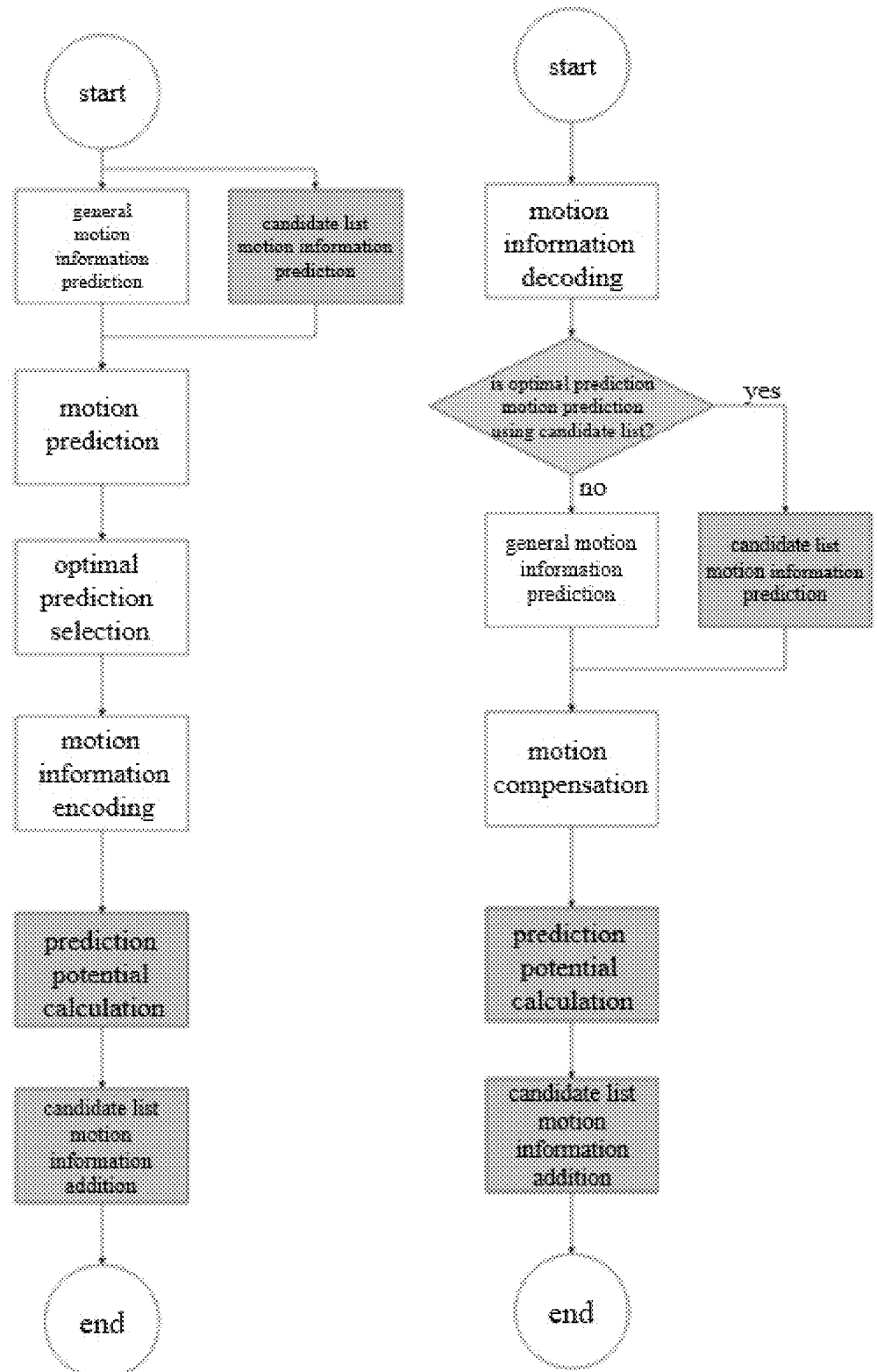
FIGS. 25 and 26 are diagrams illustrating a method of calculating a potential of a candidate list according to some embodiments of the present invention.
Figure 26:
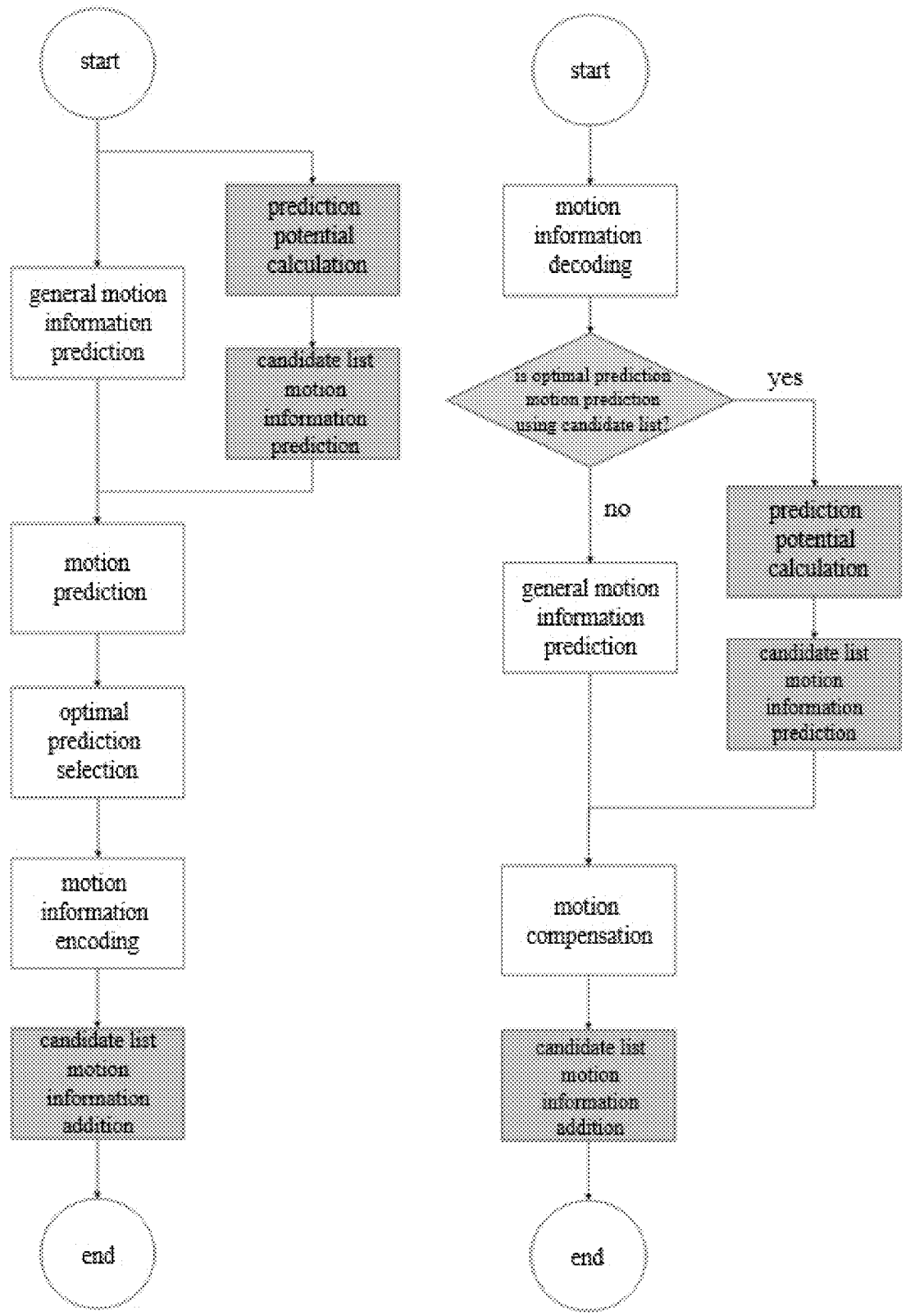

FIGS. 25 and 26 are diagrams illustrating a method of calculating the potential of a candidate list according to some embodiments of the present invention.

FIGS. 25 and 26 show flowcharts of an encoder and decoder that calculating the prediction potential of motion information. FIG. 25 illustrates a case where the prediction potential of the motion information is calculated at the time of adding the motion information to the candidate list, and FIG. 26 illustrates a case where the prediction potential of the motion information included in the candidate list is calculated at the time of generating the candidate of the candidate list.

FIGS. 25 and 26 may be examples in which a prediction potential calculating step is added to the flowchart of FIG. 11. For example, the calculating of the candidate list prediction potential of FIG. 25 may be performed by the global potential calculating method described above. The motion information added to the candidate list may include prediction potential information. When the same motion information exists in the existing candidate list, the prediction potential information may be updated.

For example, the prediction potential calculating step of FIG. 26 may be performed using the local potential calculating method described above.

The candidate list motion information prediction steps of FIGS. 25 and 26 may be performed in consideration of the derived prediction potential information. In addition, since each step of FIGS. 25 and 26 may be the same as each step of FIG. 11, description thereof will be omitted.

Figure 27:
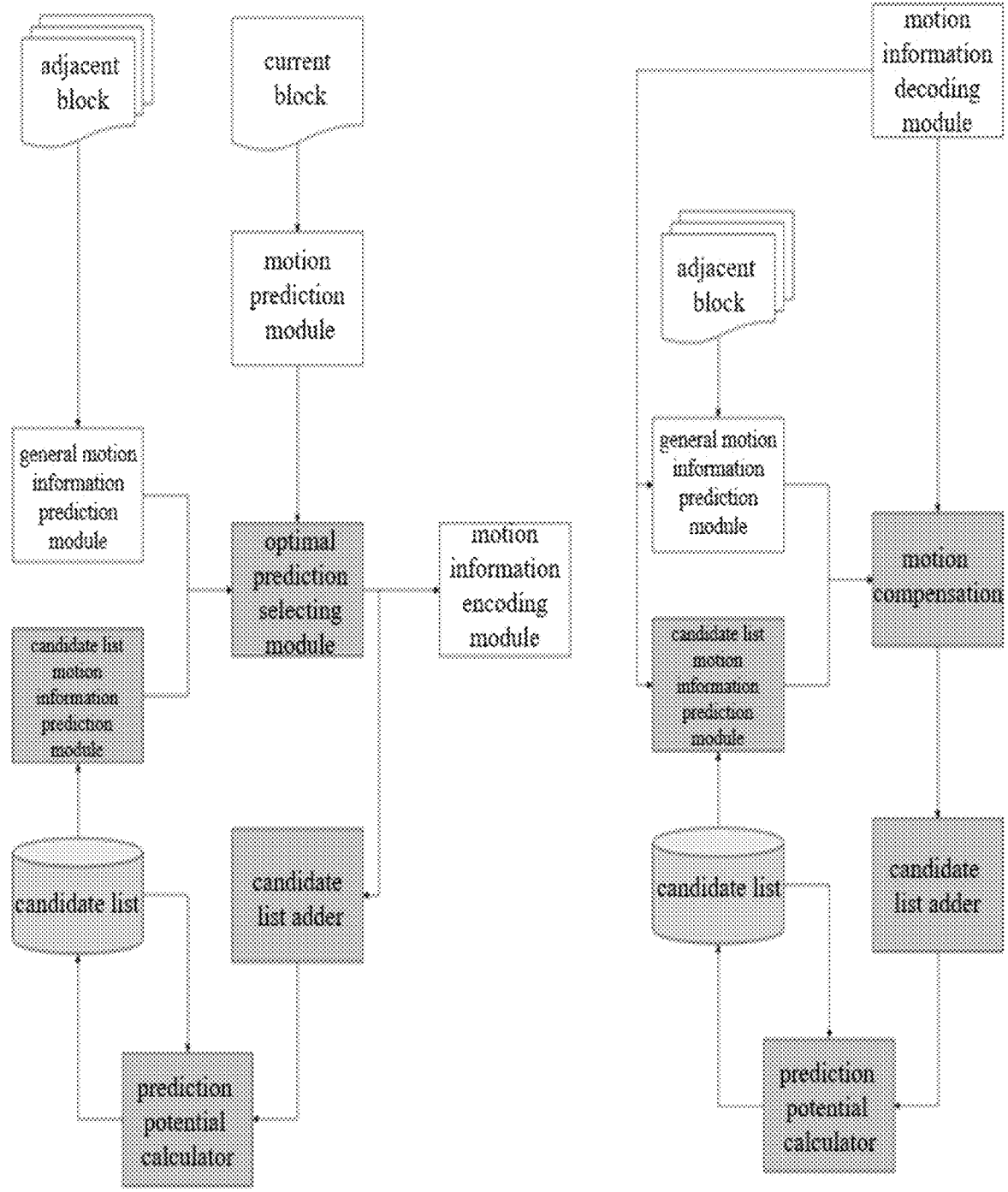
FIGS. 27 and 28 are diagrams illustrating an encoder and decoder structure for calculating a potential of a candidate list according to some embodiments of the present invention.
Figure 28:
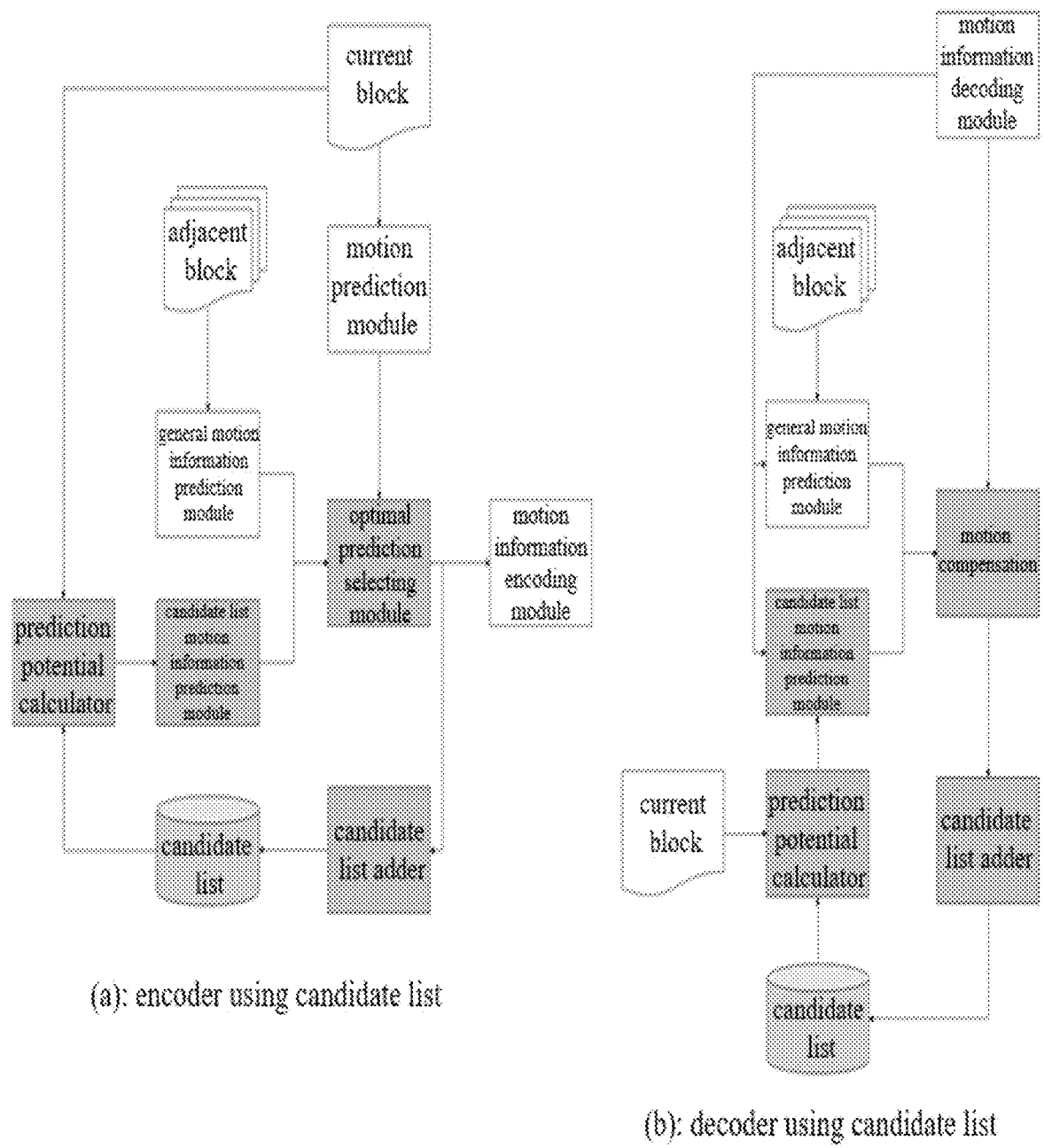

FIGS. 27 and 28 are diagrams illustrating an encoder and decoder structure for calculating a prediction potential of a candidate list according to some embodiments of the present invention.

FIGS. 27 and 28 show examples of device diagrams of an encoder and decoder that calculate a prediction potential of motion information. FIG. 27 illustrates a case where the potential of motion information is calculated at the time of adding motion information to a candidate list, and FIG. 28 illustrates a case where the potential of motion information of a candidate list is calculated at the time of generating candidates of a candidate list FIGS. 27 and 28 show examples in which a prediction potential calculator is added to the device diagram of FIG. 12. For example, the prediction potential calculator of FIG. 27 calculates the potential of motion information to be added to the candidate list, and may calculate the prediction potential by using the global potential calculation method described above. The motion information added to the candidate list may include prediction potential information. When the same motion information exists in the existing candidate list, the potential information may be updated.

Meanwhile, the prediction potential calculator of FIG. 28 calculates a prediction potential when generating a candidate of a candidate list, and the prediction potential may be calculated by the local potential calculation method described above.

The candidate list motion information prediction units of FIGS. 27 and 28 may predict motion information in consideration of derived prediction potential information. In addition, since each component of FIG. 27 and FIG. 28 may be the same as each component of FIG. 12, description thereof is omitted.

Figure 29:
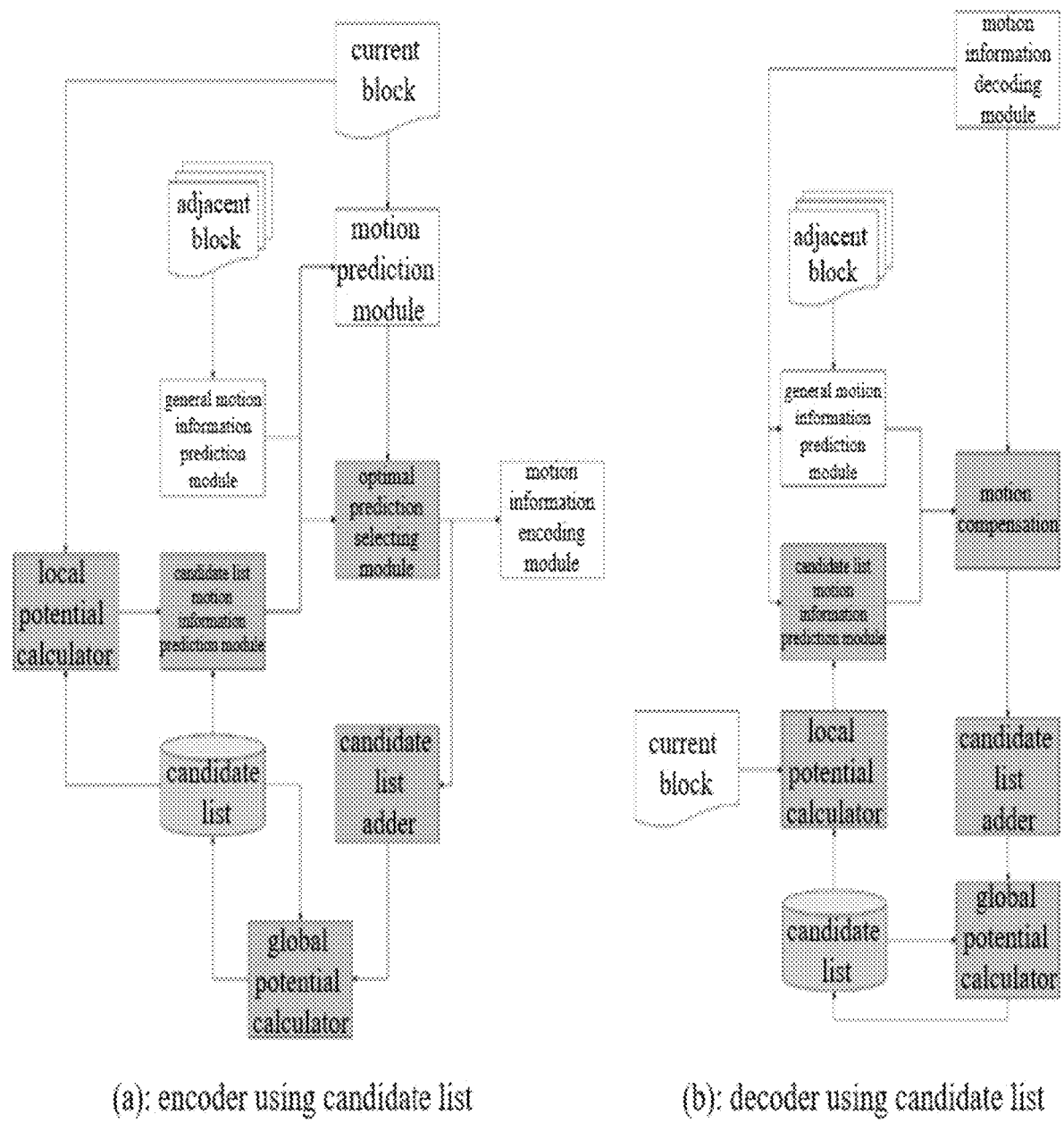
FIG. 29 is a diagram illustrating an encoder and decoder structure for calculating a prediction potential of a candidate list according to some embodiments of the present invention.

FIG. 29 is a diagram illustrating generation of a mixed candidate list according to an embodiment of the present invention.

FIG. 29 shows an example of a device diagram of an encoder and decoder for calculating a prediction potential of motion information by utilizing both a global potential calculation and local potential calculation method. The device diagram of FIG. 29 may be obtained by replacing the prediction potential calculator of FIG. 27 with a global potential calculator and replaces the prediction potential calculator of FIG. 28 with a local potential calculator. According to FIG. 29, the candidates of the candidate list may be generated in consideration of both the global potential and the local potential, which may be used in the candidate list motion information prediction unit.

Hereinafter, a method of calculating a prediction potential of motion information according to some embodiments of the present invention will be described.

As an example, the prediction potential may be calculated in consideration of the frequency of occurrence of motion information. The prediction potential of motion information can be calculated by checking how much motion information in the candidate list has been generated so far. When the frequency of occurrence of the same motion information or similar motion information capable of being treated as the same motion information is high, the encoder or decoder may determine the prediction potential of the corresponding motion information to be high. Herein, the occurrence frequency may be measured using the number of occurrences of the same motion information, a region having the same motion information, and the like. Herein, the occurrence frequency may be measured by limiting a region where the occurrence frequency is measured. For example, the frequency of occurrence up to the present may be measured for the entire UPU region, or the frequency of occurrence may be measured only within a predetermined range or a specific region on the basis of a unit that is currently encoded. The frequency of occurrence thus measured may be used to calculate the prediction potential of motion information.

As another example, the prediction potential may be calculated in consideration of the precision of the inter prediction. Since each piece of motion information belonging to the candidate list is motion information used to reconstruct another block, the encoder or decoder may know the coding efficiency of the block reconstructed using the corresponding motion information.

The encoding efficiency of motion information may be determined on the basis of an energy distribution or an average value of the residual signal. The energy of the residual signal may mean a difference in brightness value or a difference in pixel value between the current block and prediction block generated through inter prediction. The energy average of the residual signal may mean an average value of the difference between the brightness value or the pixel value generated at each pixel position of the current block and the prediction block. The energy distribution of the residual signal may be a value calculated through the position of the energy of the residual signal for each pixel position in a differential block and the magnitude of the energy. For example, the energy distribution of the residual signal may be a moment value of the residual signals having energy of a predetermined magnitude or more. Herein, the moment value of the residual signals may mean a center position of brightness value distribution, which is calculated through positions of the respective residual signals and brightness values of the respective residual signals.

Through the energy of the residual signal, a distribution and an average value or the like in a frequency-transformed differential block may be calculated. For example, the DC value may be used as an average value in the frequency domain, and the energy distribution of the residual signals may be determined through an energy ratio for each frequency domain Herein, in order for the encoder and the decoder to operate in the same manner, a quantized differential block or a frequency-transformed difference block may be used. In addition, when using the quantized differential block or the frequency-transformed differential block, a quantization parameter or a quantization step value may be used. For example, when comparing the energy distribution or average value of the residual signal of two blocks using different quantization parameters from each other, the energy distribution or average value of the differential signal may be corrected through the difference of the quantization parameter.

For example, after the energy of the differential signal having the larger quantization parameter is scaled n times, the energy distribution or average value of the differential signal may be calculated to compare the energy of residual signals between the two blocks. In addition, since the high frequency component is preferentially reduced during quantization, when comparing the energy of the residual signal in the frequency domain, the calculation may be performed by giving a separate weight to the low frequency component and the high frequency component.

Herein, when a value of the energy average of the residual signal is high, it is determined that the prediction potential is low. The prediction potential may be determined through a method of comparing residual signal energy distribution by varying the priority thereof according to the position of the residual signal energy distribution and a method of comparing the residual signal energy distribution according to the frequency domain such as the high frequency region and the low frequency region.

That is, when the coding efficiency is high when using the corresponding motion information by comparing the coding efficiency of the reconstructed blocks using each piece of motion information, the encoder or decoder may determine that the corresponding motion information has a high prediction potential.

As another example, the prediction potential may be calculated in consideration of the distance between the position of the current block and the position of the region where the motion information has occurred. The motion information derived from a specific region is more likely to be similar as the specific region that is temporally and spatially adjacent to the current block. In consideration of such a characteristic, the prediction potential may be determined according to the spatial and temporal distance between the generation position of each piece of motion information included in the candidate list and the position of the current block.

Herein, in the case of the same motion information included in the candidate list, the encoder or decoder may reduce operations required for calculating the distance through the use of the approximate position information, or a method of updating the latest position. As an example of the method of calculating the approximate position information, when the motion information is generated in units of coding blocks, a method of simplifying distance calculation may be utilized by considering only position information of a CTU including the corresponding coding block.

When the candidate list according to the present invention is used in combination with a merge mode, an AMVP mode, an IBC mode, or the like, the prediction potential may be determined excluding an adjacent region determination method that the existing motion information prediction method considers.

Calculation of the prediction potential of the motion information may be performed by utilizing the above-described embodiments individually. In addition, calculation of prediction potential of motion information may be performed through at least one combination of the above-described embodiments. When the above-described embodiments are combined to calculate the prediction potential, the prediction potential may be calculated by weighting each determination result value and then applying the importance of each determination result differentially.

Hereinafter, a method for generating a virtual candidate list according to an embodiment of the present invention will be described.

Candidates of the candidate list according to the present invention may be generated through motion information previously stored in the candidate list. For example, candidates of the candidate list may be generated through all or some of the motion information previously stored in the candidate list. Hereinafter, a candidate having motion information that is derived from the motion information previously stored in the candidate list but not identical to the motion information previously stored in the candidate list is defined as a virtual candidate. According to an embodiment of the present invention, the virtual candidate may be added to the candidate list.

Hereinafter, a method of generating a virtual candidate will be described.

For example, the virtual candidate may mean a candidate of the mixed candidate list. For example, there may be a case where prediction is performed using a plurality of pieces of motion information. In particular, prediction using two pieces of motion information may be referred to as bi-prediction.

The motion information used for inter prediction using a plurality of pieces of motion information may be configured as a set of a plurality of pieces of motion information. Candidates in the candidate list having a set of a plurality of pieces of motion information as motion information may be generated from motion information stored in different candidate lists for each piece of motion information constituting the set. When the motion information stored in the candidate list is a set of a plurality of pieces of motion information, candidates of the mixed candidate list may be generated using some or all of the motion information.

Figure 30:
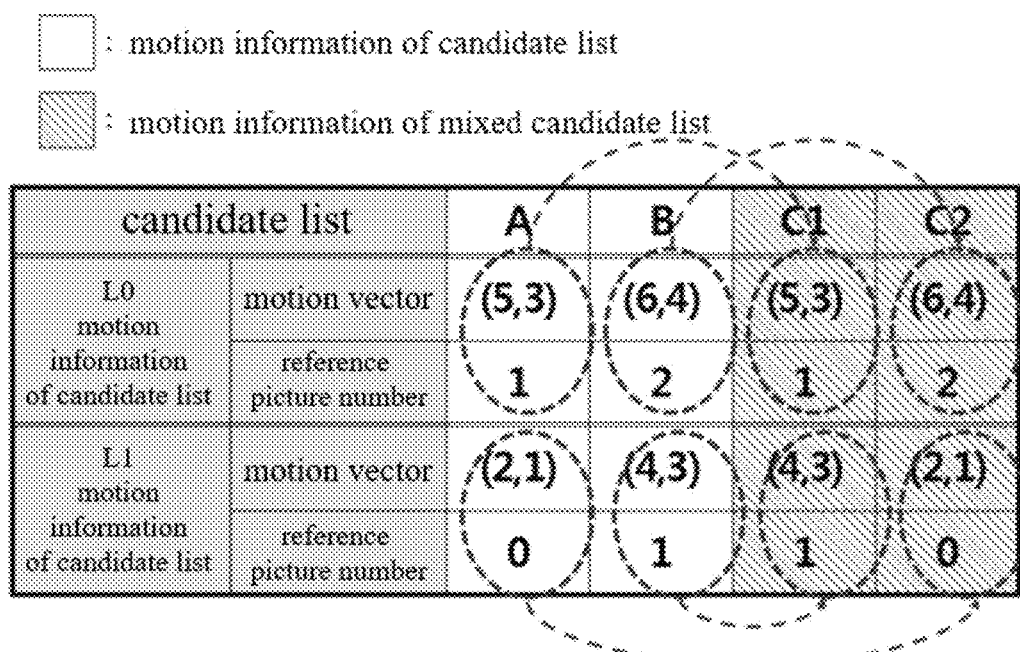
FIG. 30 is a diagram illustrating generation of a mixed candidate list according to an embodiment of the present invention.

FIG. 30 is a diagram illustrating generation of a mixed candidate list according to an embodiment of the present invention.

FIG. 30 shows an example in which motion information of a mixed candidate list is generated. The example of FIG. 30 shows a case where motion information of a mixed candidate list has motion information for reference picture lists L0 and L1, and each piece of motion information consists of a motion vector and a reference picture number (index, catalogue, identifier, number, etc.). In the example of FIG. 30, the mixed candidate list has two sets of motion information A and B, and each set of motion information includes motion information of the reference picture list L0 and motion information of L1.

Herein, C1 and C2 may mean mixed candidate list motion information generated from motion information sets A and B. Herein, C1 may be generated from motion information L0 of A and L1 motion information of B, and C2 may be generated from motion information L0 of B and motion information L1 of A.

As another example, candidates of a new candidate list may be generated through an average or a weighted average of some or all of the motion information previously stored in the candidate list. A virtual candidates derived by this method may be defined as an average candidate.

For example, the average candidate may be derived from two or more pieces of motion information derived in a predefined method, the motion information outside the candidate list not stored in the candidate list motion information, predetermined motion information, or the like may be used, in the process of deriving the motion information. In the process of generating an average candidate, an average of all the information of motion information may be used, and an average of some motion information may be used. For example, when the motion information consists of a motion vector and a reference picture number, the average of both the motion vector and the reference picture number may be calculated to generate an average candidate, and an average of one of the motion vector and the reference picture number is calculated to generate an average candidate.

The encoder or decoder may add the derived average candidate to the candidate list. For example, when the average candidate is added, the largest index value in the candidate list may be assigned. Herein, there may be various methods of setting the weight. For example, the weight may be given according to the prediction potential.

The generation of the virtual candidate may be performed by utilizing the above-described embodiments individually. In addition, virtual candidate generation may be performed through a combination of at least one of the above-described embodiments.

Hereinafter, a method of initializing motion information of a candidate list according to the present invention will be described.

The candidate list according to the present invention may be generated in a UPU unit described above. Herein, the UPU may be one of a block, a CTU, a brick, a tile, a slice, a subpicture, a picture, a frame, and a group of picture (GOP) composed of one or more CUs. In the UPU unit, the candidate list is newly created, used, and initialized. Hereinafter, initialization of a candidate list according to some embodiments of the present invention will be described.

For example, the candidate list according to the present invention may be newly generated and used for each UPU. That is, the candidate list may be initialized for each UPU. The candidate list may not have motion candidates stored immediately after initialization. The candidate list may be generated for each UPU, and there may be no correlation between candidate lists of each UPU. For example, the candidate list may be initialized for each CTU.

According to the initialization method, it is possible to prevent non-continuous motion information from appearing as a candidate and newly perform encoding from the start point of the UPU without the previous prediction information.

As another example, the candidate list of the current UPU may be initialized by using motion information of the UPU that have already encoded or candidate list of the UPU. Herein, the UPU to be referenced may be designated, and the candidate list of the current UPU may be initialized using the motion information or the candidate list of the corresponding UPU.

Herein, the UPU designation to be referenced may be performed through a method of allowing the encoder and the decoder to refer to the same UPU through a signal signaled and a method of omitting transmission/reception of additional signal by selecting an UPU by a predetermined method.

Initialization of the current candidate list may be performed by copying all or part of the candidate list of the UPU to which it refers. Alternatively, the current candidate list may be initialized in consideration of the prediction potential or priority of the motion information that is derived or copied.

Figure 31:
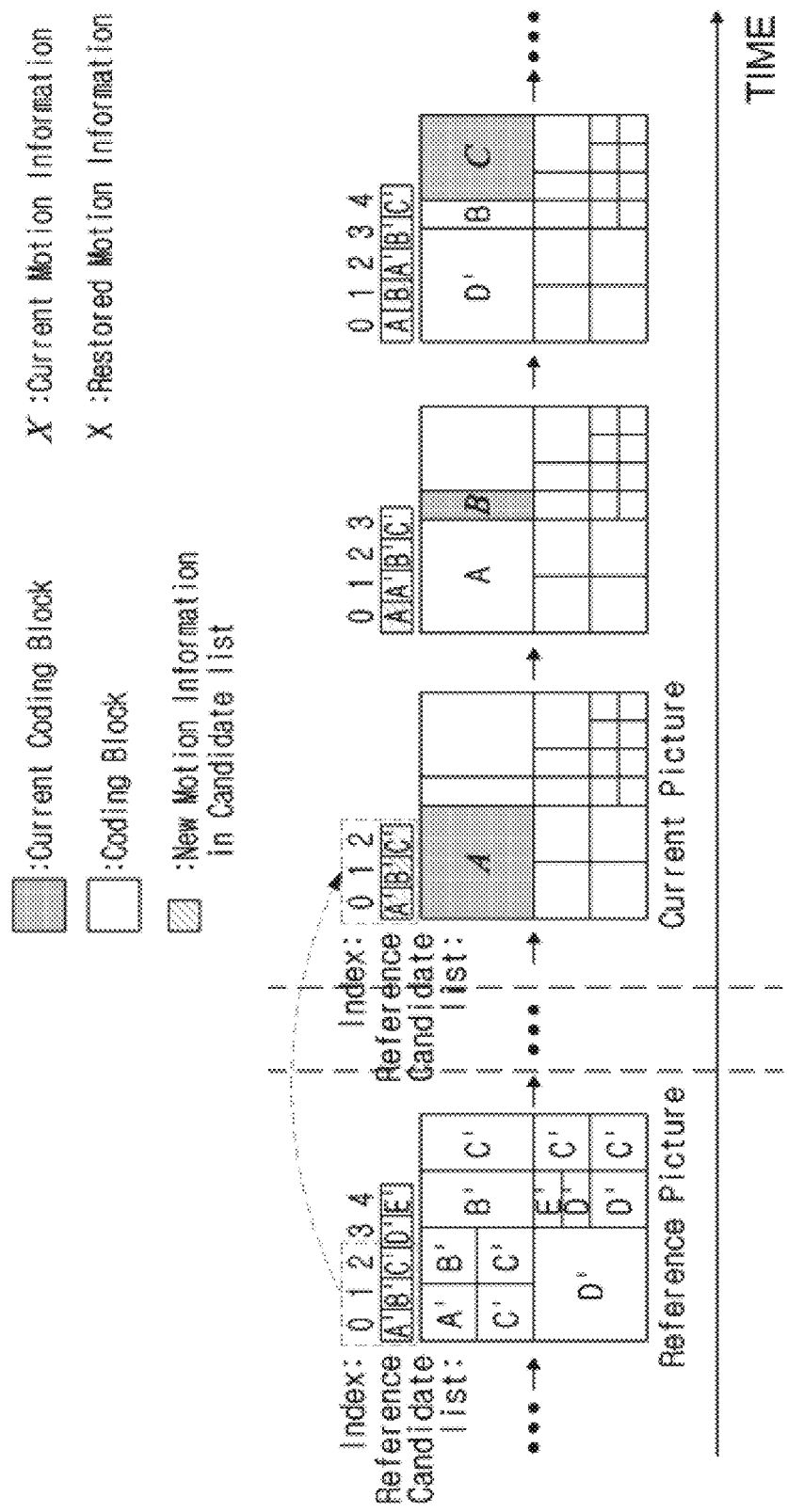
FIGS. 31 and 32 are diagrams illustrating a method of initializing a candidate list according to some embodiments of the present invention.
Figure 32:
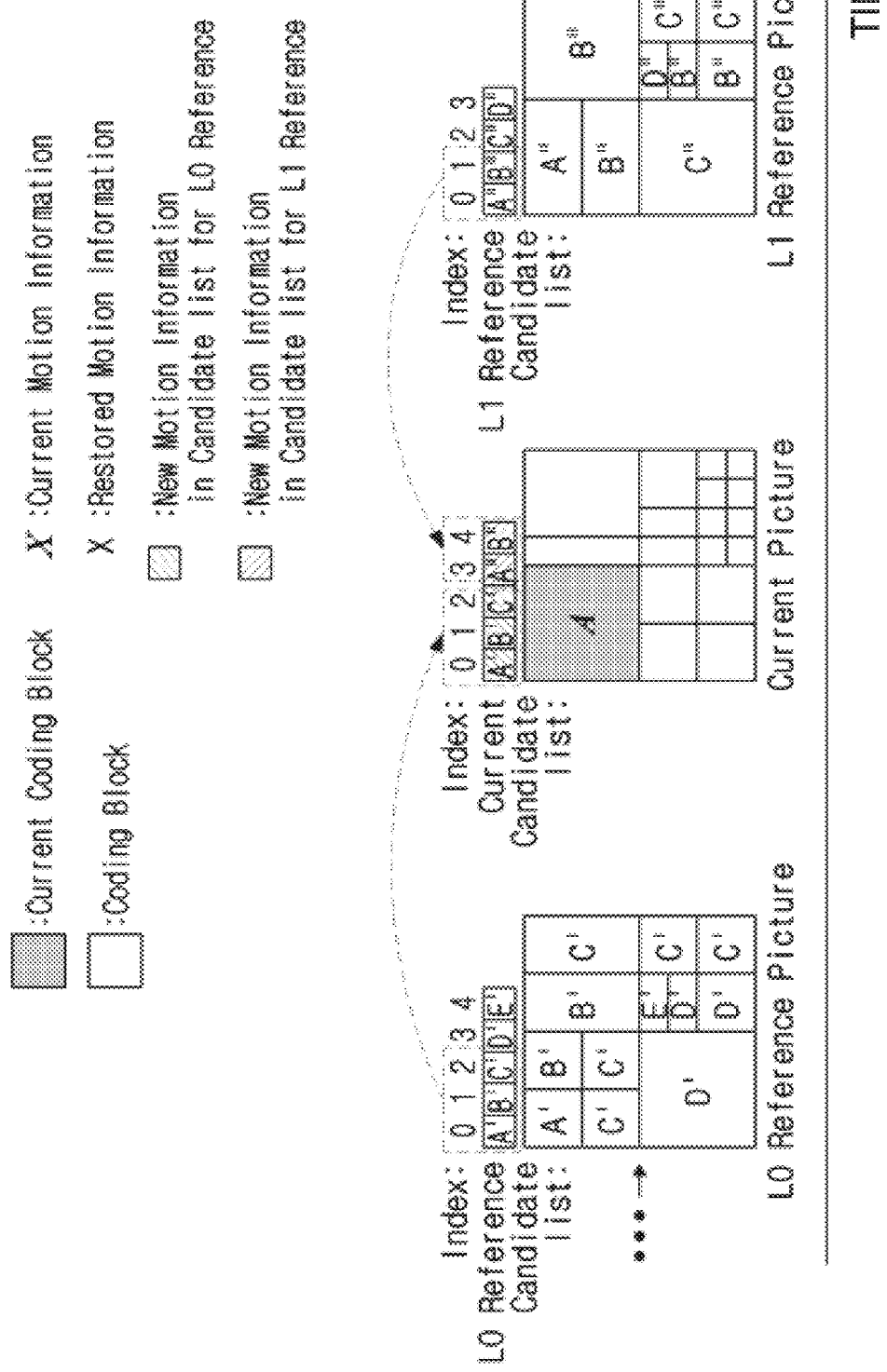

FIGS. 31 and 32 are diagrams illustrating a method of initializing a candidate list according to some embodiments of the present invention.

FIG. 31 shows an example of initializing a candidate list of a current UPU using a candidate list of a reconstructed UPU when the UPU is a picture unit. According to FIG. 31, motion information A', B', and C' are added to a candidate list before reconstructing the first motion information of the current picture, which is copied from a candidate list of a reference picture which is a reconstructed UPU.

FIG. 31 shows a case of copying a part of the candidate list of the reconstructed UPU. In FIG. 31, an index of a candidate list indicates a prediction potential or priority of a candidate of the candidate list, which indicates that the smaller the number, the higher the prediction potential or the higher the priority. According to FIG. 31, the current frame may be reconstructed by adjusting the priority of the copied motion information. Herein, the priority of previously copied motion information A', B' and C' may be set to be prioritized than newly added motion information A and B.

FIG. 32 shows an example of copying motion information for initializing a candidate list in both the L0 direction and the L1 direction. As shown in FIG. 31, a reconstructed UPU may be used to initialize a candidate list, and the UPU may be set in a picture unit. According to FIG. 32, the current candidate list may be initialized by copying motion information from candidate lists of pictures referenced in the L0 direction and the L1 direction. For example, three motion information A', B', and C' may be copied from the L0 list, and two motion information A", B" may be copied from the L1 list. As described above, when copying motion information used for initializing a candidate list from UPUs different from each other, the number of pieces of motion information referenced from each reconstructed UPU may be set differently.

The information about whether the candidate list initialization is performed, picture information referenced for initialization, the number of pieces of motion information referenced for initialization, etc. may be signaled at a higher level of a bitstream, such as a sequence parameter set, a picture parameter set, a slice header, and the like.

Hereinafter, a method of scaling motion information of a candidate list according to the present invention will be described.

In performing inter prediction, prediction may be performed on a current picture using a temporally adjacent reference picture. A current picture and a reference picture may exist at different positions on the time axis. When the inter prediction is performed, the motion information may be derived by considering motion of an object or a background in an image due to a time difference between the current picture and the reference picture.

Herein, the reference picture referenced by the current block and the reference picture referenced by the candidate block may be different from each other. Therefore, when deriving motion information using the candidate block, it is necessary to correct motion information of the current block by considering the temporal distance between pictures to which the referencing block and the referenced block belong.

By comparing the temporal distance between the picture to which the current block belongs and the picture that the current block references, and the temporal distance between the picture to which the candidate block belongs and the picture that the candidate block references, a technique of correcting the motion information of the candidate block to be more similar to the motion information of the current block is called motion information scaling. The motion information scaling may be used in an inter prediction technique using candidates such as AMVP mode, merge mode, and the like.

Figure 33:
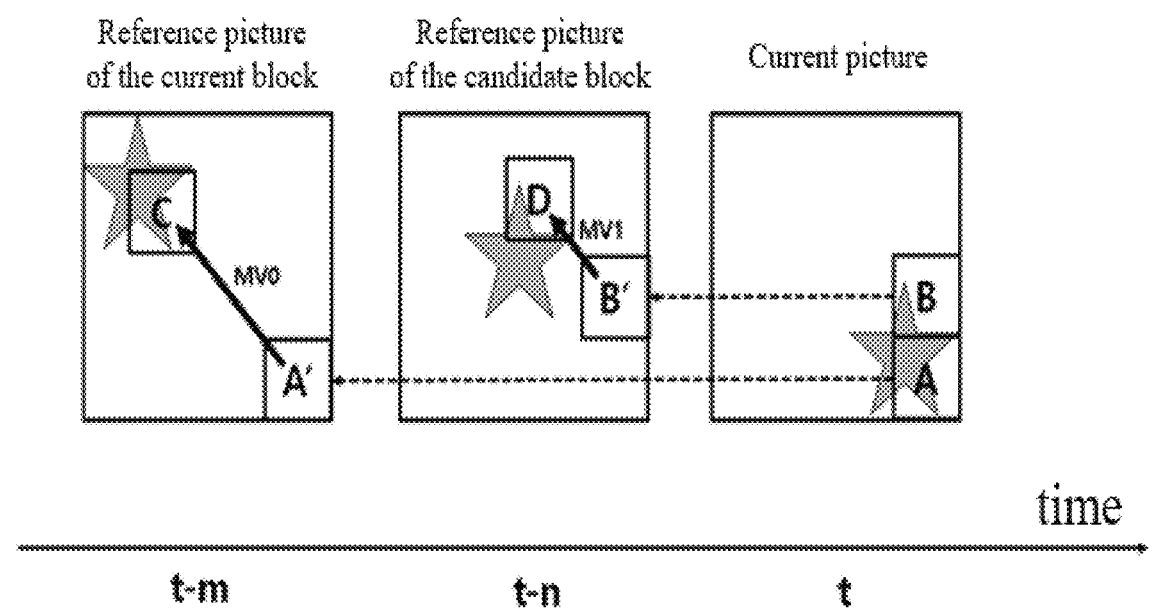
FIG. 33 is a diagram illustrating motion information scaling.

FIG. 33 is a diagram illustrating motion information scaling.

FIG. 33 shows an example of motion information scaling t may mean a position on the time axis of the current picture, and t-n may mean a position on the time axis of the reference picture of the candidate block. t-m may mean a position on the time axis of the reference picture of the current block. As the position on the time axis of each picture changes, the movement of image in the picture may be determined. A may mean a current block and B may mean a candidate block. A' may mean a position in a reference picture of a current block having the same spatial position as the current block A. B' may mean a position in a reference picture of a candidate block having the same spatial position as the candidate block B.

Since the candidate block B performs inter prediction from the reference picture of the candidate block, it is possible to derive the position of the D block as a result of inter prediction, and express this position as a motion vector MV1. When deriving the motion vector of the current block A from the candidate block B, the temporal distance between the current picture and the reference picture of the A block (for example, t−(t−m)=m) and the temporal distance between the current picture and the reference picture of the B block (for example, t−(t−n)=n) is different from each other, it is possible to apply motion information scaling.

For example, in FIG. 33, using the motion vector MV1 of the block B, the temporal distance m between the current picture and the reference picture of the block A, and the temporal distance n between the current picture and the reference picture of the block B, motion vector (MV1*m/n) of the current block A may be derived. Since the motion vector (MV1*m/n) to which the motion information scaling is applied is similar to the motion vector MV0 of the current block than MV1, the motion information prediction efficiency may be increased.

The motion information scaling may be a method of scaling motion information using a temporal distance between pictures, assuming that a moving object in each picture of the video has a linear motion.

Since the current block A performs inter prediction from the reference picture of the current block, the position of the block C may be derived, and this position can be expressed as a motion vector MV0. Herein, since the pictures referenced by the A and B blocks are different from each other, a region suitable for predicting the current block in each reference picture may be different from each other. Therefore, a size difference occurs between MV0 and MV1.

Herein, the motion information scaling may be applied using a distance between the current picture and the reference picture of the candidate block on the time axis and a distance between the current picture and the reference picture of the current block on the time axis. The corrected motion information is more likely to be similar to the motion information of the current block than the uncorrected motion information. It is possible to improving the coding efficiency by using more similar motion information for prediction.

That is, when the motion vector scaling is applied to MV1 in FIG. 33, a motion vector modified close to MV0 may be derived. The encoder or decoder may increase the coding efficiency by using the scaled motion vector.

Since candidates of the candidate list according to the present invention may also have reference pictures different from the current block, it is required to perform the motion information scaling considering the time interval between the current block and the reference picture and the time interval between candidates of the candidate list and the reference picture of the candidate. For example, when candidates of the candidate list use motion information of temporal neighboring blocks, the above-described motion information scaling may be required. Therefore, information for the motion information scaling may be stored as additional information in the motion information stored in the candidate list.

For example, the information for the motion information scaling may include at least one of a POC number of a reference picture, a POC number of a picture in which motion information occurs, and a temporal distance information between a picture in which motion information occurs and a reference picture.

When the UPU is a unit including a plurality of pictures, such as a GOP, motion information stored in the candidate may refer to reference pictures different from each other. When the motion information is predicted using the motion information stored in the candidate list, the reference picture of the motion information included in the referenced candidate list and the reference picture of the current block may be different from each other. In addition, when the UPU includes a plurality of pictures, pictures in which motion information stored in a candidate list may occur may be different from each other.

For example, motion information A referring to POC 2 in a picture of POC1 may be stored in a candidate list, and motion information B referring to POC 4 in a picture of POC 3 may be stored in a candidate list. In this case, the picture in which motion information A stored in the candidate list occurs may be POC 1, and the picture in which motion information B stored in AMVOL occurs may be POC 3. The picture referenced by motion information A may be POC 2, and the picture referenced by motion information B may be POC 4.

In the case of a UPU including a plurality of pictures, the picture in which the motion information stored in the candidate list occurs and the reference picture may be different from each other. Also, the picture in which the motion information stored in the candidate list occurs and the current picture including the current block may also be different from each other, and the reference picture of the motion information stored in the candidate list and the reference picture of the current block may also be different from each other. Herein, when the motion information of the current block is predicted through the motion information of the candidate list, it is possible to improve the coding efficiency by the above-described motion information scaling.

Figure 34:
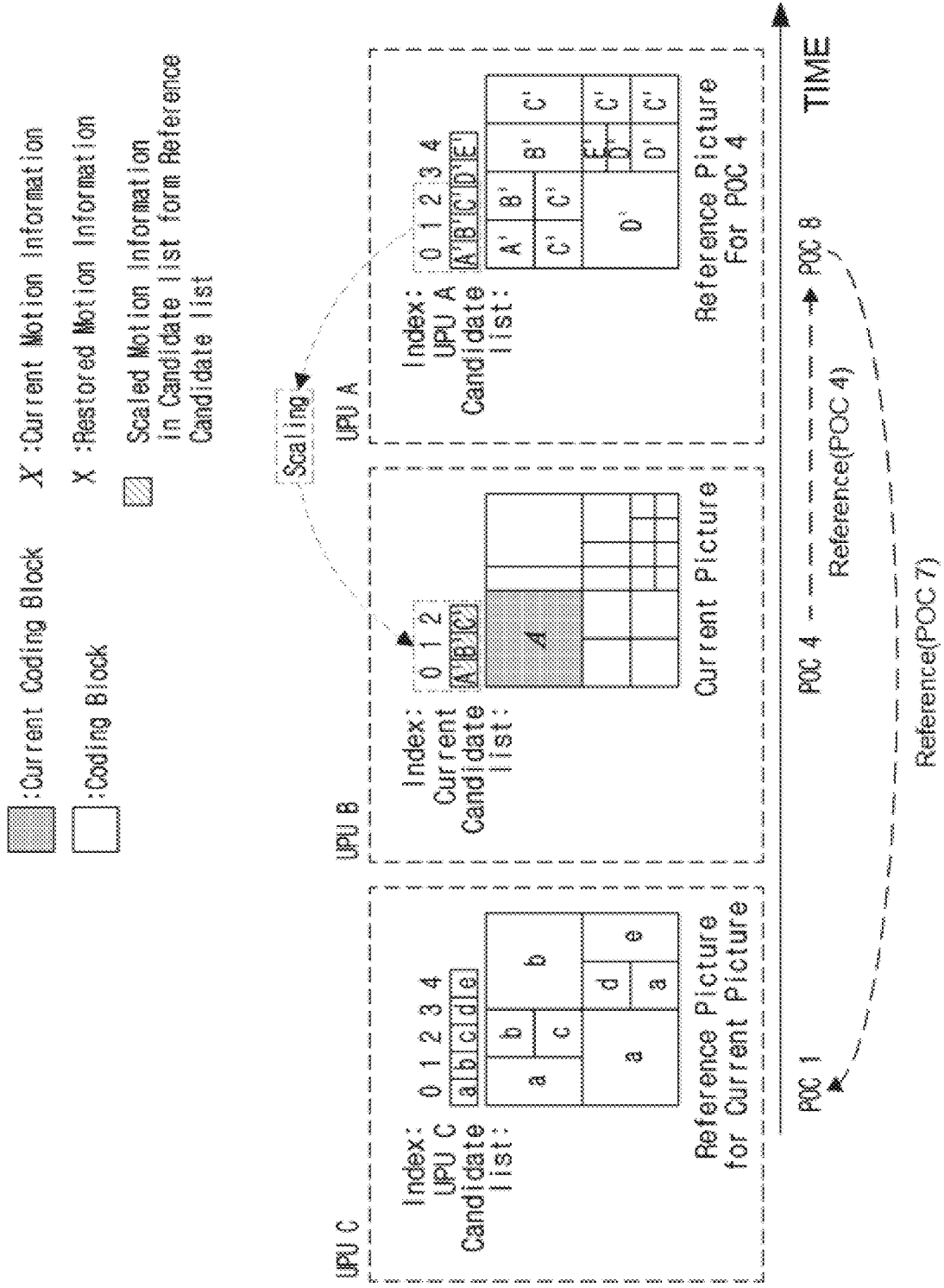
FIG. 34 is a diagram illustrating motion information scaling according to an embodiment of the present invention.

FIG. 34 is a diagram for explaining motion information scaling according to an embodiment of the present invention.

For example, when the UPU is a picture unit, scaling may be performed as shown in FIG. 34. In the example of FIG. 34, UPU A may store motion information generated in a picture of POC 8 in a candidate list, and UPU B may store motion information generated in a picture of POC 4 in a candidate list. The picture of POC 8 may perform motion prediction by referencing the picture of POC 1, and the picture of POC 4 may perform motion prediction by referencing the picture of POC 8. When a picture of POC 4 is a current picture that is to be currently encoded, and POC 8 is a picture that has already been reconstructed, the candidate list of UPU B may be initialized by referencing the candidate list used in UPU A.

However, the motion information stored in the candidate list of UPU A is motion information generated by referring to the picture of POC 8, and thus is different in the time distance between pictures in case in which the picture of POC 4 refer to the picture of POC 8. Meanwhile, since the picture to be encoded by referring to the motion information stored in the candidate list of UPU B is POC 4, and the picture referred to by the picture of POC 4 is POC 8, the motion information of the candidate list of UPU A is used as it is, so that in case of initializing the candidate list of UPU B, the efficiency of motion information prediction is reduced. Herein, when the motion information of UPU A is corrected through motion information scaling, and the scaled motion information is used to initialize the candidate list of UPU B, the coding efficiency may be improved.

Hereinafter, a method of sharing a candidate list according to the present invention will be described.

In performing encoding and decoding, information of a candidate list may vary according to a time point when each coding block performing inter prediction is referred to. Since motion information of the candidate list may be added, deleted, or changed, information or configuration included in the candidate list may vary according to a time point when inter prediction is performed. That is, when the time point when each region performing inter prediction refers to the candidate list is varied, the referenced information may be varied. Since the candidate list according to the present invention may be updated by a result of performing inter prediction, inter prediction must be performed sequentially.

In the following description, a region consisting of one or more coding blocks may be defined as a shared region. When inter prediction is performed, the coding blocks included in the shared region may share a candidate list configured at a specific time earlier than a time point of encoding or decoding all the coding blocks included in the shared region. Here, the shared region may be configured through at least one unit or a set of units of a CTU, a CU, and a PU.

Accordingly, inter coding may be performed independently or in parallel for each coding block in the corresponding shared region. When inter prediction is performed by referring to a candidate list independently or in parallel in a shared region, each coding block included in the shared region and performing inter prediction may refer to a candidate list that is previously configured. Herein, the pre-configured candidate list may mean a candidate list configured before encoding or decoding is started.

Herein, the coding blocks in the shared region may share the pre-configured candidate list or may share candidates of the candidate list generated using the candidate list. A candidate of a candidate list suitable for each coding block may be separately generated by referencing the pre-configured candidate list during inter prediction of coding blocks included in the shared region. That is, when the present method is applied, the pre-configured candidate list referenced by the coding blocks included in the shared region may be shared, and candidates of the candidate list may be independently generated. Alternatively, coding blocks included in the shared region may share not only the pre-configured candidate list but also candidates of candidate lists derived from the shared candidate list.

After prediction is performed in the coding blocks included in the corresponding shared region, the candidate list may be updated independently or in parallel using motion information or prediction information generated in each of the coding blocks. Herein, the candidate list may be updated in a predetermined order after all predictions in all the coding blocks included in the shared region are completed. Accordingly, the encoder and the decoder may generate the same candidate list when encoding/decoding the current block.

For example, when the current block is encoded/decoded through the triangular partition mode, the current block may be divided into two triangular regions. Herein, information about a partition direction for partitioning the current block into two triangular regions may be encoded/decoded. In order to encode/decode each of the two regions divided into triangular regions, motion information for encoding/decoding each region may be selected from the candidate list. Herein, the two triangular region obtained by performing triangular partition may share a candidate list of blocks before being divided.

When the current block is encoded/decoded by the triangular partition mode, the first motion information and the second motion information may be determined in the shared candidate list through the first index and the second index for the current block. The encoder or the decoder may derive a first prediction block for the current block using the first motion information and a second prediction block for the current block using the second motion information.

The encoder or decoder may generate a final prediction block for the current block by weighting the first prediction block and the second prediction block. Herein, the weighted sum of the prediction blocks may be performed by weighting the first region with respect to the first prediction block and weighting the second region with respect to the second prediction block.

FIGS. 35 to 39 are diagrams illustrating a method of updating and sharing a candidate list according to some embodiments of the present invention.

Figure 35:
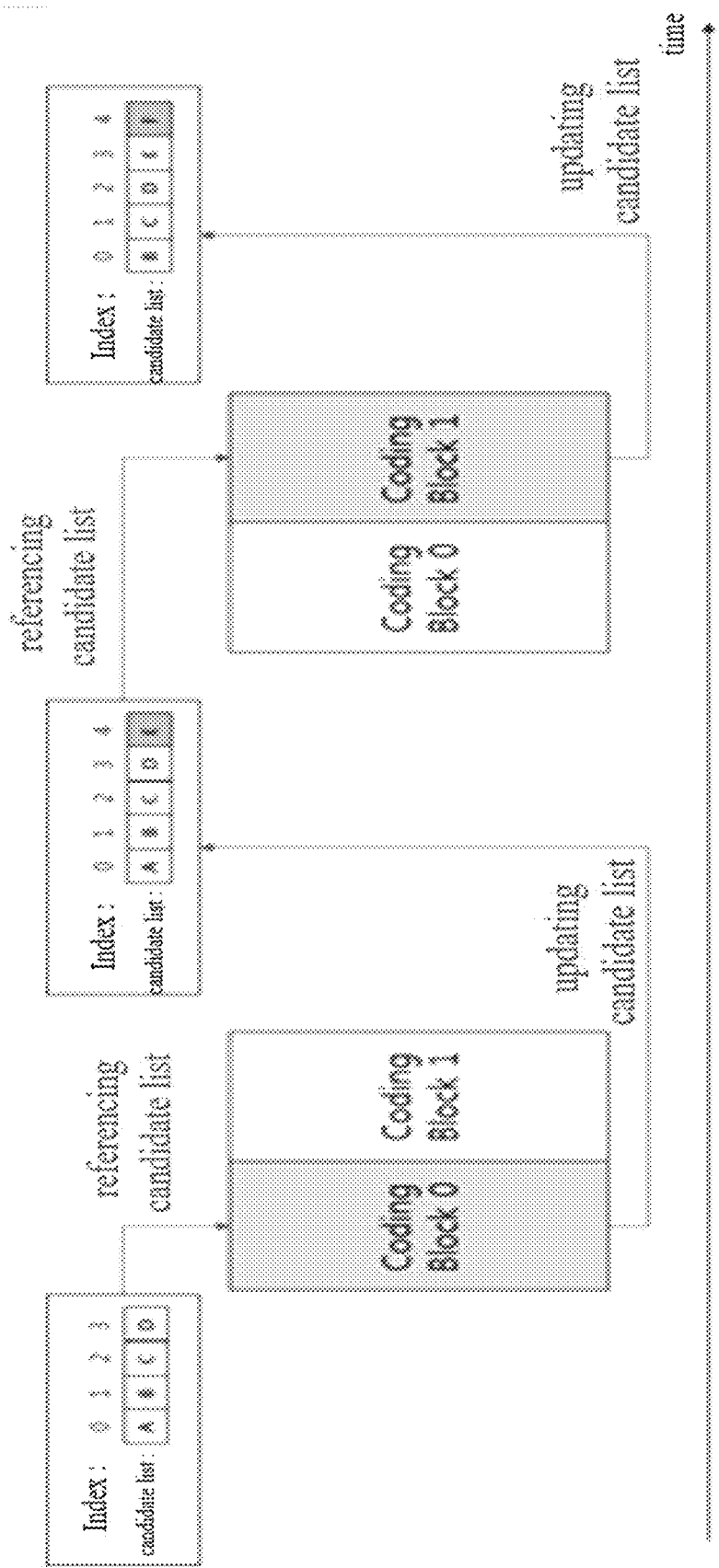
FIGS. 35 to 39 are diagrams illustrating a method of updating and sharing a candidate list according to some embodiments of the present invention.

FIG. 35 shows an example in which a candidate list is updated over time, and an example of a candidate list referenced by a coding block. FIG. 35 illustrates a case in which a coding block 0 is encoded/decoded and then a coding block 1 is encoded/decoded. The coding block shown in gray means a coding block that is currently encoded/decoded. The coding block 0 may be encoded/decoded with reference to a candidate list formed before a time point in which the coding block 0 is encoded/decoded.

Thereafter, the candidate list may be updated through motion information of the encoded/decoded coding block 0. The updated candidate list may be referenced when encoding/decoding the coding block 1, which is the next coding block. The motion information of reconstructed coding block 1 may be used to update the candidate list again. The updated candidate list may then be referenced again in a following coding block. Therefore, in order to encode/decode the coding block 1, the coding block 0 needs to be encoded/decoded first.

Figure 36:
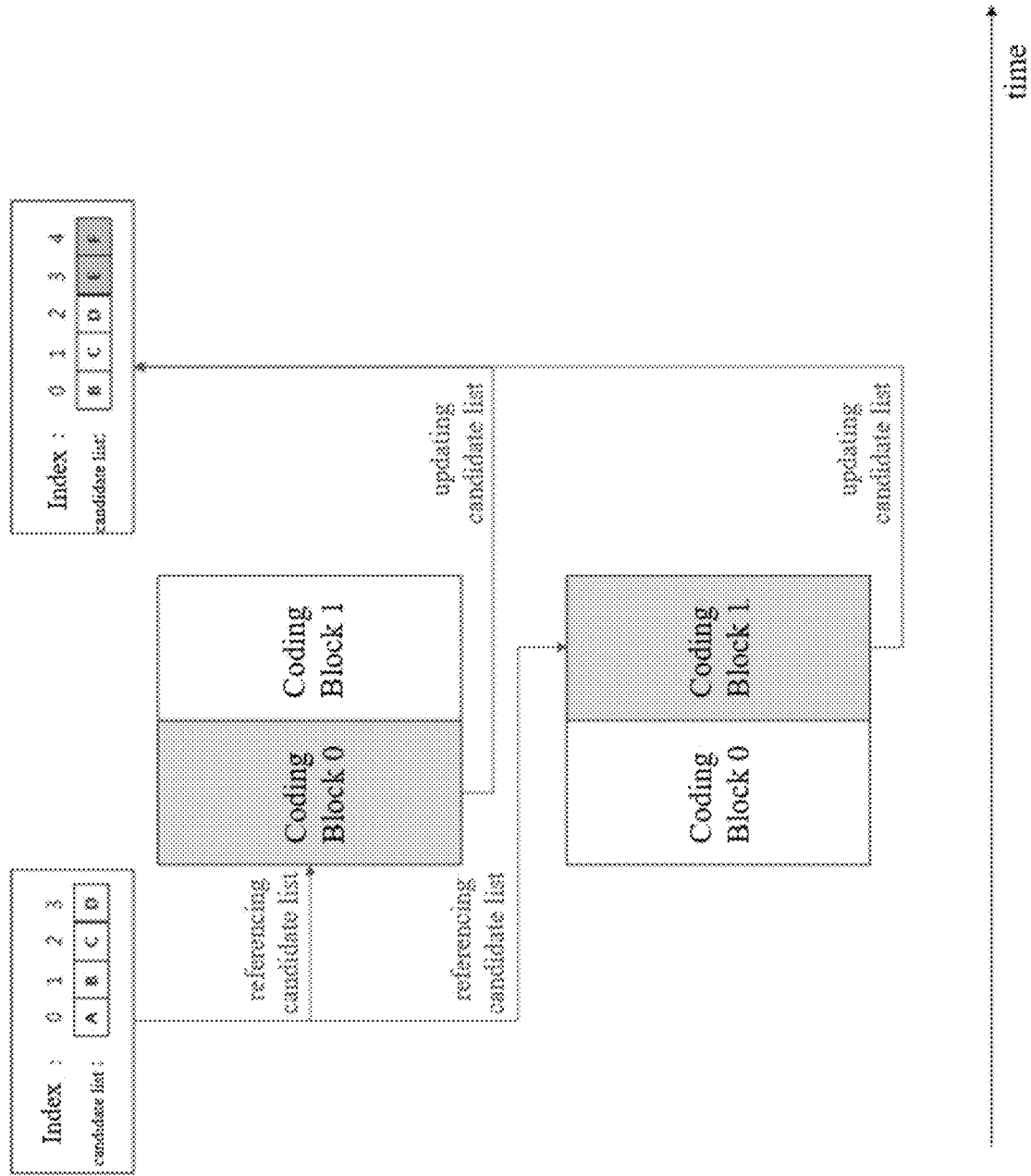

FIG. 36 illustrates a case in which a candidate list is updated over time and a method of referring to a candidate list in each block when a coding block 0 and a coding block 1 constitute one shared area. Since the coding block 0 and the coding block 1 are included in one shared area, the encoder or decoder may perform prediction using the shared candidate list for the coding block 0 and the coding block 1. Accordingly, unlike the example of FIG. 35, the encoder or the decoder may perform inter prediction on the coding block 0 and the coding block 1 independently or in parallel.

FIG. 36 shows a state in which prediction is performed in parallel using the same candidate list that is previously reconstructed at the same time. Unlike the example of FIG. 35, since the previously reconstructed candidate list is shared, the coding block 1 may refer to the candidate list at a time point required for encoding/decoding even if the coding block 0 is not encoded/decoded.

In the example of FIG. 36, since both coding block 0 and coding block 1 are encoded/decoded, it is shown that motion information "E" generated from the coding block 0 and motion information "F" generated from the coding block 1 are reflected (updated) in the candidate list. Herein, the candidate list may be updated at a time point when encoding/decoding of the shared area is completed. FIG. 36 illustrates a case in which the size of the candidate list is 5, and shows an example in which one motion information A of the candidate list is deleted according to the update of the motion information.

Figure 37:
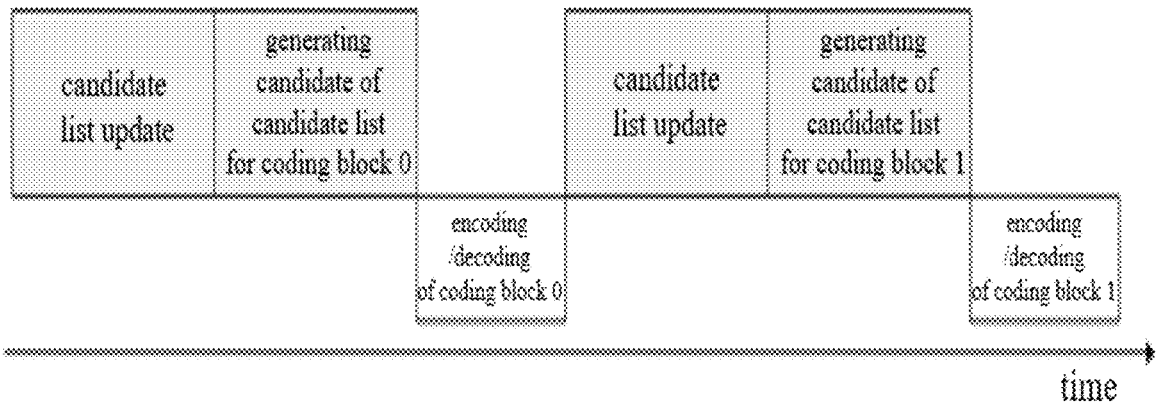

FIG. 37 shows an example of updating a candidate list and encoding/decoding coding blocks 0 and 1 using the updated candidate list over time. A candidate of a candidate list suitable for the current coding block may be generated from the updated latest candidate list, and the coding block may be encoded/decoded with reference to the candidate of the generated candidate list. The motion information of the newly encoded/decoded coding block is used to update the candidate list.

In the example of FIG. 37, the coding block 0 may be encoded/decoded earlier than the coding block 1. Accordingly, candidates for candidate lists matching the coding block 0 may be generated using the updated candidate list before coding block 0 is encoded/decoded, and the coding block 0 may be encoded/decoded based on the candidate list. The motion information encoded/decoded in coding block 0 may be used to update the candidate list, and a candidate list for coding block 1 may be generated using the updated candidate list. The coding block 1 may be encoded/decoded using the candidate of the candidate list generated for the coding block 1. That is, according to FIG. 37, the coding blocks 0 and 1 may be sequentially encoded/decoded.

Figure 38:
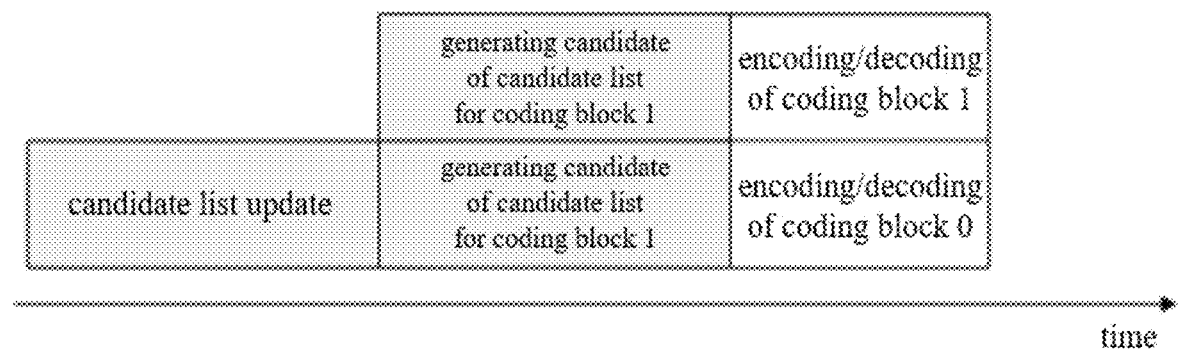
Figure 38:
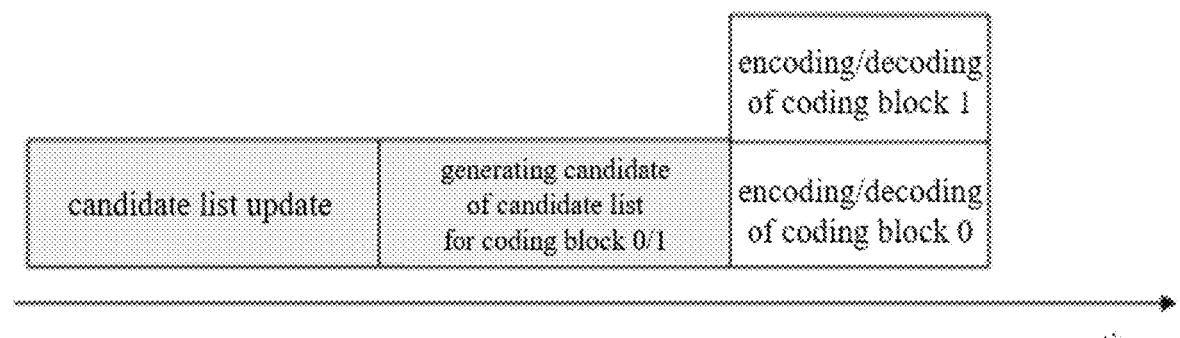

FIG. 38 illustrates an example of updating a shared candidate list over time and encoding/decoding a coding block in each shared area using the updated shared candidate list. In this example, the shared area may be composed of coding block 0 and coding block 1. The coding block 0 and the coding block 1 may generate candidates using a candidate list updated before two coding blocks in a shared region are encoded/decoded. Accordingly, the encoder or the decoder may perform prediction independently or in parallel with respect to coding block 0 and coding block 1.

Unlike the example of FIG. 37, since the shared candidate list is used in FIG. 38, even if the coding block 0 is not encoded/decoded first, the coding block 1 may be encoded/decoded together with the coding block 0. That is, according to the example of FIG. 38, the coding block 0 and the coding block 1 may be encoded/decoded in parallel at the same time.

According to FIG. 38(a), the coding block 0 and the coding block 1 use the shared candidate list, but may be encoded/decoded using candidates of different candidate lists. Referring to FIG. 38(b), the coding block 0 and the coding block 1 may generate candidates of a common candidate list using the shared candidate list, and may be encoded/decoded using the generated same candidate.

Each region in which encoding/decoding is performed independently or in parallel may be composed of a plurality of blocks, and prediction may be performed for each block. Herein, prediction may be performed by generating respective candidate lists in each region.

For example, when tiles A and tiles B constituting one picture are encoded/decoded in parallel, each region may be encoded/decoded using candidate lists different from each other. For example, the encoder or decoder may store motion information generated in a block belonging to tile A in a candidate list of tile A. In addition, the encoder or decoder may store motion information generated in the block belonging to the tile B in the candidate list of the tile B.

A candidate list newly generated by each region to be encoded/decoded independently or in parallel may be initialized or succeeded to by referencing or copying a candidate list that is previously configured. After initialization, the candidate list of each region may be updated only by the information in each region. Accordingly, each region may be encoded/decoded without depending on each other. Hereinafter, such a candidate list is defined as a sub candidate list.

Figure 39:
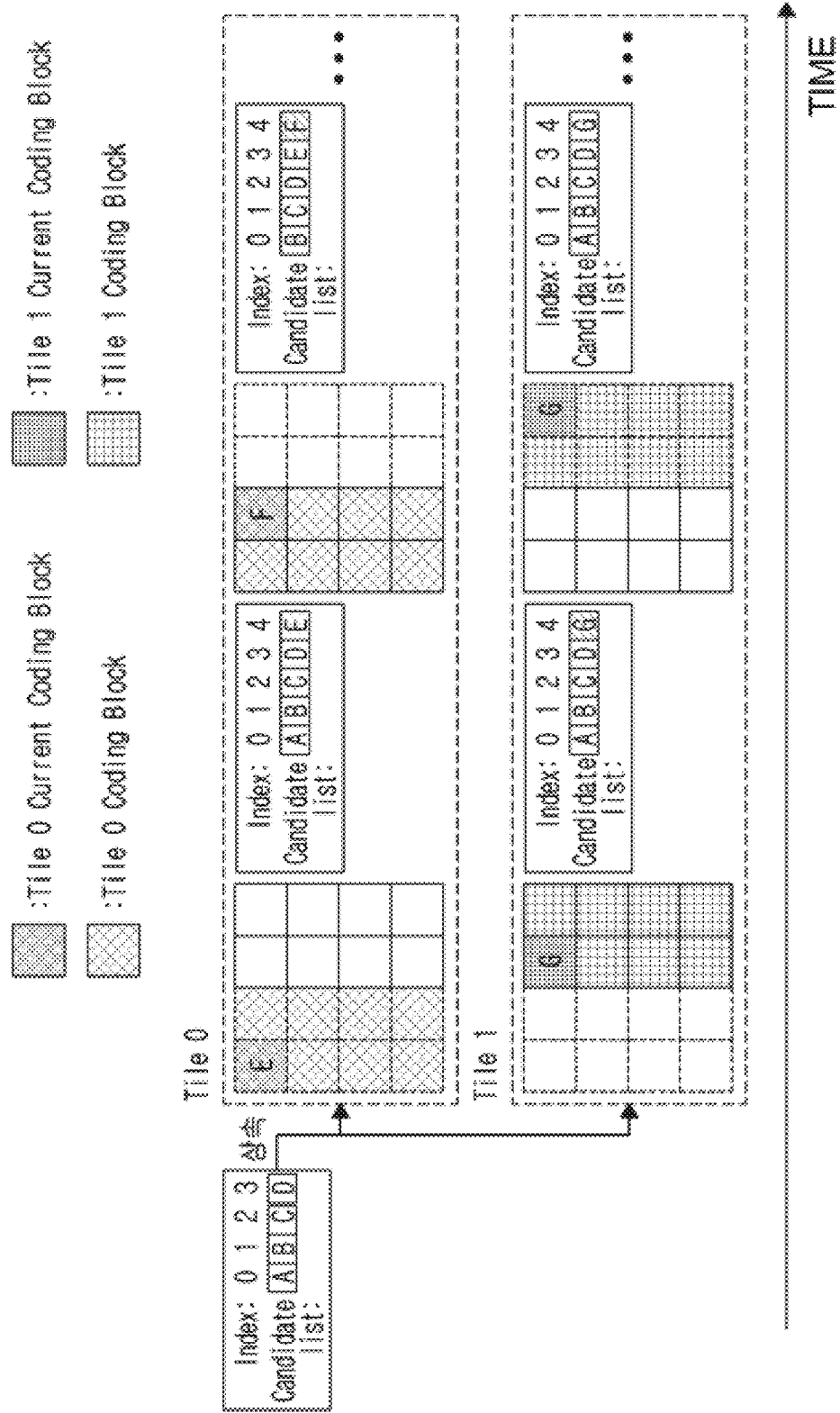

FIG. 39 shows an example in which one or more tiles composed of one or more coding blocks are encoded/decoded in parallel. The encoder or decoder may succeed to the reconstructed shared candidate list for each tile as the initial value of the candidate list of each tile. Sub candidate lists different from each other may be generated for each tile on the basis of the inherited candidate list.

Herein, at least one of information (flag, index, indicator, etc.) indicating whether the reconstructed shared candidate list is succeeded to as the candidate list initial value of each tile, picture information referenced for initialization, tile information referenced for initialization, and information about the number of pieces of motion information referenced for initialization may be signaled through at least one of a sequence parameter set, a picture parameter set, and a slice header.

According to FIG. 39, the encoder or decoder may generate respective sub candidate lists for tile 0 and tile 1 by succeeding to the reconstructed shared candidate list. A first coding block included in tile 0 may be encoded/decoded using the inherited candidate list. Herein, e candidate list of tile 0 may be updated using the derived motion information E. After encoding/decoding of the first coding block is completed, motion information E of the first block may be added to the sub candidate list.

Then, the second coding block of tile 0 may be encoded/decoded with reference to the updated sub candidate list including the motion information E. The encoder or decoder may derive motion information F of the block and perform prediction on the block on the basis of the motion information F. Herein, the sub candidate list of tile 0 may be updated again using the derived motion information F.

FIG. 39 illustrates a case in which the size of the candidate list is 5, and shows an example in which one piece of pre-stored motion information A is deleted and motion information F is added in the candidate list according to the update of the motion information. Herein, the motion information deleted from the sub candidate list may be motion information having the lowest or highest index or motion information having the lowest prediction potential.

The encoder or decoder encodes/decodes the first coding block through the inherited candidate list of tile 1, and may update the candidate list of tile 1 through motion information G obtained from the first coding block that is encoded/decoded. Accordingly, the sub candidate list updated after the encoding/decoding of the first coding block is completed additionally includes the motion information G of the first block. Even though succeeding to the shared candidate list, after the prediction for each tile is performed, the sub candidate lists of tile 0 and tile 1 may include motion information different from each other.

Then, the second coding block of the tile 1 may be encoded/decoded with reference to the updated sub candidate list including the motion information G. Herein, the sub candidate list of tile 1 may be updated again using the derived motion information G.

Since the motion information G is already added to the sub candidate list of tile 1 by the previously encoded/decoded motion information, the addition of the redundant motion information G may be omitted. As described above, the sub candidate list of each tile succeeding to the shared candidate list may be formed in a different form as each coding block is encoded/decoded. Since cross-reference is not required between different tiles, each tile may be encoded/decoded independently or in parallel.

Hereinafter, a method of improving the candidate list prediction efficiency described above through an UPU configuration will be described.

By using the candidate list according to the present invention, motion information generated in the previous block may be stored to be accumulated and then managed. The motion information accumulated in the candidate list improves the coding efficiency in such a way to refer to motion information of a region that may not be referred to by the existing prediction method.

However, motion information generated at an excessively far position has a problem in that prediction efficiency may be lowered in predicting a current block. In detail, when the size of the candidate list is limited, a situation in which only motion information generated at an excessively far position is stored in the candidate list may cause a decrease in coding efficiency. Herein, the proper configuration of the UPU can solve or mitigate this problem.

Figure 40:
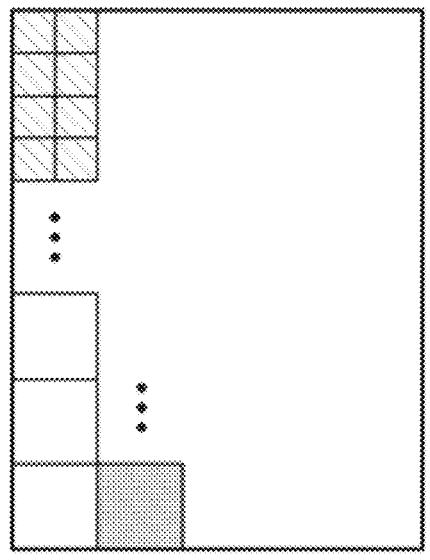
FIG. 40 is a diagram illustrating a candidate list composed of a single UPU and a candidate list composed of a plurality of UPUs according to an embodiment of the present invention.
Figure 40:
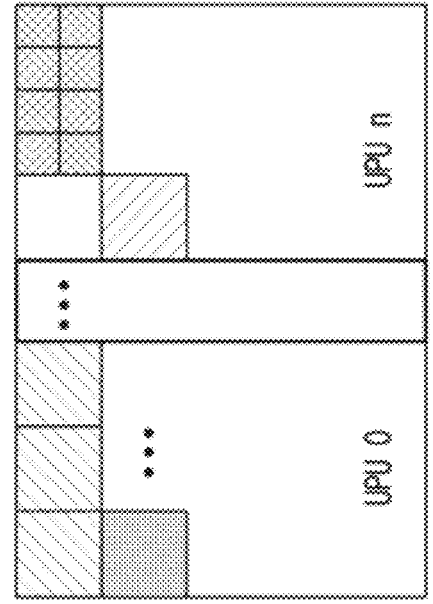

FIG. 40 is a diagram illustrating a candidate list composed of a single UPU and a candidate list composed of a plurality of UPUs according to an embodiment of the present invention.

FIG. 40(a) shows an example of a candidate list structure composed of a single UPU. FIG. 40 shows an example in which a UPU is allocated on a picture basis and the size of the candidate list is limited to eight. The coding order is from left to right, and a large number of block partitions occur at the right end of the picture, and motion information of the rightmost eight coding blocks is stored in the candidate list. Herein, the current block is present at the left end so that the current block is too far from the coding block referenced by the motion information stored in the candidate list to reduce the coding efficiency.

FIG. 40(b) illustrates an example of a UPU configuration to which an embodiment according to the present invention is applied. The encoder or decoder may vertically divide the picture so that the picture includes n UPUs. Herein, since each UPU has a separate candidate list, the current block may be encoded/decoded with reference to the candidate list of UPU 0. According to the UPU configuration, even when a row of coding blocks is changed, the distance between the current block and the coding block referenced by the motion information may be closer than that in FIG. 40(a). Similarly, when the future block is encoded, the candidate list of UPU n is referenced, thereby preventing the case of referencing an encoding region that is excessively far away.

That is, the encoder or the decoder may use different candidate lists according to the UPU to which the location of the current block belongs. Accordingly, the encoder or the decoder may prevent a decrease in the coding efficiency. Herein, a candidate list belonging to each UPU may refer to a previously generated candidate list belonging to UPUs different from each other. For example, a candidate list of UPU n may be generated with reference to at least one of UPU 0 through UPU n−1.

Figure 41:
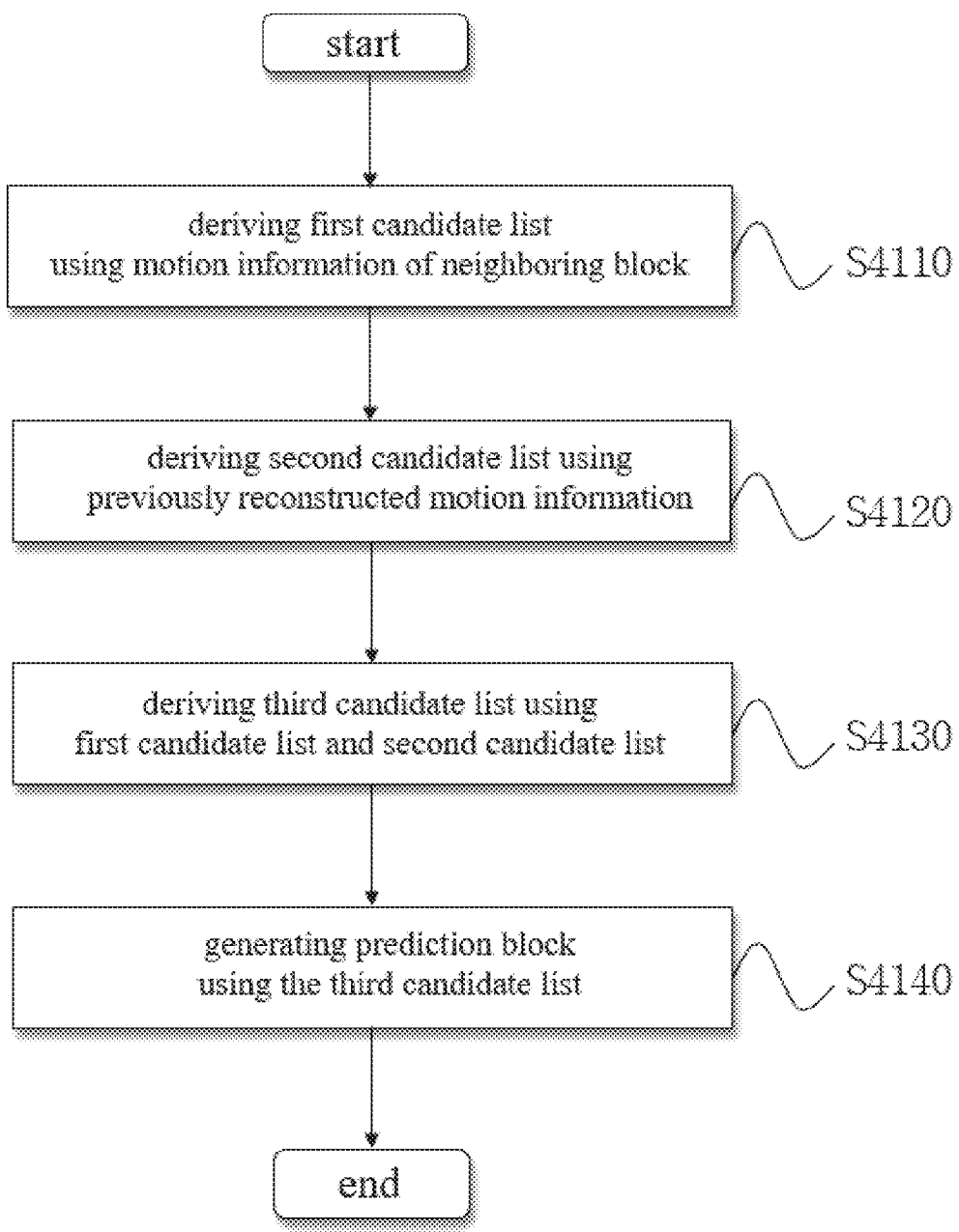
FIG. 41 is a flowchart illustrating a decoding method according to an embodiment of the present invention.

FIG. 41 is a flowchart illustrating a decoding method according to an embodiment of the present invention.

Referring to FIG. 41, a decoding method according to the present invention may include deriving a first candidate list using motion information of a neighboring block (S4110), deriving a second candidate list using previously reconstructed motion information (S4120), deriving a third candidate list using the first candidate list and the second candidate list (S4130), and generating a prediction block using the third candidate list (S4140).

Here, the previously reconstructed motion information may be motion information of a decoded coding block immediately before decoding of the current block.

Figure 42:
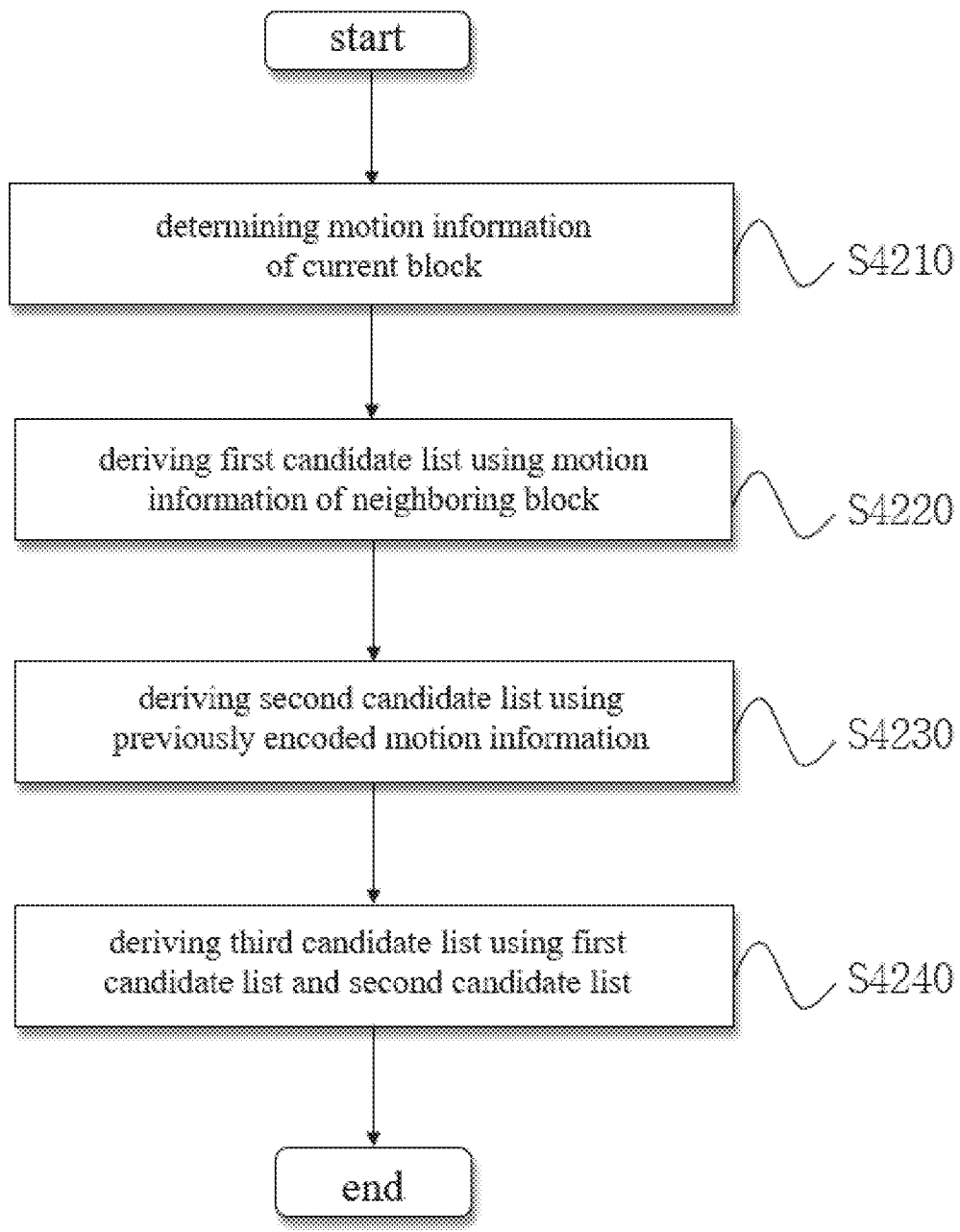
FIG. 42 is a flowchart illustrating an encoding method according to an embodiment of the present invention.

FIG. 42 is a flowchart illustrating an encoding method according to an embodiment of the present invention.

Referring to FIG. 42, the encoding method according to the present invention may include determining motion information of a current block (S4210), deriving a first candidate list using motion information of a neighboring block (S4220), and deriving a second candidate list using the encoded motion information (S4230), and deriving a third candidate list using the first candidate list and the second candidate list (S4240).

At least one or a combination of at least one of the above-described embodiments may be utilized to perform the encoding/decoding method illustrated in FIGS. 41 and 42. For example, the first candidate list may mean the existing candidate list and the second candidate list may mean a candidate list according to the present invention. That is, the first candidate list may be at least one of candidate lists used in AMVP mode, merge mode, and IBC mode.

Here, the pre-coded motion information may be motion information of a coding block encoded immediately before encoding of the current block.

Hereinafter, a method of encoding/decoding an image using an adaptive intra picture prediction mode list will be described.

In image compression, six-bit or more data are required to represent 32 or more intra picture prediction modes. Seven-bit or more data are required to represent 64 or more intra prediction modes. The image encoding/decoding method uses most probable mode (MPM) to reduce the bits representing the intra prediction modes.

Figure 43:
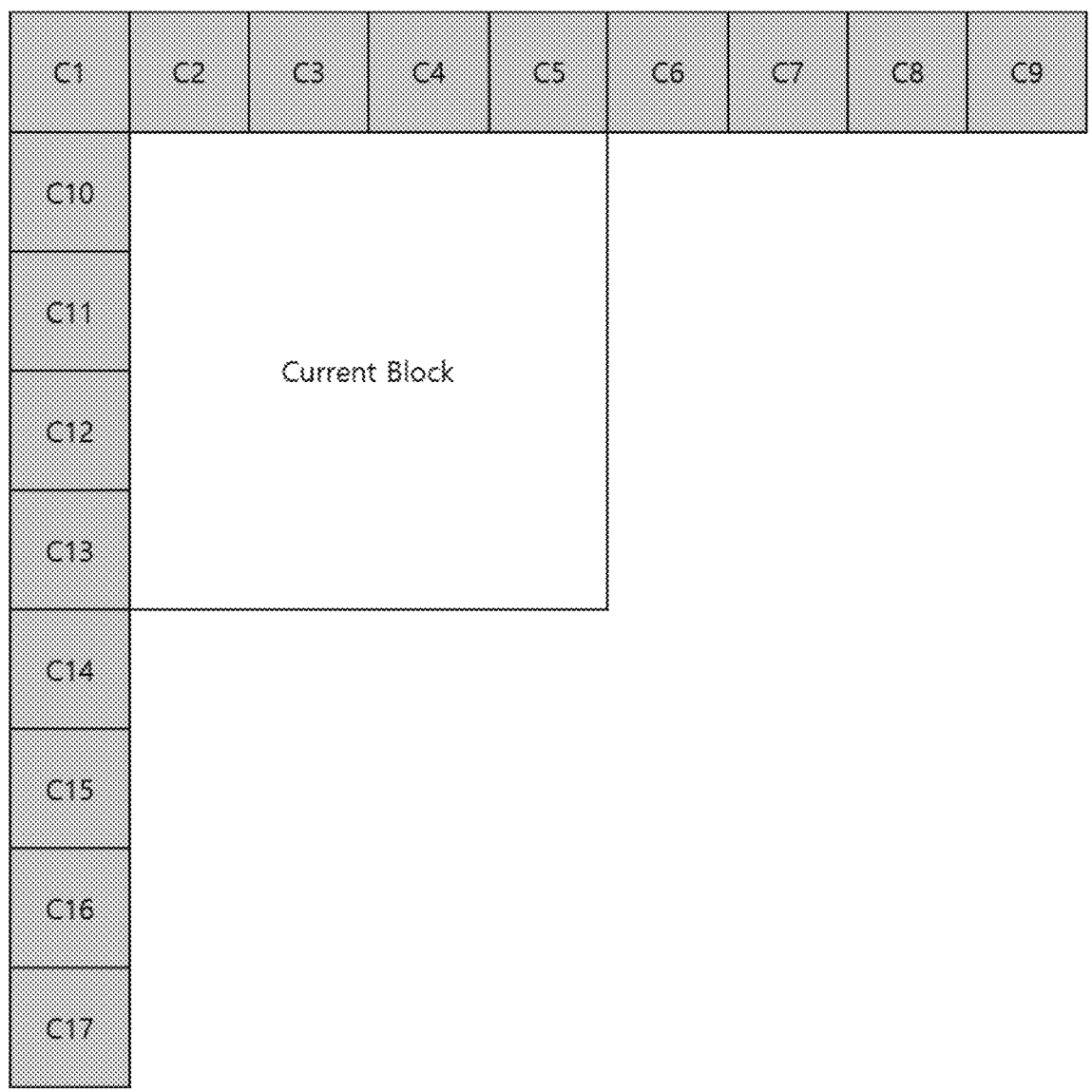
FIGS. 43 and 44 are diagrams illustrating the MPM candidates.
Figure 44:
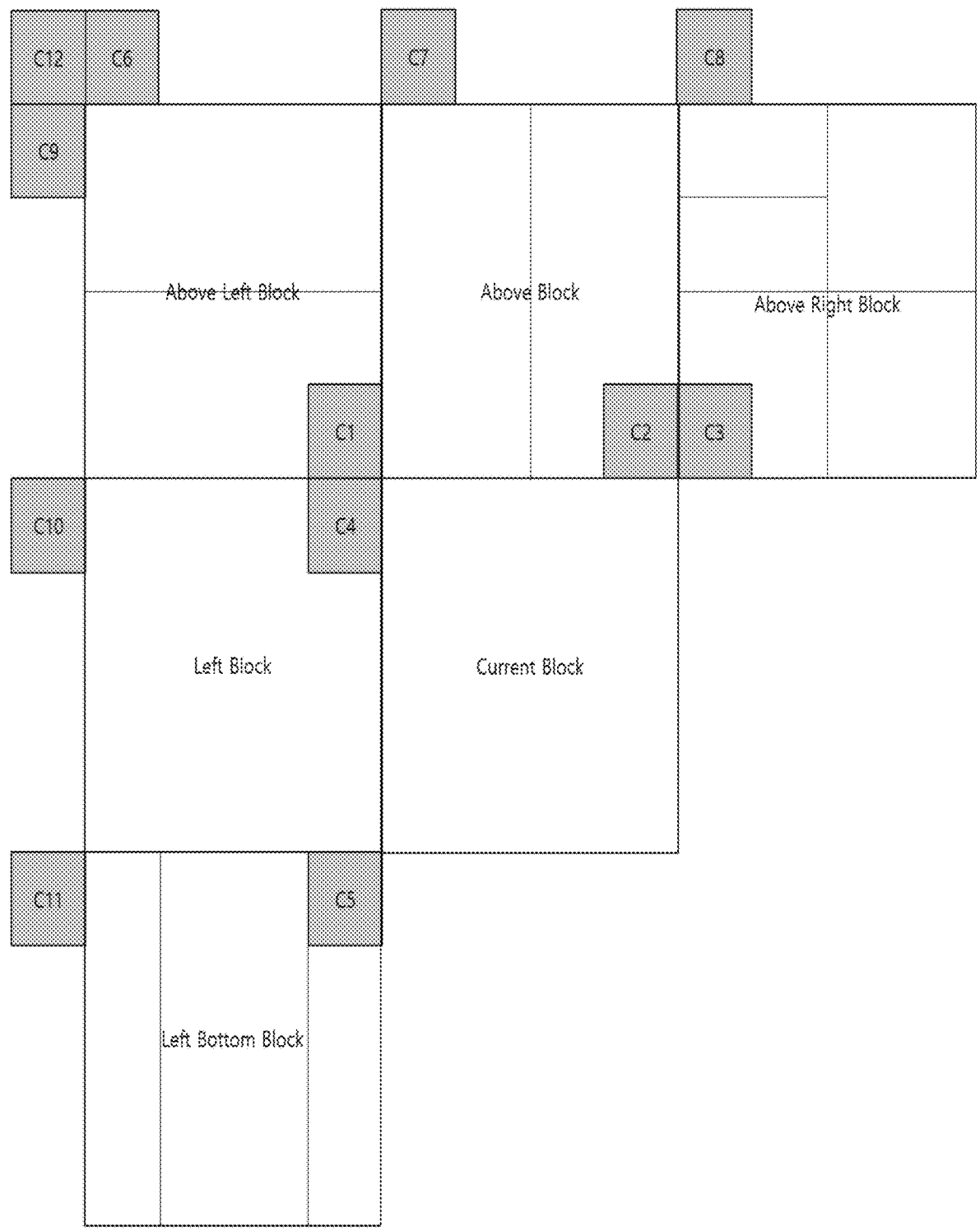

FIGS. 43 and 44 are diagrams illustrating MPM candidates.

FIG. 43 is a diagram illustrating an example of a candidate that may be used as a current block and an MPM, wherein gray shaded blocks corresponding to C1 to C17 are regions in which a neighboring block exists and may be used as an MPM. In image compression technology, the encoder configures an MPM candidate and an MPM list by deriving the intra prediction mode from the neighboring blocks of the current block, and when the same prediction mode as the intra prediction mode determined in the current block is present in the MPM list, it is possible to reduce the amount of representation bits in the intra prediction mode by transmitting the index of the MPM candidate instead of the intra prediction mode of the current block.

FIG. 43 shows an example of a candidate that may be used in the MPM, all or part of the candidates of C1 to C17 may be used in the MPM according to an image compression technique, and according to the prediction mode of the neighboring block, at least one of a DC prediction mode, a PLANAR prediction mode, and a directional intra prediction mode may be added to the MPM list. In addition, the directional mode obtained by adding or subtracting an offset to the directional intra prediction mode of the neighboring block may be added to the MPM list.

In addition, as shown in the example of FIG. 44, it is possible to configure the MPM list by deriving an intra prediction mode from a block of a neighboring region instead of an adjacent region of the current block.

Figures 45, 46:
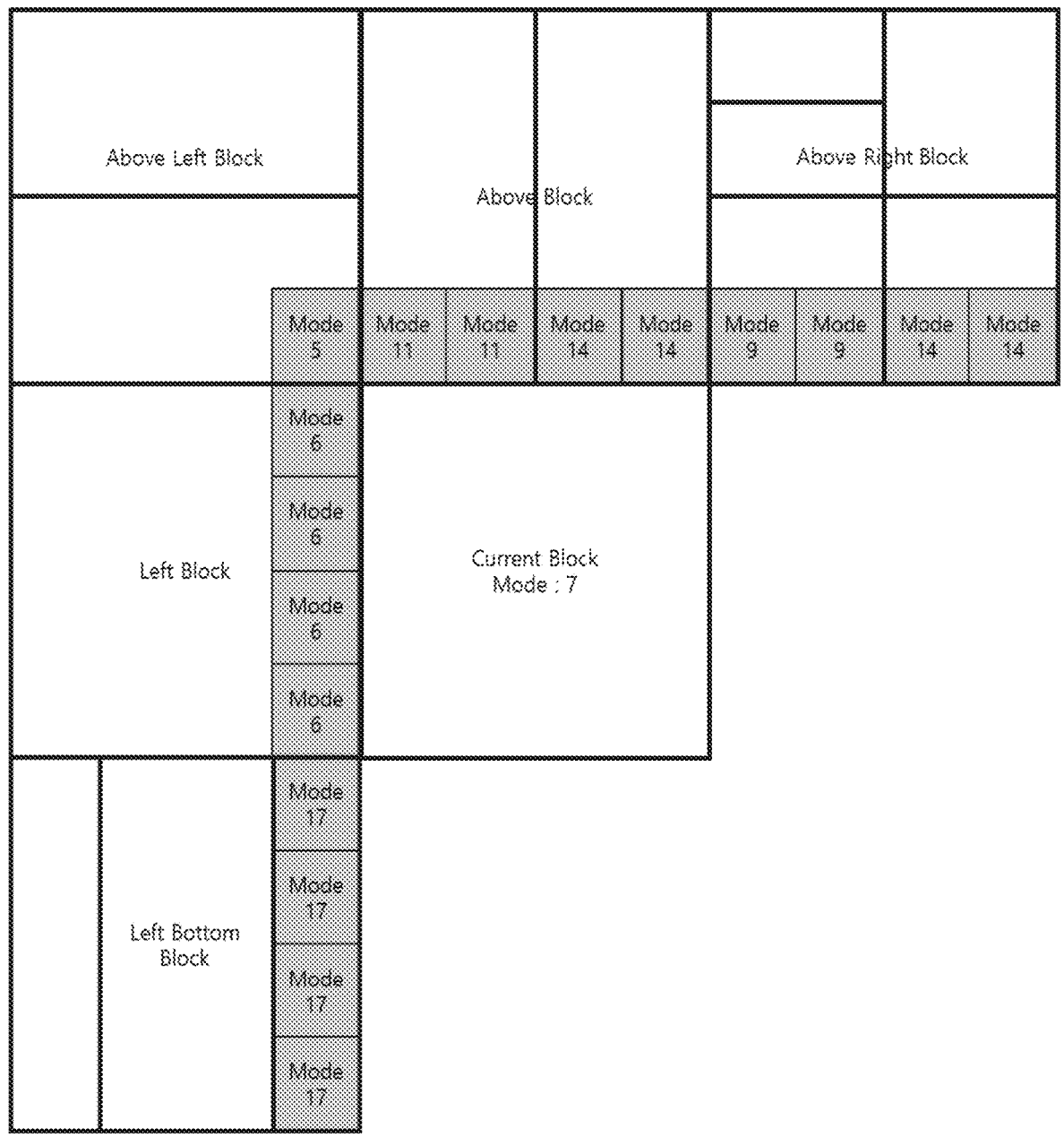
FIG. 45 is a diagram illustrating an example of intra prediction mode selection.
FIG. 46 is a diagram illustrating a case in which an intra prediction mode of a current block is not included in an MPM list.

FIG. 45 is a diagram illustrating an example of intra prediction mode selection, and FIG. 46 is a diagram illustrating a case where an intra prediction mode of a current block is not included in the MPM list.

FIG. 45 is a diagram representing an example of an intra prediction mode of a current block and a neighboring block in an image encoding/decoding process, wherein gray shaded blocks are regions included in a neighboring block, and numbers for each region mean an intra prediction mode value of the neighboring region including the corresponding region. When the neighboring blocks of the current block as shown in FIG. 45 do not include the same prediction mode as the current block, and when the intra prediction mode of the current block is not included in the MPM list configured as shown in FIG. 46, the MPM for the current block is not selected, but the prediction mode of the current block may be directly signaled and transmitted.

As an example, when the MPM is not selected, as a method of compressing and transmitting the prediction mode of the current block, there is a method of transmitting the same by classifying the prediction mode of the current block into a selected mode and a non-selected mode (remaining mode). For remaining intra prediction mode except the intra prediction mode numbers occurring for the MPM candidate in all intra prediction modes capable of occurring, the selected mode compresses and transmits the selected mode flag and the 1/N intra prediction mode number when the intra prediction mode is N multiples (N is an integer greater than or equal to 2), and compresses and transmits the non-selected mode together with the selected mode flag when it is not a multiple of N. Meanwhile, in the case of using the non-selected mode, the encoder may perform transmission by coding an intra prediction mode (remaining intra mode coding) that is not included in the MPM using a method such as truncated binary coding.

In addition, when MPM is not selected, log N representation bits are required when representing N prediction modes (N is an integer of 2 or more) in order to represent the intra prediction mode of the current block. In addition, there is a problem that more bits are generated than the MPM index even though the selected mode method is used.

According to the present invention, it is possible to increase the MPM selectivity by using an intra prediction mode list. According to some embodiments of the present invention, there are proposed a method of signaling an index of an adaptively configured intra prediction mode list when the MPM is not selected and a method of applying the intra prediction mode list to the selected mode and the non-selected mode to reduce the representation bit of the prediction mode. Since the intra prediction mode list according to the present invention can always be referred to by the image encoder and decoder without additional signaling, the intra prediction mode list may be used as reference information in the encoding/decoding processes other than the above-described MPM, selected mode, and non-selected mode.

Hereinafter, a method of configuring an intra prediction mode list according to the present invention will be described.

After performing the intra prediction by applying various intra prediction modes, the encoder determines a prediction mode having the highest compression ratio among them as an optimal prediction mode, and the image decoder perform prediction and reconstruction by using the intra prediction mode determined by the encoder. Since the image encoder and the decoder perform prediction and reconstruction using the same prediction mode, the image decoder should also be able to derive a list of the intra prediction modes derived from the encoder. Since the decoder performs the same prediction through the intra prediction mode determined by the encoder, when the rules for configuring the intra prediction mode list of the encoder and the decoder are the same, the encoder and the decoder may configure the intra prediction mode list in the same way without additional signaling. The intra prediction mode list configured in the encoder and the decoder may be used when deriving a prediction mode.

Figure 47:
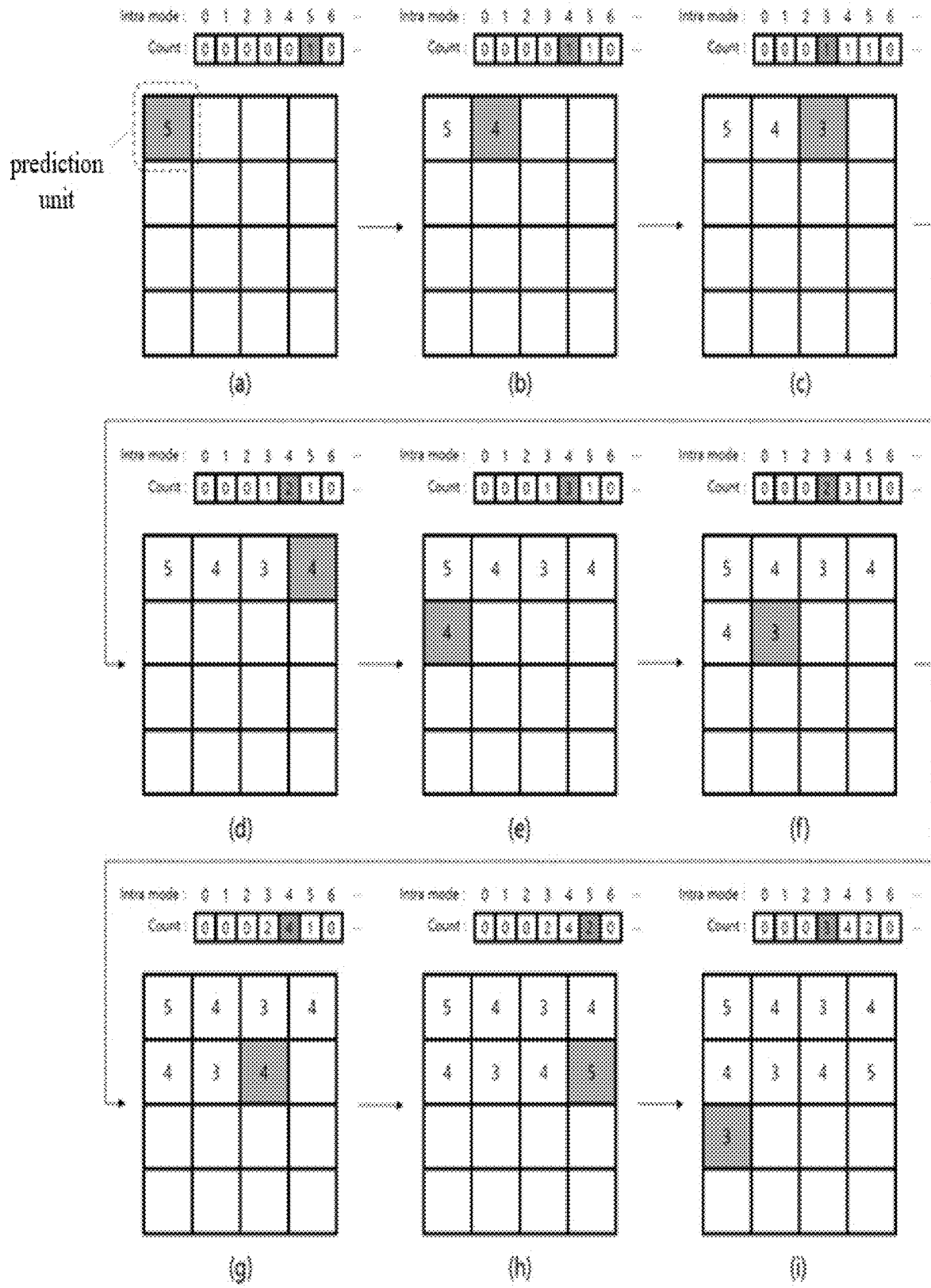
FIG. 47 is a diagram illustrating a method of configuring an intra prediction mode list according to an embodiment of the present invention.

FIG. 47 is a diagram illustrating a method of configuring an intra prediction mode list according to an embodiment of the present invention.

FIG. 47 shows an example of a process of configuring an intra prediction mode list in an encoder and a decoder. According to FIG. 47, the intra prediction mode list may be configured on the basis of the frequency of occurrence of the intra prediction mode. In FIG. 47, each of squares composing of 16 blocks represents a unit coding block deriving each prediction mode, gray shades represent a current block, and values in the shades mean values updated in the count list checking the frequency of occurrence of each intra prediction mode (Intra Mode).

The index in the count list means a number of intra prediction modes. Here, the number of the intra prediction modes may mean a value representing the intra prediction mode. That is, in FIG. 47, a number in each prediction unit represents a value indicating an intra prediction mode, and a dotted arrow represents a temporal flow. That is, the intra prediction may be performed on the current block in the order of (a) to (i) in FIG. 47.

Since the value of the intra prediction mode determined in FIG. 47(*a*) is five, a value 5 of the intra prediction mode of the count list is increased by one. Subsequently, since the value of the intra prediction mode determined in FIG. 47(*b*) is four, a value 4 of the intra prediction mode of the count list is updated. Similarly, the value of the intra prediction mode in the count list may be increased according to the intra prediction mode determined in FIGS. 47(*c*) to (*i*), respectively. The intra prediction mode list used for the prediction mode signaling in the intra prediction may be separately configured with reference to the configured count list or may be implemented in such a way to directly refer to the count list.

FIG. 47 illustrates an example of a process of deriving an intra prediction mode list, and an encoder or decoder may configure an intra prediction mode list by calculating cost in a method other than count. In addition, a method of deriving an intra prediction mode list may be implemented differently. For example, the cost may be determined using the residual signal for each intra prediction mode. As another example, the intra prediction mode list may be configured by combining the occurrence frequency and the cost result of the intra prediction mode.

FIG. 48 is another diagram illustrating a method of configuring an intra prediction mode list according to an embodiment of the present invention.

FIG. 48 illustrates an example of configuring an intra prediction mode list according to the determined intra prediction mode. In the example of FIG. 48, since neighboring blocks adjacent to the top and left of each block and the corresponding blocks are different from each other in a prediction mode, MPM may not be utilized. Accordingly, according to the method in the related art, the encoder must signal all prediction modes, and when 35 modes are used, 5 bits should be allocated to each prediction mode to represent 32 modes that are not included in the MPM list. Therefore, in order to encode/decode the region of FIG. 48, a total of 80 bits should be signaled for each 5 bits in 16 blocks.

Meanwhile, according to the present invention, the encoder or the decoder may configure an intra prediction mode list of a predetermined length. When the intra prediction mode for the current block is present in the intra prediction mode list, the encoder or decoder may reduce the amount of bits required by signaling an index in the intra prediction mode list for the intra prediction mode.

FIG. 48 shows an example of configuring an intra prediction mode list having a length of 4 on the basis of count, which is a frequency of occurrence of a prediction mode. After updating the count for each prediction mode, the encoder or the decoder assigns the index of the intra prediction mode list from the value of 0 in order of the highest count (in order of values 4, 3, and 5 of the intra prediction mode), thereby configuring the intra prediction mode list. Also, the encoder or decoder may generate an intra prediction mode list by adding or subtracting a predetermined weight to the count for some prediction modes.

In the example of FIG. 48, when only the index for the intra prediction mode list is signaled, since the index of the list of length 4 is signaled, the encoder or decoder may signal the intra prediction mode using 2 bits per block, and signal the intra prediction mode using 32 bits for 16 blocks. That is, by using the intra prediction mode list of the present invention, it is possible to increase the image coding efficiency by greatly reducing the representation bits of the prediction mode.

Figure 49:
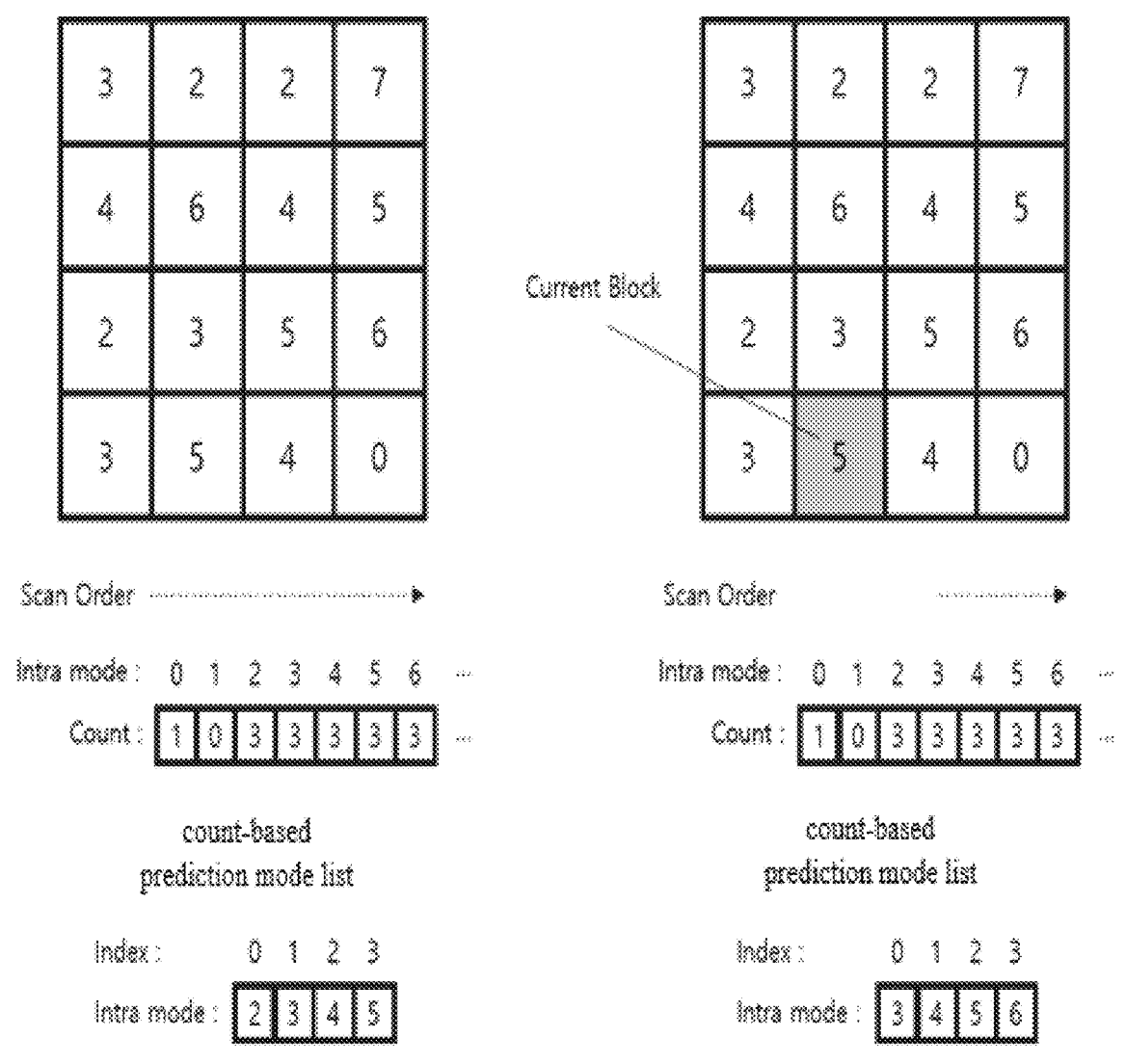

FIG. 49 is a diagram illustrating a method of configuring a count-based intra prediction mode list according to an embodiment of the present invention.

When the count values are the same for all intra prediction modes, the encoder or decoder sequentially configures the intra prediction mode until the intra prediction mode list is filled, or uses a prediction mode similar to the prediction mode of the neighboring block to configure the intra prediction mode.

FIG. 49 shows an example of a method of configuring an intra prediction mode list when the same count occurs in a count-based intra prediction mode list. Referring to FIG. 49, the count for values 2, 3, 4, 5, and 6 of the intra prediction mode may have the highest value of three identically. In this case, as shown on the left of FIG. 49, the encoder or decoder sequentially performs scanning from 0 so that the prediction modes generated with the same count may be added to the intra prediction list until all the intra prediction mode lists are filled.

Alternatively, as shown in the right of FIG. 49, the encoder or decoder preferentially adds the prediction modes of the left and top neighboring blocks of the current block to the prediction mode having the same count value, thereby configuring the intra prediction mode list. Even if the count does not have the highest value, the encoder or the decoder may apply the priority to the prediction modes of the left and top adjacent blocks with respect to the prediction mode having the same count.

FIG. 50 is a diagram illustrating a method of configuring a cost-based intra prediction mode list according to an embodiment of the present invention.

As another example, even if the count is the same, the encoder or the decoder may configure the intra prediction mode by using a predetermined condition. For example, the predetermined condition may be a frequency of occurrence of a prediction mode of adjacent or neighboring blocks of the current block. The intra prediction mode list may be configured by preferentially using a prediction mode having the most optimal cost by calculating the cost for each prediction mode.

The measurement of cost may be calculated using the occurrence frequency of each prediction mode, the residual signal generated for each prediction mode, or the like, for the intra prediction mode selected as the optimal prediction mode. In addition, the cost may be calculated by applying a weight to an intra prediction mode determined in a neighboring block adjacent to the current block, or applying a weight to a direction similar to the intra prediction mode occurring in a neighboring block adjacent to the current block.

FIG. 50 shows an example of a method of configuring a cost-based intra prediction mode list. The shaded portion of FIG. 50 means a current block, and each number may mean an intra prediction mode. In FIG. 50, the intra prediction mode occurring in each block may be stored in a history mode list. Referring to FIG. 50, a cost list may be configured by using an absolute value of a difference between prediction modes of a history mode list as a cost, on the basis of an average of prediction modes of blocks adjacent to the top and left of the current block as a reference value. Herein, the encoding or the decoder may configure an intra prediction mode list by preferentially adding a prediction mode having a low cost.

When configuring the intra prediction mode list, when a newly added intra prediction mode exists in the existing intra prediction mode list, an index of the corresponding intra prediction mode may be assigned low. The index value may be used as an identifier for selecting one of the intra prediction modes included in the intra prediction mode list. Herein, the encoder or the decoder can increase the signaling efficiency, since fewer bits signaled to the decoder is assigned as the index value is lower.

Figure 52:
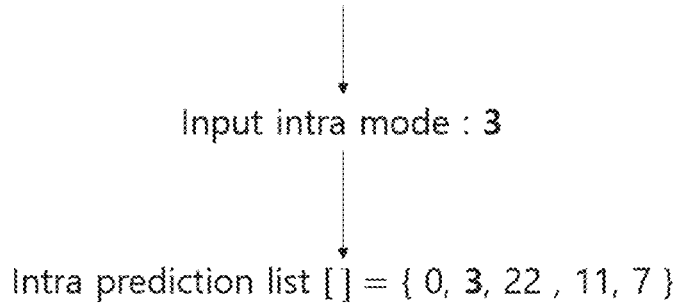

FIGS. 51 and 52 are diagrams illustrating a method of changing an index of an intra prediction mode list according to some embodiments of the present invention.

Since the intra prediction mode of the current block is more likely to be similar to the intra prediction mode of the next block than the intra prediction mode of the previously encoded blocks, when adding the intra prediction mode of the current block to the intra prediction mode list, the lowest index value "0" may be assigned.

FIG. 51 shows an example of a method of applying a lowest index to the intra prediction mode when an added intra prediction mode exists in an existing intra prediction mode list. According to FIG. 51, when intra prediction mode values of 0, 22, 3, 11, and 7 are present in the intra prediction mode list, and the added intra prediction mode is 3, the encoder or decoder may change an index value of an intra prediction mode 3 that is already present in the intra prediction mode list, to zero.

FIG. 52 shows an example of a method of reducing an index for the intra prediction mode when an added intra prediction mode exists in an existing intra prediction mode list. When there are intra prediction mode values of 0, 22, 3, 11, and 7 in the intra prediction mode list and the added intra prediction mode is three, the encoder or decoder may change an index of intra prediction mode 3 already present in the intra prediction mode list, from third to second. Alternatively, when configuring the intra prediction mode list, when the newly added intra prediction mode exists in the existing intra prediction mode list, the encoder or the decoder may assign a predetermined index to the corresponding intra prediction mode.

Figure 53:
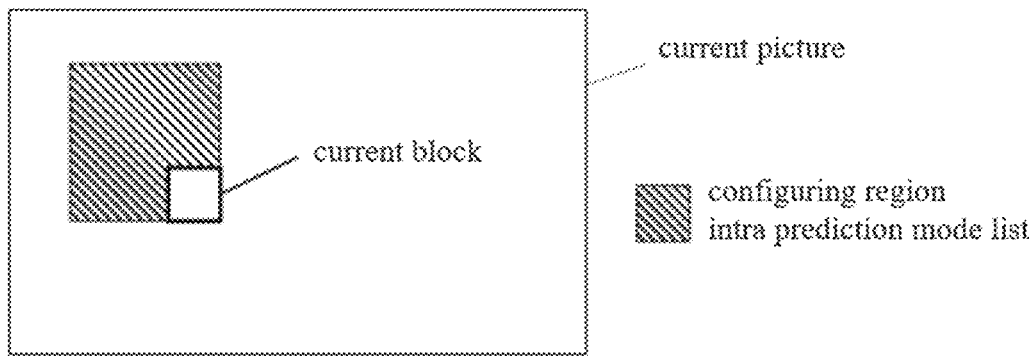
FIGS. 53 and 54 are diagrams illustrating a region configuring an intra prediction mode list according to some embodiments of the present invention.
Figure 54:
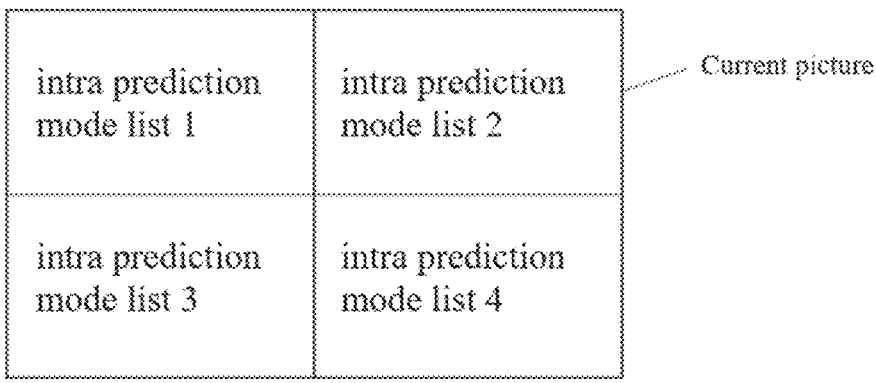

FIGS. 53 and 54 are diagrams illustrating a region configuring an intra prediction mode list, according to some embodiments of the present invention.

The intra prediction mode list may be configured with a specific coding/decoding unit, such as a block, a CTU, a brick, a tile, a slice, a subpicture, a picture, a frame, and a group of picture (GOP) composed of one or more CUs. Since adjacent blocks have a higher probability of generating the same prediction mode, the encoder or decoder may configure the intra prediction mode list in units such as CTU or Slice. When there are not enough candidates for intra prediction, the intra prediction mode list is configured in picture units, thereby deriving more accurate predictions. In addition, since an image has a high similarity between pictures, an encoder or a decoder may increase the encoding efficiency by configuring an intra prediction mode list for each GOP. In addition, since adjacent blocks have a relatively high probability of generating the same prediction mode, the encoder or the decoder may construct the intra prediction mode list for each predetermined region in a picture.

Here, the predetermined area may be limited to a neighboring region of the current block as shown in FIG. 53, or may be formed by designating a region by performing N-partition on the screen (N is an integer of 1 or more) as shown in FIG. 54. The intra prediction mode list according to the present invention is generated and used for not only a block, a CTU, a brick, a tile, a slice, a subpicture, a picture, a frame, a group of picture (GOP) unit composing of one or more CUs, but also various units capable of being used in a video compression field including a still picture compression technique. In addition, the intra prediction mode list may be configured for all prediction modes, or may be configured as a separate list only for a prediction mode having a high selection possibility.

Figure 55:
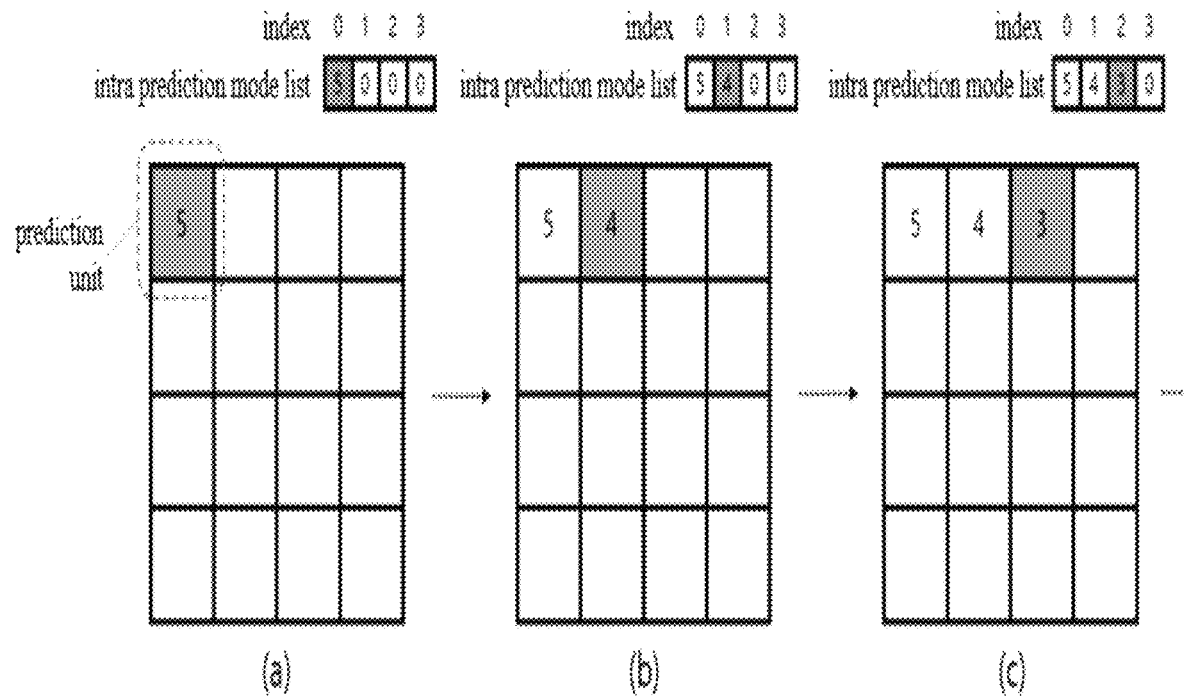
FIG. 55 is a diagram illustrating a method of configuring an intra prediction mode list according to an embodiment of the present invention.
Figure 55:
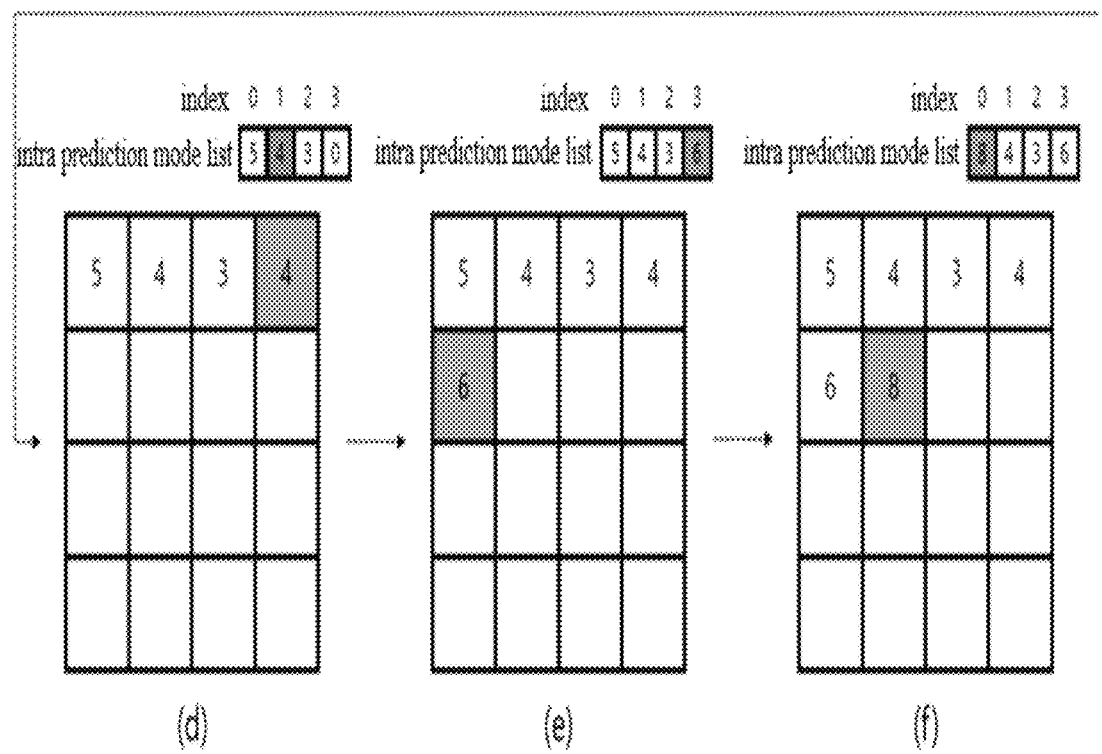

FIG. 55 is yet another diagram illustrating a method of configuring an intra prediction mode list according to an embodiment of the present invention.

FIG. 55 shows another example of a method in which an image encoder or decoder configures an intra prediction mode list. In the example of FIG. 55, when the intra prediction mode list is full, the intra prediction mode list may be configured by a first in first out (FIFO) rule that replaces the first added component with a new value. When the intra prediction mode list is full, the replacement order may be changed in consideration of the direction of intra prediction of the neighboring block.

In the following specification, an intra prediction mode list in which a substitution order follows a first in first out (FIFO) rule will be described. In FIG. 55, each of squares composing of 16 blocks may mean a unit block for deriving a prediction mode, and gray shading may mean a current block. Numbers in each prediction unit indicate an intra prediction mode, and dotted arrows indicate an intra prediction order. That is, the intra prediction may be performed in the order of (a) to (f) in FIG. 55.

Since the value of the intra prediction mode determined in FIG. 55(a) is five, the mode number five may be added to the intra prediction mode list. Subsequently, since the value of the intra prediction mode determined in FIG. 55(b) is four, the mode number 4 may be sequentially added to the intra prediction mode list. Similarly, the intra prediction modes respectively determined in FIGS. 55(c) to 55(f) may be sequentially added to the intra prediction mode list. When the intra prediction mode added in the process of adding each intra prediction mode to the intra prediction mode list exists in the intra prediction mode list, the overlapping intra prediction mode may not be added to the intra prediction mode list.

In addition, as shown in FIG. 55(f), when the intra prediction mode lists is filled, each component may be sequentially replaced with a new intra prediction mode in the order of the first addition among components of the intra prediction mode list. In FIG. 55, the size of the intra prediction mode list is four, but the size of the intra prediction mode list may be variously set. As another example, when intra prediction mode list is filled, the added intra prediction mode may be added to a predetermined position of the intra prediction mode list.

The index of the intra prediction mode list may be used as an identifier indicating one of the intra prediction modes included in the intra prediction mode list. Herein, the encoder or the decoder can increase the efficiency of signaling by assigning fewer bits signaled to the decoder as the index value is lower.

When the intra prediction mode of the current block is more likely to be similar to the intra prediction mode of the next block than the intra prediction mode of the previously encoded blocks, when the intra prediction mode is added to the intra prediction mode list, the encoder or decoder may assign the lowest index to the added intra prediction mode. For example, in FIG. 55(b), the encoder or decoder changes the intra prediction mode value of five that has a value of the existing index No. 0, to have a value of the index No. 1, and an intra prediction mode value of 4 in the current coding block may be assigned to an value of the index No. 0.

Figure 56:
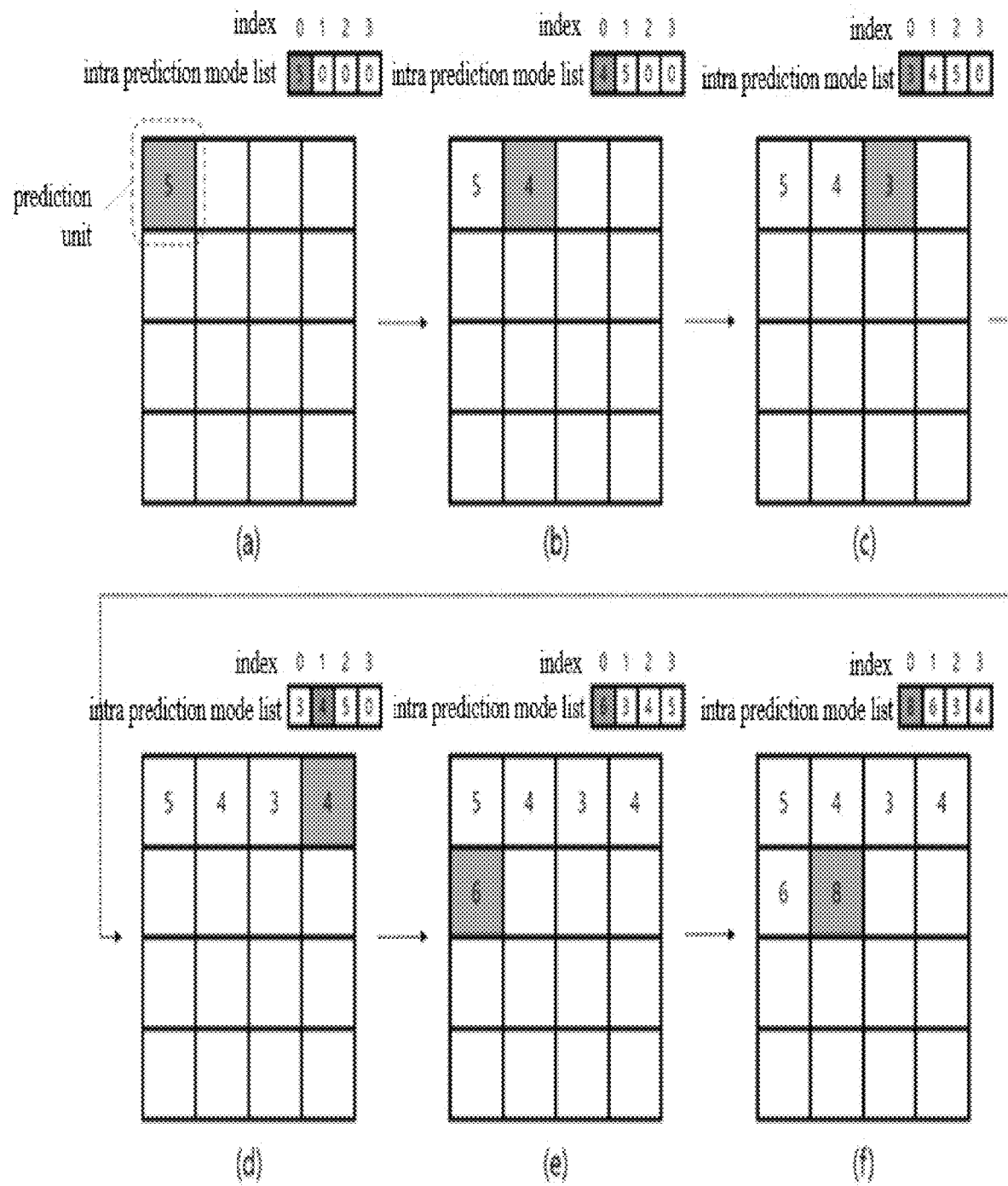
FIGS. 56 to 58 are diagrams illustrating a method of allocating an index of an intra prediction mode according to some embodiments of the present invention.
Figure 57:
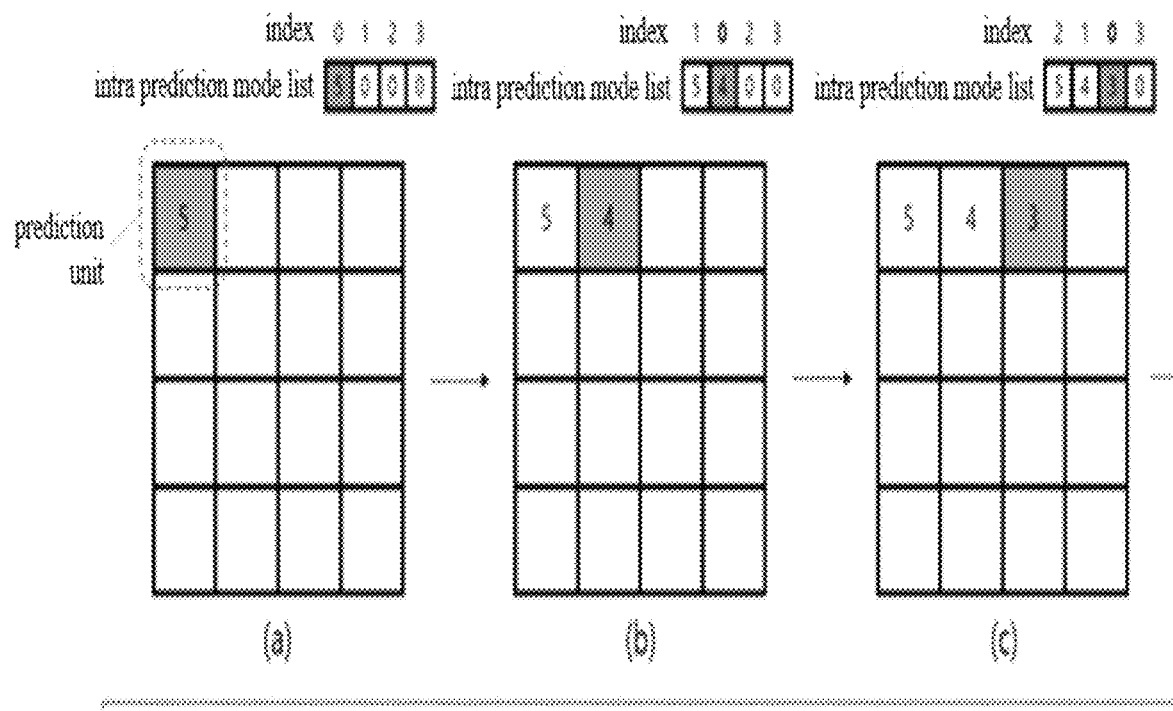
Figure 57:
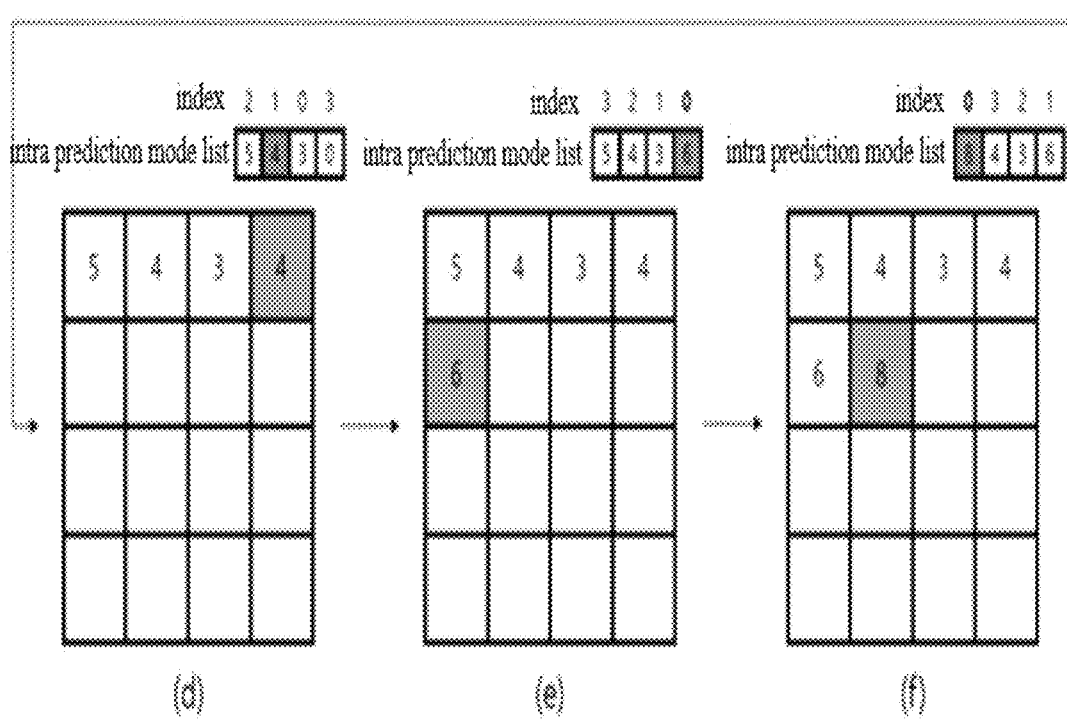
Figure 58:
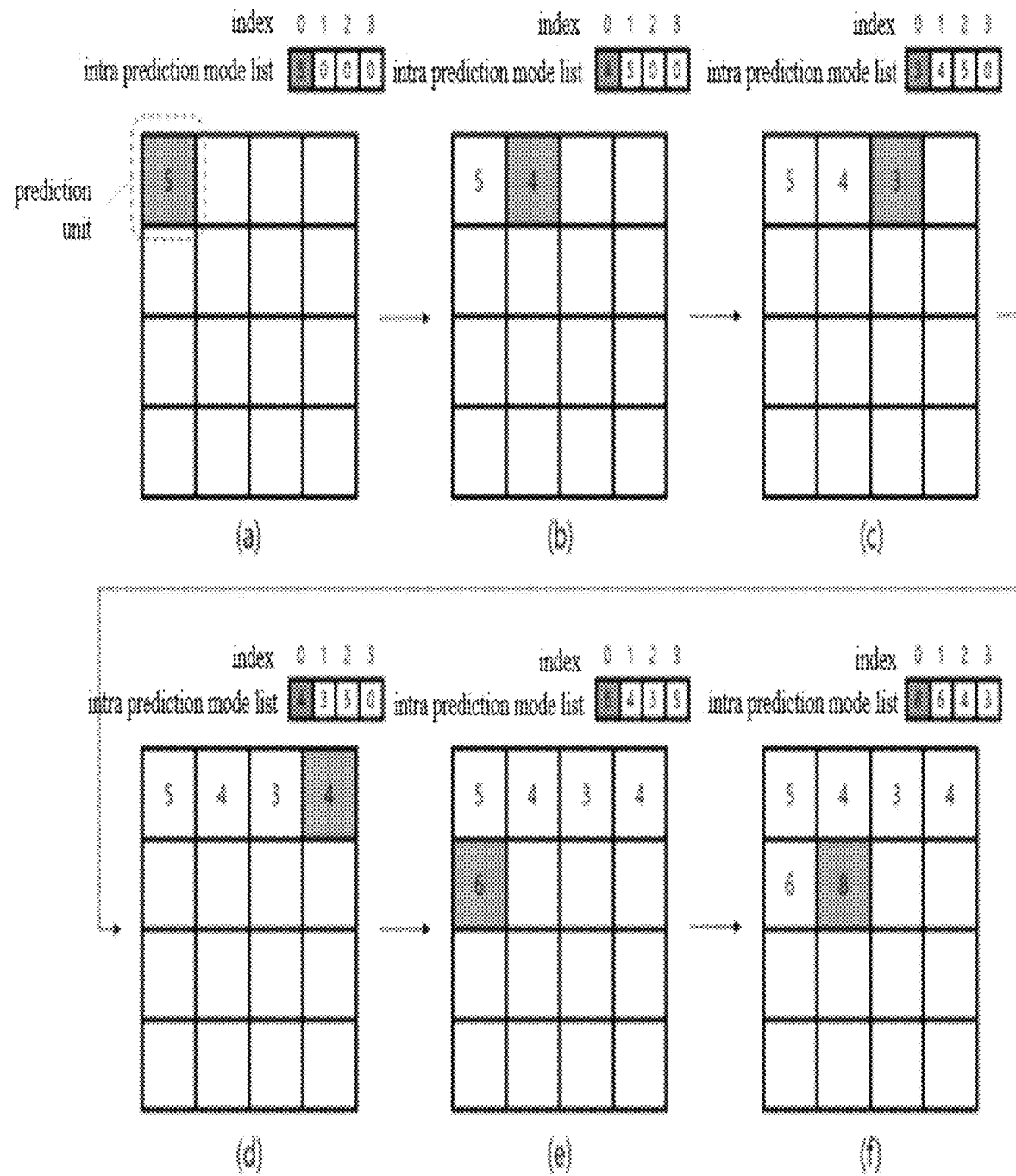

FIGS. 56 to 58 are diagrams illustrating a method of allocating an index of an intra prediction mode according to some embodiments of the present invention.

FIG. 56 shows an example of a method of assigning a lowest index value to an added intra prediction mode. The lowest index value 0 may be allocated to the most recently added intra prediction mode, and the low index values may be allocated to each intra prediction mode in the order of later added intra prediction modes for the remaining intra prediction mode numbers.

As another example, the encoder or the decoder may sequentially add the derived intra prediction mode, rearrange the index values, and allocate a value of "0" starting from the most recently added intra prediction mode. For example, in FIG. 55(f), the intra prediction mode list may be configured so that the values of the intra prediction modes are in the order of 4, 3, 6, and 8, and herein the index values are in order of 3, 2, 1, and 0, in which an intra prediction mode 4 may be assigned an index value 3, an intra prediction mode 3 may be an index value 2, an intra prediction mode 6 may be an index value 1, and an intra prediction mode 8 may be an index value 0, respectively.

FIG. 57 shows an example of a method of assigning a lowest index value to a recently added mode. The lowest index value zero may be allocated to the most recently added intra prediction mode, and the lower index values may be assigned in the order of later added intra prediction modes for the remaining intra prediction modes.

When the added intra prediction mode already exists in the intra prediction mode list, "zero", which is the lowest index value, may be given to the intra prediction mode. FIG. 58 illustrates an example of a method of allocating the lowest index value in the intra prediction mode list to the intra prediction mode when the intra prediction mode already exists in the intra prediction mode list. Referring to FIG. 58(*d*), in the process of adding a value 4 of the intra prediction mode, since the intra prediction mode 4 already exists in the intra prediction mode, the encoder or the decoder may assign zero, which is the lowest index value for the value 4 of the intra prediction mode.

Hereinafter, a method of configuring a plurality of intra prediction mode lists according to an embodiment of the present invention will be described.

There may be a plurality of intra prediction mode lists in a certain region. In particular, when a plurality of intra prediction mode lists are configured for each direction or each region of a prediction mode, it is advantageous to consider the directionality of the prediction mode, the pixel characteristics of a certain region, and the like, rather than configuring one intra prediction mode list for all prediction modes and all regions.

FIG. 59 is a diagram illustrating a method of configuring a plurality of intra prediction mode lists, according to an embodiment of the present invention.

FIG. 59 shows an example of a method of configuring a single intra prediction mode list and a method of configuring a plurality of intra prediction mode lists for each region. FIG. 59(*a*) illustrates an example of configuring one intra prediction mode list having a length of 2. FIG. 59(*b*) illustrates an example of configuring an intra prediction mode list having a length of 2 for a left region (first region) and a right region (second region) with respect to the center of a block.

In FIG. 59(*a*), since one intra prediction mode list is configured without distinguishing between the left and right regions, a characteristic of generating similar intra prediction modes for each region may not be considered. Meanwhile, in FIG. 59(*b*), the intra prediction mode list may be individually configured in consideration of the position and the orientation for each region with respect to the center. When configuring a plurality of intra prediction lists for each region, the generation characteristics of the intra prediction mode for each region may be taken into account, thereby increasing the coding efficiency.

In the example of FIG. 59, a block is divided into left and right regions, but the embodiment of FIG. 59 is only an example, in which a predetermined region may be divided into N arbitrary regions (N is an integer of 1 or more) to form N intra prediction lists. Herein, the predetermined region may be limited to a peripheral region of the current block, or may mean a region obtained by performing N-partition on the screen (N is an integer of 1 or more) in slices, picture, and the like instead of blocks. In addition, the encoder or the decoder may use the intra prediction mode of the partial region to configure the intra prediction mode of the other partial region.

Figure 60:
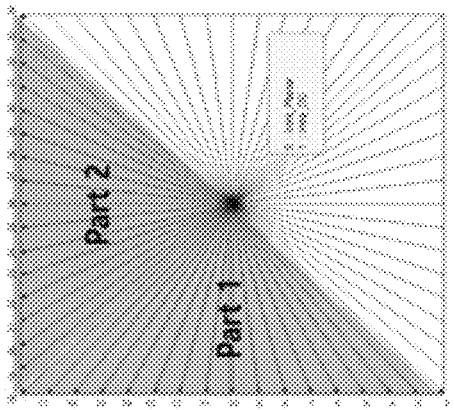
FIGS. 60 and 61 are diagrams illustrating a method of configuring a plurality of intra prediction mode lists in consideration of the direction of a prediction mode according to an embodiment of the present invention.

FIG. 60 is a diagram for describing a method of configuring a plurality of intra prediction mode lists in consideration of directionality of a prediction mode, according to an embodiment of the present invention.

FIG. 60 shows an example of a method of configuring a single intra prediction mode list and a method of configuring a plurality of intra prediction lists for each direction. FIG. 60(*a*) illustrates an example of configuring one intra prediction mode list having a length of two, and FIG. 60(*b*) illustrates an example of a method of configuring an intra prediction mode list having a length of two for a horizontal direction and a vertical direction on the basis of the directionality of the prediction mode.

Since prediction modes having similar directionality in intra prediction have characteristics that occur adjacently, the encoder or decoder constructs an intra prediction mode list for each direction, and then searches prediction mode of the current block in intra prediction list similar to the direction of the neighboring block in consideration of the direction of the prediction mode of the neighboring block of the current block. When selecting the intra prediction mode list in consideration of the directionality, the possibility of finding the same intra prediction mode may be increased. Accordingly, the configuring of the prediction mode list for each direction as shown in FIG. 60 may increase the coding efficiency.

In the example of FIG. 60, the direction of the prediction is classified into horizontal and vertical directions, but the embodiment of FIG. 60 is only an example, in which the direction may be classified in various ways so that N or more (N is an integer of 1 or more) intra-prediction lists may be configured.

Figure 61:
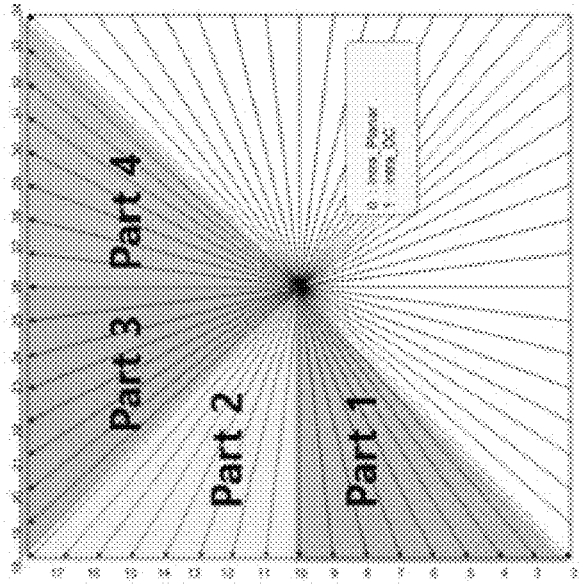
Figure 61:
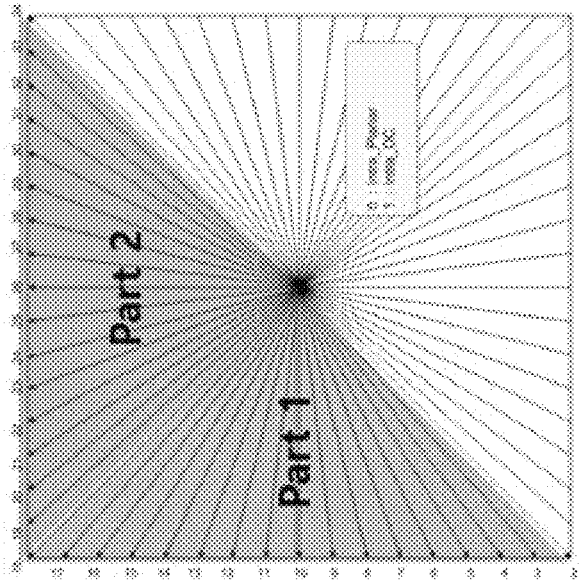

FIG. 61 illustrates a method of distinguishing direction when configuring N or more intra prediction lists. FIG. 61(*a*) illustrates an example of a method of distinguishing two directions, and FIG. 61(*b*) illustrates an example of a method of distinguishing four directions.

Figure 62:
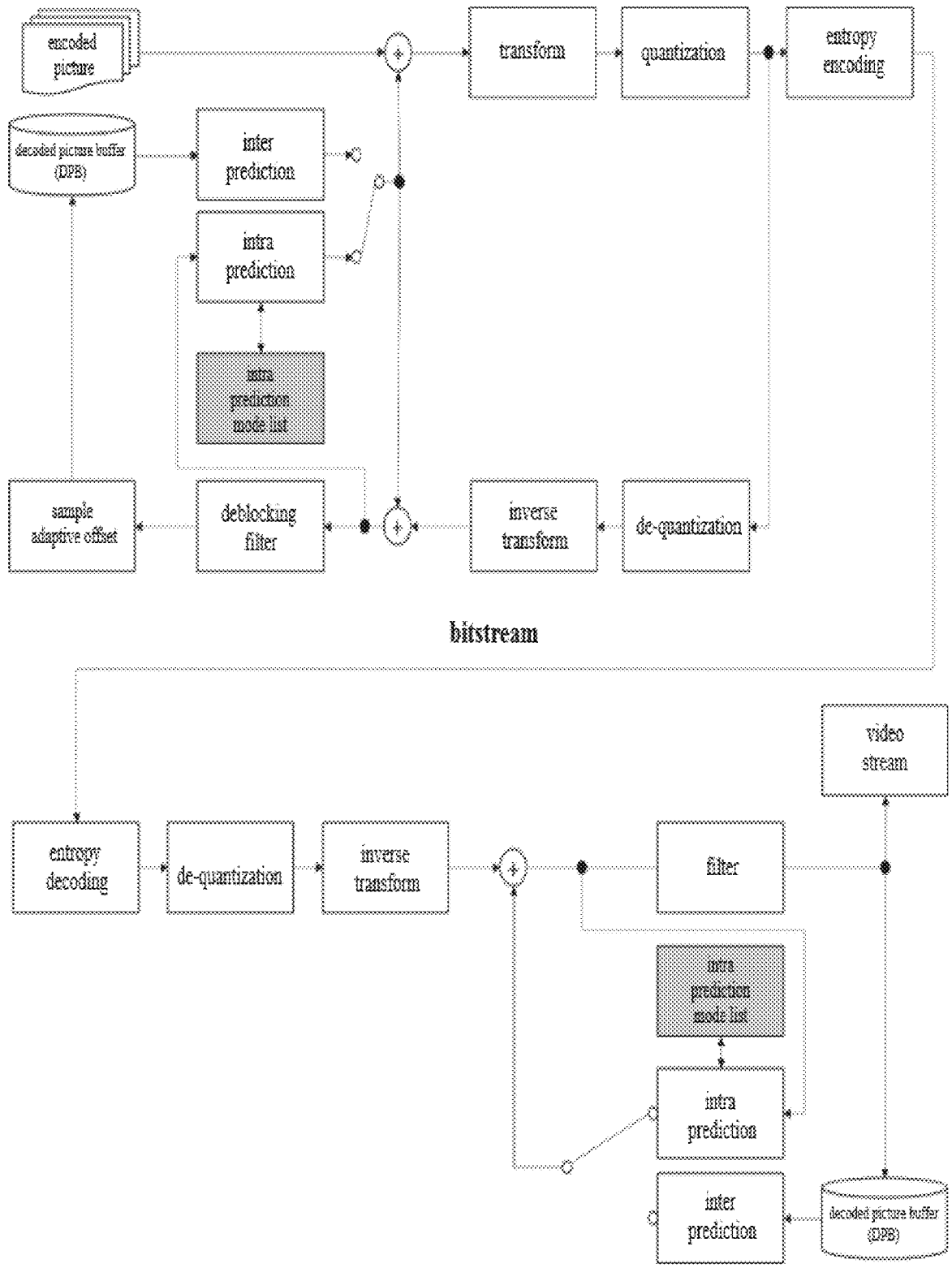
FIG. 62 is a diagram illustrating an encoder and decoder structure for adding an intra prediction list, according to an embodiment of the present invention.

FIG. 62 is a diagram illustrating a structure of an encoder and decoder which adds an intra prediction mode list according to an embodiment of the present invention.

The device diagram of FIG. 62 may have an intra prediction mode list generator added to the device diagrams of FIGS. 1 and 2. The intra prediction mode list generator may configure an intra prediction mode list to reduce the amount of signaling bits of the intra prediction mode used for intra prediction. In addition, the encoder or the decoder may utilize a method of using a component of the intra prediction mode list as a candidate of the MPM without signaling the index of the intra prediction mode list.

Figure 63:
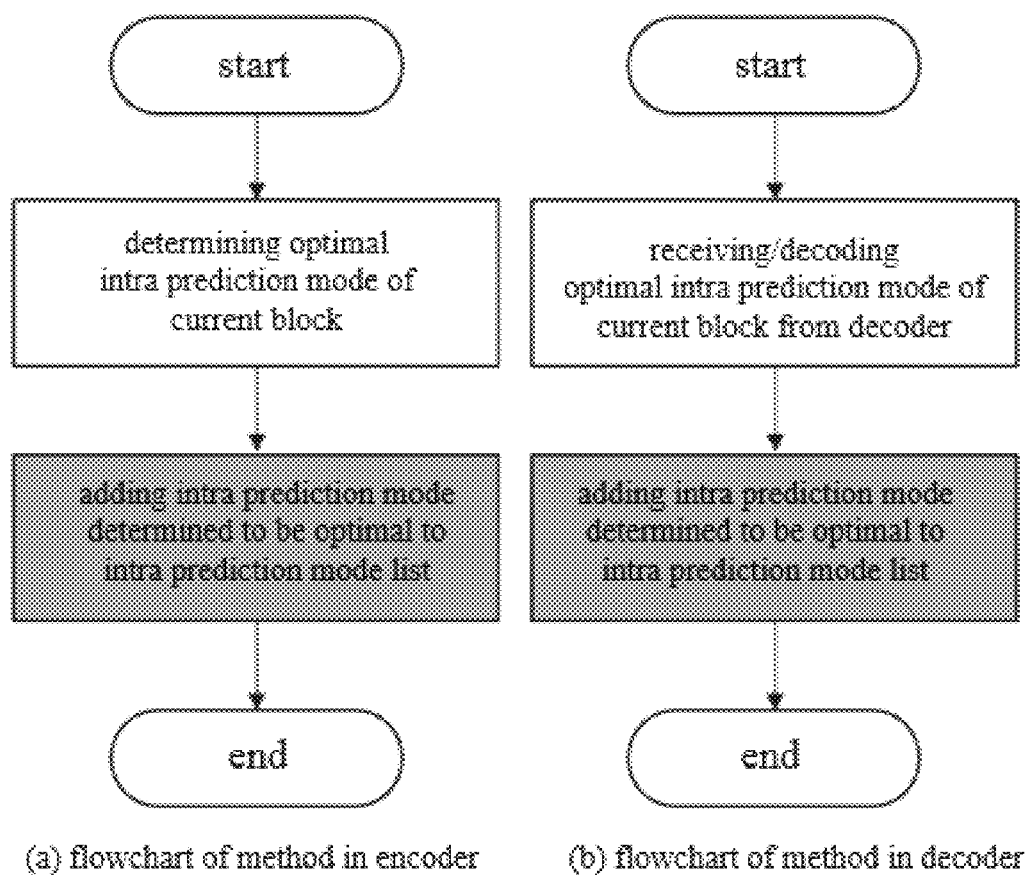
FIG. 63 is a diagram illustrating a method of adding an intra prediction mode list according to an embodiment of the present invention.

FIG. 63 is a diagram illustrating a method of adding an intra prediction mode list according to one embodiment of the present invention.

FIG. 63 shows an example of a method of configuring an intra prediction mode list in an encoder and a decoder. FIG. 63(*a*) shows a flowchart in which an encoder configures an intra prediction mode list. When the intra prediction mode of the current block is determined in the encoder, the encoder may add the determined intra prediction mode to the intra prediction mode list. Herein, when the intra prediction mode list is full, the intra prediction mode may be added according to a first in first out (FIFO) rule that replaces the first added component with a new value.

Figure 64:
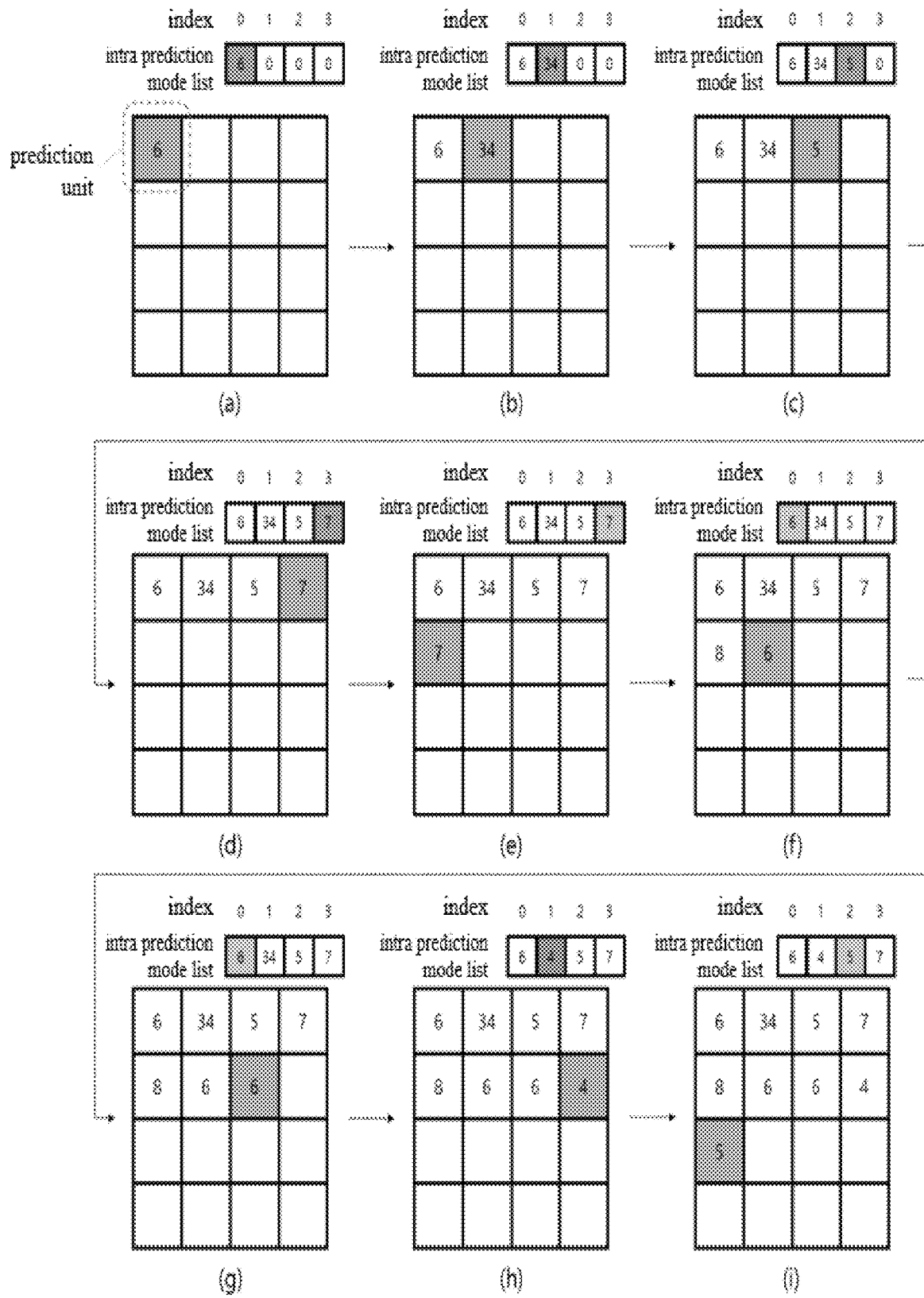
FIG. 64 is a diagram illustrating a method of changing a substitution order in consideration of an intra prediction mode of a neighboring block according to an embodiment of the present invention.

When the intra prediction mode list is full, the replacement order may be partially changed as shown in FIG. 64 in consideration of the intra prediction mode of the neighboring block. Referring to FIG. 64(*h*), in the process of adding a value 4 of the intra prediction mode, the value 6 of the intra prediction mode of the index No. 0 should be replaced with 4 in the FIFO order. However, since the values of the intra prediction modes of the adjacent left and top blocks of the current block are 5 and 7, respectively, the encoder or the decoder replaces the intra prediction mode of 34 having the largest difference from an average value 6 of the values 5 and 7 of the intra prediction mode in the intra prediction mode list with the value 4 of the intra prediction mode, thereby configuring an intra prediction mode list reflecting the prediction mode tendency of the peripheral region of the current block. FIG. 64 illustrates an example of a method of changing a substitution order, in which the criteria for changing the substitution order may be determined by not only an average value of intra prediction modes of neighboring blocks, but also an average value of neighboring blocks of non-adjacent current blocks, as shown in FIG. 64.

In addition, the intra prediction mode of the neighboring block may be used as a reference for changing the replacement order. In addition, at least one of statistical values, such as weighted sum, weighted average value, median value, minimum value, maximum value, etc., in addition to the average value, may be used to determine the criteria for changing the substitution order.

FIG. 63(b) shows a flowchart in which a decoder configures an intra prediction mode list. The decoder may decode the prediction mode signaled from the encoder and add the same as a component of the intra prediction mode list. When the intra prediction mode list is full, the intra prediction mode may be added according to the first in first out (FIFO) rule that replaces the first added component with a new value like the encoder.

When the intra prediction mode list is full, the substitution order may be partially changed in consideration of the intra prediction mode of the neighboring block.

Figure 65:
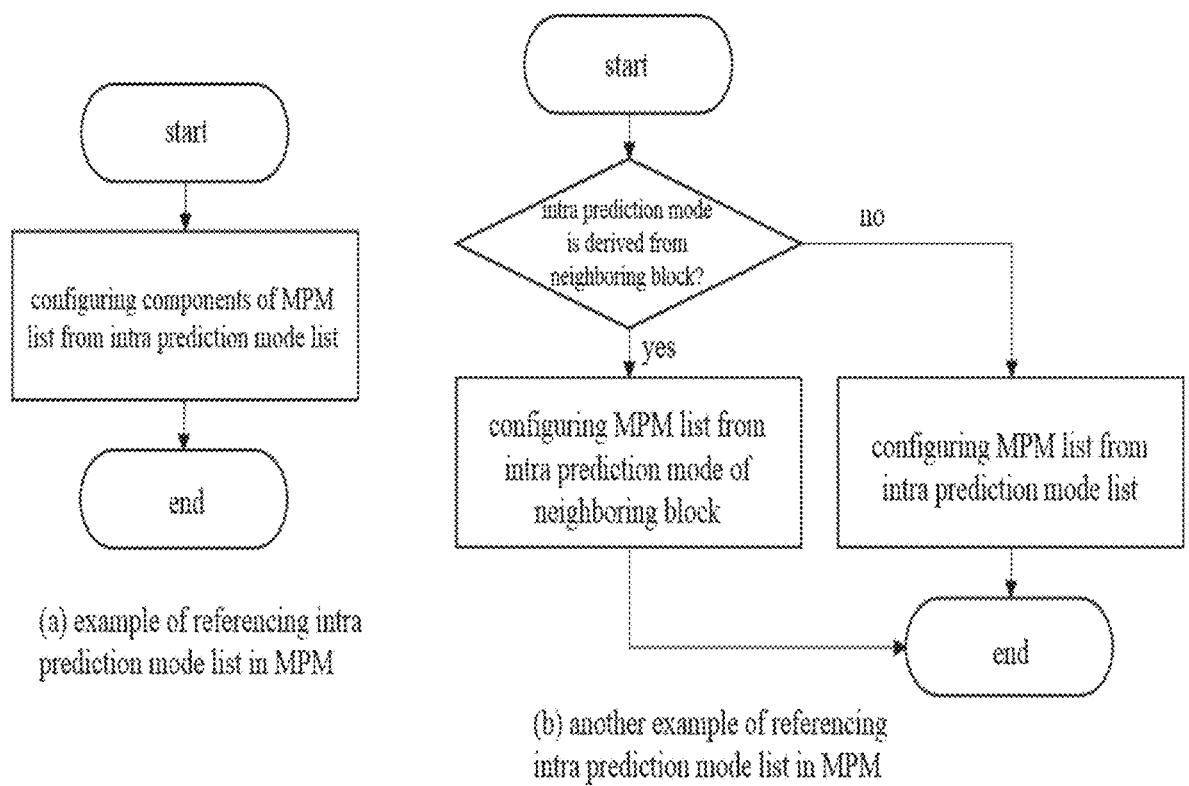
FIG. 65 is a diagram illustrating a method of applying an intra prediction mode list to an MPM mode according to one embodiment of the present invention.

FIG. 65 is a diagram illustrating a method of applying an intra prediction mode list to an MPM according to an embodiment of the present invention.

FIG. 65 shows an example of a method of referencing to an intra prediction mode list when configuring an MPM list in an encoder and a decoder. FIG. 65(a) shows an example of a method of deriving all or some of the components of the MPM from the intra prediction mode list. When using the 3 MPM scheme of configuring an MPM list using three MPMs, the encoder or the decoder may derive an intra prediction mode from top and left adjacent blocks.

Herein, when the intra prediction modes of two neighboring blocks are the same, the component of the MPM list is configured through the intra prediction mode of the neighboring block, and one or two components of the remaining two components may be determined using the components in the intra prediction mode list. In addition, even when the intra prediction modes of the two adjacent blocks are different, the other intra prediction mode may be determined using components of the intra prediction mode list. Similarly, even when configuring an MPM list constituting six MPMs, partial candidates of the MPM list may be determined through an intra prediction mode candidate list.

In addition, as shown in FIG. 65(b), when the intra prediction mode may not be derived from the neighboring block of the current block, the MPM list may be configured using the components of the intra prediction mode list. Although the above description describes that some conditions of the configuration of the MPM is applied to an embodiment of the present invention, this technique does not mean that the present invention is limited to only 3 MPMs and 6 MPMs. In order to configure various types of MPM lists, the intra prediction mode list according to the present invention may be used.

Figure 66:
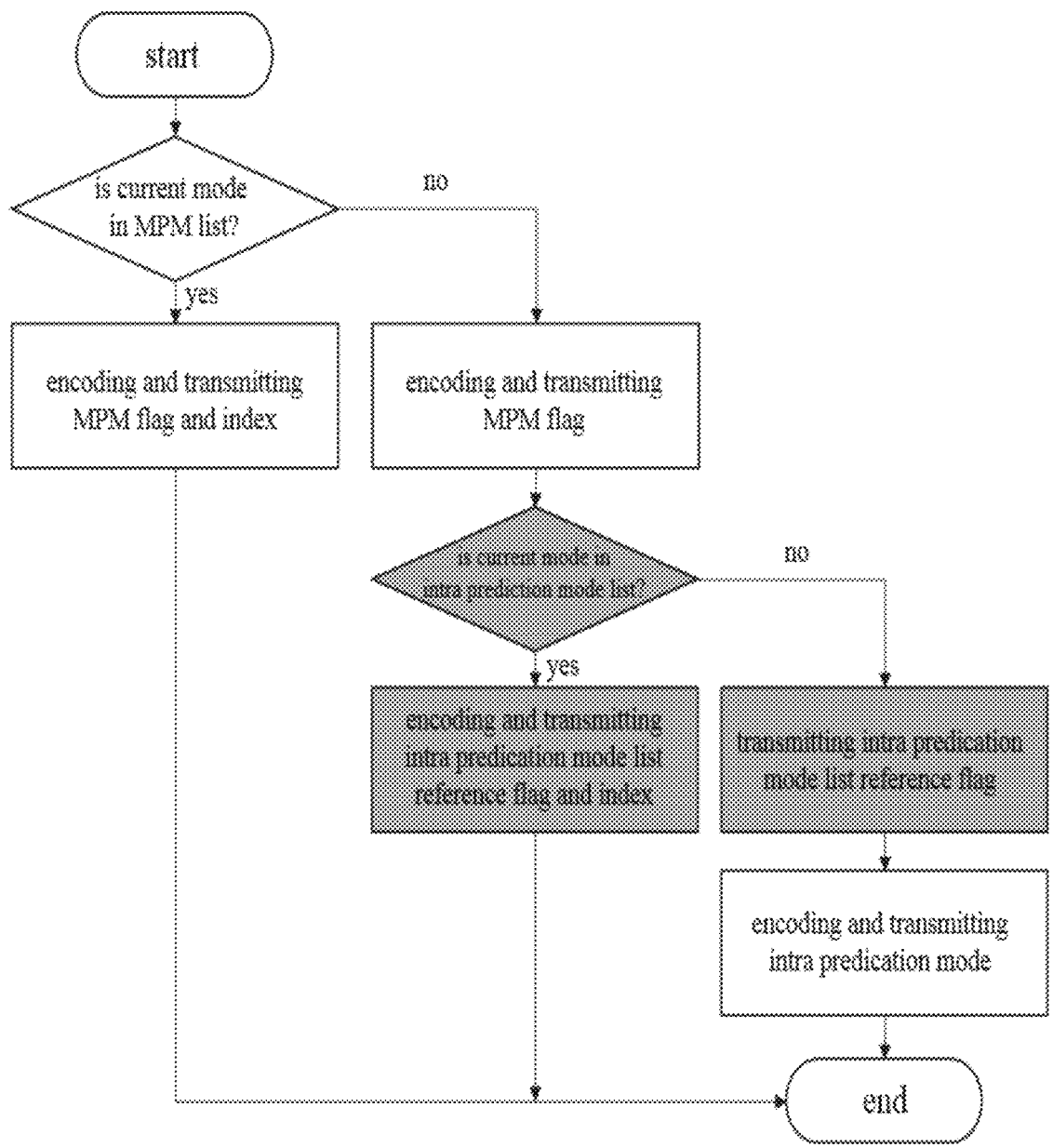
FIG. 66 is a diagram illustrating a method of applying an intra prediction mode list to a non-MPM mode by a encoder according to an embodiment of the present invention.

FIG. 66 is a diagram illustrating a method of applying an intra prediction mode list to a non-MPM mode according to an embodiment of the present invention.

FIG. 66 shows an example of a method of referring to an intra prediction list in an encoder in case of Non-MPM. The encoder may check whether the current intra prediction mode is included in the MPM list. When the current intra prediction mode is included in the MPM list, the encoder encodes the MPM Flag and the MPM Index and transmits the same to the decoder, and the encoding process for the intra prediction mode may be terminated.

when the encoder operates in the Non-MPM mode, the MPM Flag may be coded to 0 and signaled to the decoder. When the current intra prediction mode is not in the MPM list, the encoder may determine whether the current intra prediction mode exists in the intra prediction mode list and may signal an identifier (or a flag, an index, etc.) indicating whether to refer to the intra prediction mode list.

When the current intra prediction mode is in the intra prediction mode list, the encoder may encode an identifier indicating whether to refer to the intra prediction mode list to a first value (e.g., "1") and encode an index of an intra prediction mode list that matches the current intra prediction mode, to signal the same to the decoder.

When the current intra prediction mode is not in the intra prediction mode list, the encoder may encode an identifier indicating whether to refer to the intra prediction mode list to a second value (e.g., "0") to signal the same to the decoder, and encode the current intra prediction mode to signal the same to the decoder.

In FIG. 66, since it is determined whether to select the intra prediction mode list for a mode not selected in the MPM, when operating in the non-MPM mode, a situation in which the intra prediction mode present in the MPM list is the prediction mode of the current block does not occur. Therefore, in the case of the non-MPM mode according to the present invention, the intra prediction mode list may be configured using a mode excluding the components of the MPM.

In mode encoding of non-MPM, mode encoding may be performed for the remaining modes except for the MPM candidate. For example, in the case that 67 modes are used in the intra prediction mode and 3 MPM is used, when the encoder or the decoder operates in the non-MPM mode, the encoding may be performed for 64 modes except three modes constituting the MPM from 67 intra prediction modes. According to the present invention, when an encoder or decoder has N prediction modes, using n1 (n1 is a natural number) MPM candidates and using a prediction mode derived from n2 (n2 is a natural number) intra prediction mode lists, the encoder may perform CABAC coding on N-n1-n2 modes.

In the non-MPM mode, the encoder may use the intra prediction mode list even in the selected-mode method. The selected mode is a method used in the non-MPM mode, and a coding method that discriminates between n (n is a natural number) selected modes and N-n non-selected modes to allocate fewer bits to the selected mode, for N modes (N is a natural number) capable of occurring in a non-MPM mode.

When using the intra prediction mode list, a component of the intra prediction mode list may be added to the selected mode method. Herein, since a selection rate of the selected mode may be increased without additionally transmitting the intra prediction mode list selection flag, the coding efficiency may be increased. Alternatively, the encoder or the decoder may configure the intra prediction mode list in modes that are not multiples of a so that the component of the intra prediction mode list is not overlapped with the selected mode, thereby minimizing the occurrence of the remaining modes.

Figure 67:
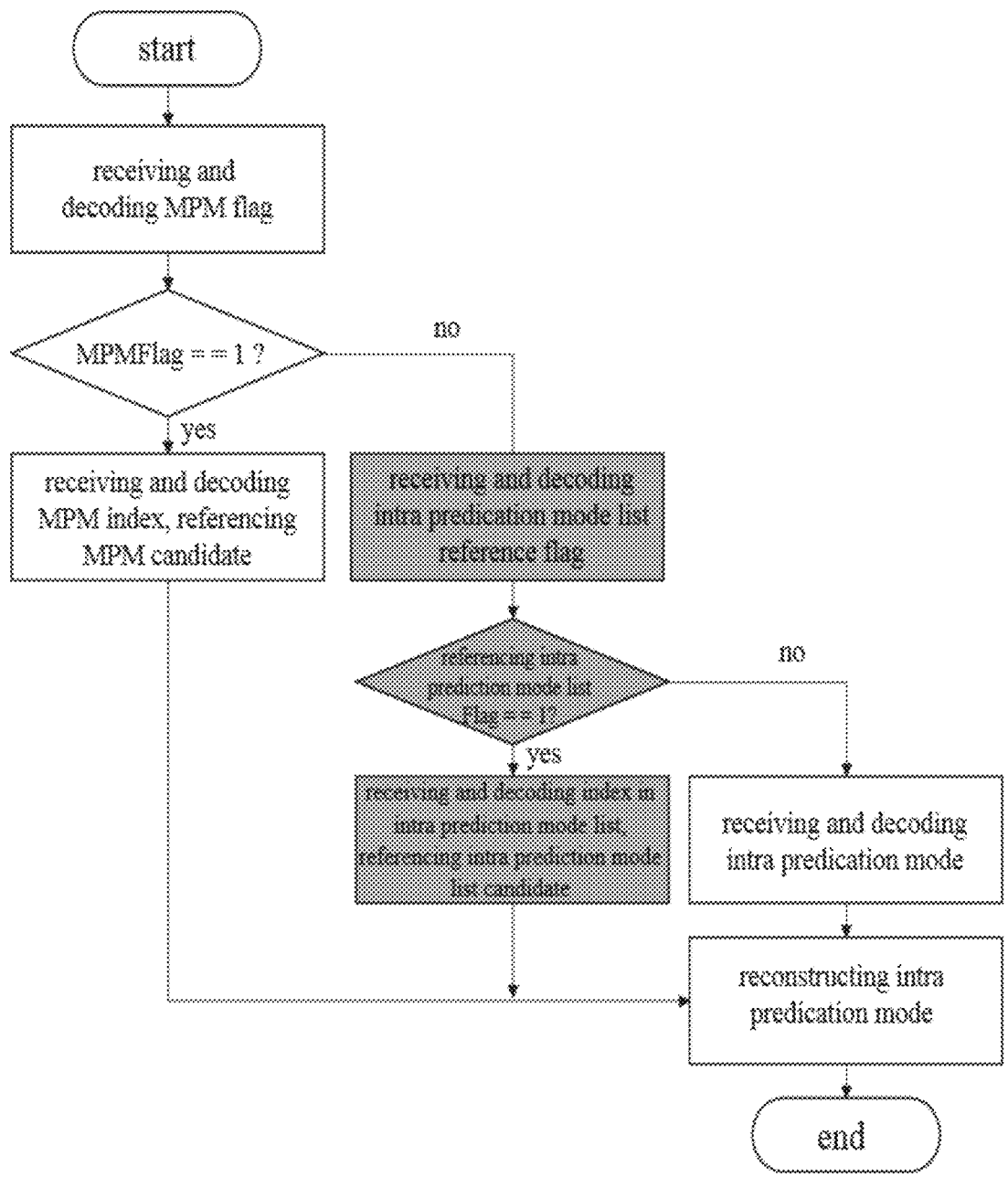
FIG. 67 is a diagram illustrating a method of applying an intra prediction mode list to a non-MPM mode by a decoder according to an embodiment of the present invention.

FIG. 67 is a diagram illustrating a method of applying an intra prediction mode list to a non-MPM mode by a decoder according to an embodiment of the present invention.

FIG. 67 shows an example of a method of referring to an intra prediction list by a decoder in the case of the non-MPM mode. The decoder may receive and decode an MPM Flag for identifying whether to apply the MPM transmitted from the encoder. When the MPM Flag is 1, the MPM index may be decoded to reconstruct the intra prediction mode from the MPM list and to terminate the intra prediction mode reconstruction process.

In the case of the Non-MPM mode in which the MPM Flag is 0, according to the present invention, the decoder may decode an intra prediction mode list reference flag. When the intra prediction mode list reference Flag is 1, the decoder may decode the index of the intra prediction mode list, restore the intra prediction mode through the index of the intra prediction mode list, and terminate the intra prediction mode reconstruction process.

When the intra prediction mode list reference flag is 0, the current intra prediction mode may be decoded through CABAC. Here, the decoder operations may be changed to each other in the cases that the MPM flag is 1 and 0. In addition, the decoder operations may be changed to each other in the cases that the intra prediction mode list reference flag is 1 and 0.

In FIG. 67, since an intra prediction mode list is selected for a mode not selected in the MPM, when the non-MPM mode is operated, there is no case that the intra prediction mode present in the MPM list is the same as the prediction mode of the current block. Therefore, in the case of the non-MPM mode according to the present invention, the intra prediction mode list may be configured using a mode except the components of the MPM.

Mode decoding for Non-MPM should be performed in the same manner as the encoder. Therefore, a method of configuring an intra prediction mode list and a selected-mode of the decoder, which is related to the selected-mode and the non-selected mode, may be performed by the same method as the above-described encoder. The intra prediction mode list may also be referred to and used in intra prediction modes other than MPM, Selected-mode, and Non-selected mode.

Figure 68:
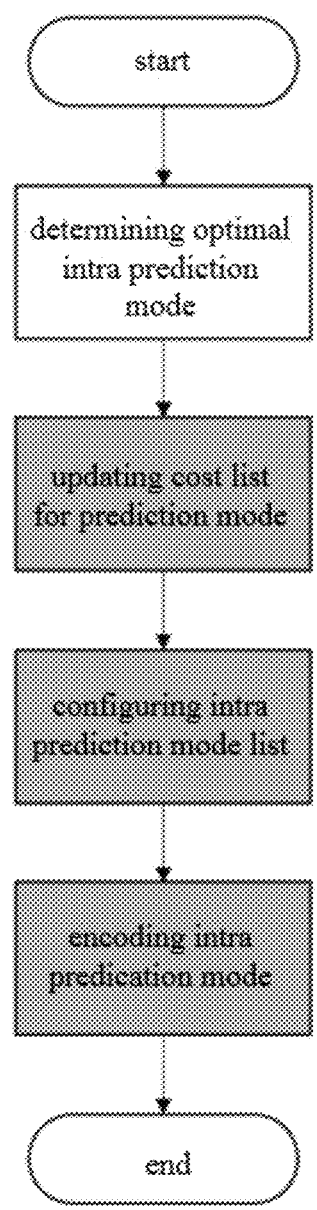
FIG. 68 is a diagram illustrating a method of encoding/decoding an image using an intra prediction mode list according to an embodiment of the present invention.
Figure 68:
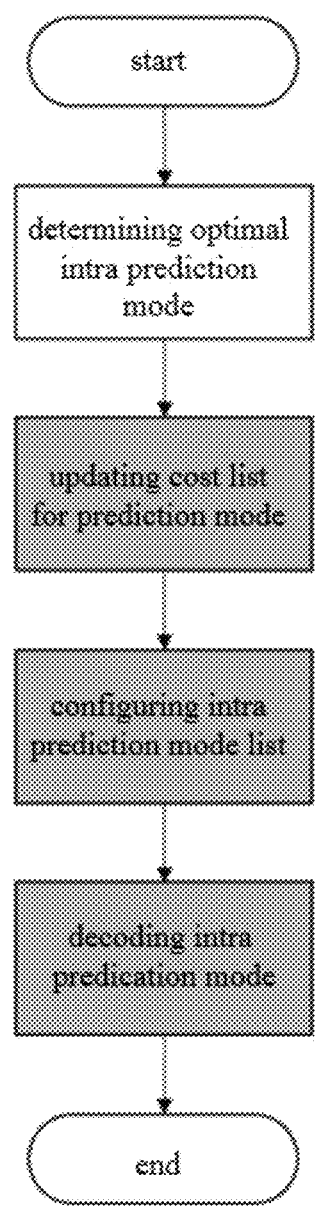

FIG. 68 is a diagram illustrating a method of encoding/decoding an image using an intra prediction mode list according to an embodiment of the present invention.

In order to configure an intra prediction mode list, an encoder or a decoder may calculate cost for each prediction mode. FIG. 68(*a*) illustrates a flowchart of a method of configuring an intra prediction mode list by an encoder, and FIG. 68(*b*) illustrates a flowchart of a method of configuring an intra prediction mode list by an encoder. As illustrated in FIG. 68(*a*), when the intra prediction mode is determined, the encoder may update the cost for the corresponding intra prediction mode. Here, the cost may be a value derived using the occurrence frequency or residual signal of each intra prediction mode. The cost may be configured in a list form or the like and may be used as information for configuring an intra prediction mode list.

According to the present invention, when the intra prediction mode list is configured on the basis of the cost of each prediction mode, and the same intra prediction mode as the prediction mode of the current block is in the intra prediction mode list, the encoder may not directly signal the intra prediction mode, but signal the index of the intra prediction mode list. The decoder configures an intra prediction mode list in the same manner as the encoder on the basis of the information signaled from the encoder and use the intra prediction mode list as reference information to reconstruct the prediction mode, as shown in FIG. 68(*b*). The intra prediction mode list may be used as reference information in various prediction methods related to intra prediction mode signaling.

Figure 69:
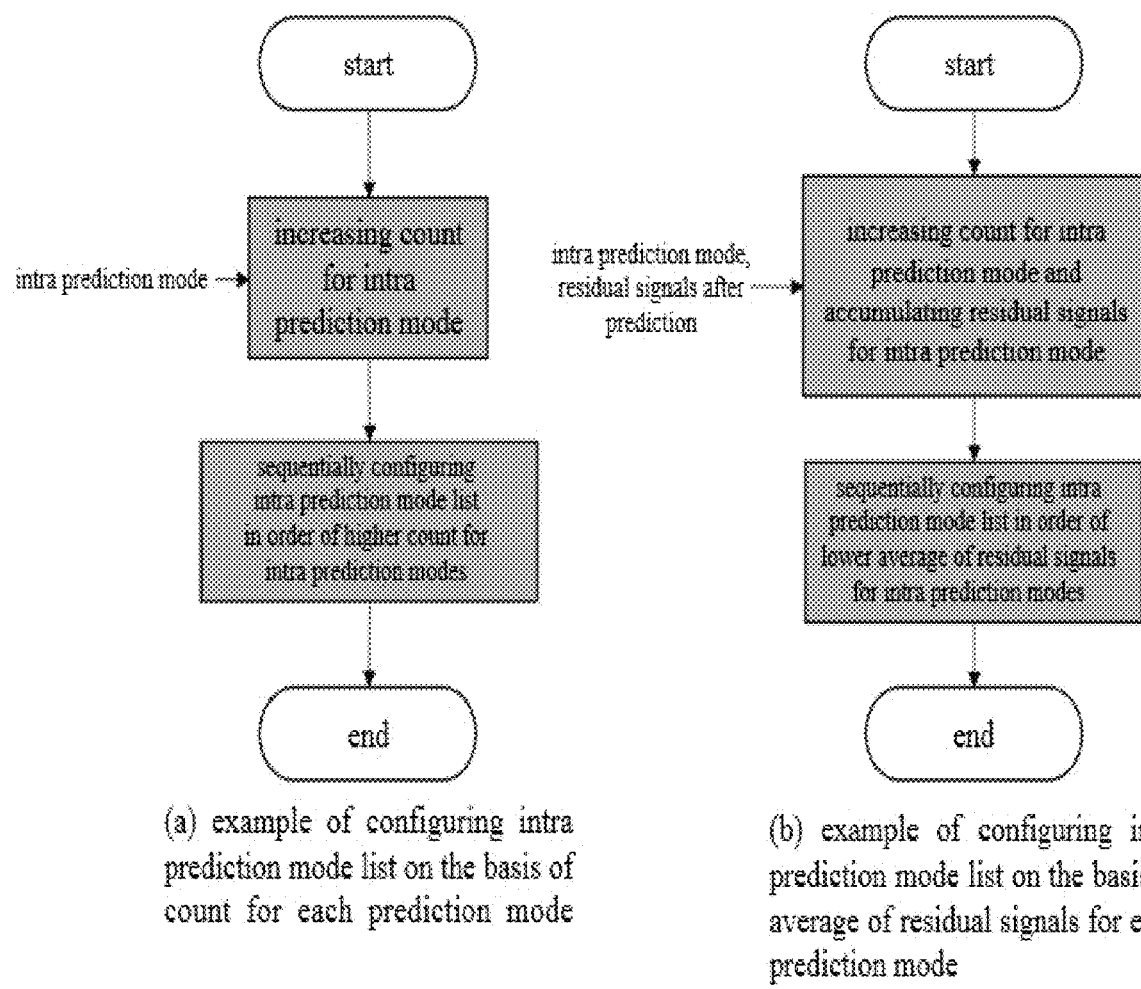
FIG. 69 is a diagram illustrating a method of configuring an intra prediction mode list according to an embodiment of the present invention.

FIG. 69 is a view illustrating a method of configuring an intra prediction mode list according to an embodiment of the present invention.

In the method of configuring the intra prediction mode list on the basis of the cost of each intra prediction mode, an example of a method of calculating the cost is illustrated in FIG. 69. The cost may be calculated using at least one of a count corresponding to an occurrence frequency or a residual signal after prediction. FIG. 69(*a*) illustrates a method of configuring an intra prediction mode list on the basis of count, which is an occurrence frequency of each prediction mode, and FIG. 69(*b*) illustrates a method of calculating both a count and a residual signal and configuring an intra prediction mode list on the basis of an average of residual signals for each prediction mode.

Since a prediction mode that frequently occurs in intra prediction is more likely to be reused, an intra prediction mode list may be configured by giving priority to a prediction mode having a high count, according to FIG. 69(*a*).

Meanwhile, since less accurate residual signal is generated during the intra prediction is performed, more accurate prediction is performed, the intra prediction mode list may be configured by giving priority to the prediction mode having a low average of the residual signals, according to FIG. 69(*b*).

The cost used in the method of configuring an intra prediction mode list may be calculated according to all criteria that may configure an intra prediction mode list, such as a method of checking the occurrence frequency of each prediction mode for neighboring regions of the current block.

Figure 70:
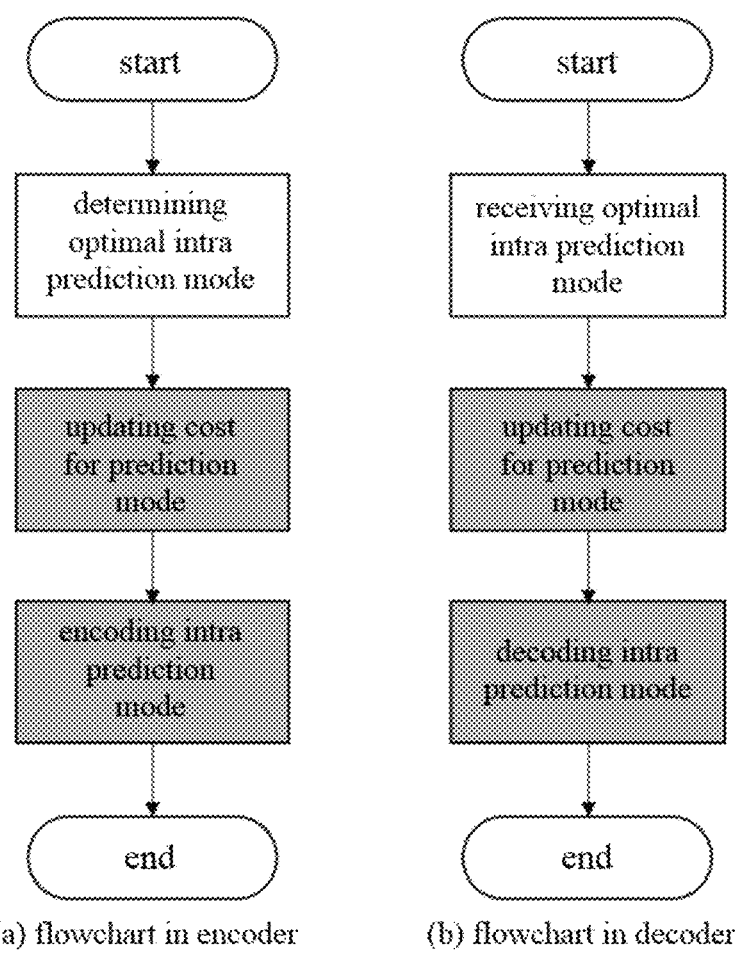
FIGS. 70 and 71 are diagrams illustrating an encoding/decoding method according to some embodiments of the present invention.
Figures 71, 72:
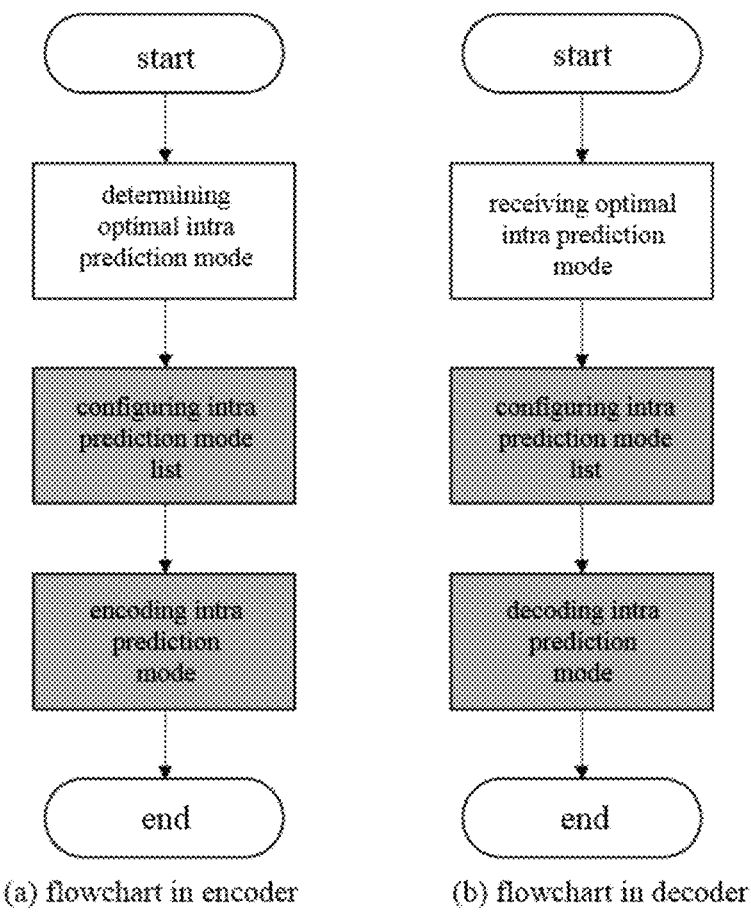
FIG. 72 is a diagram illustrating a method of initializing an intra prediction list according to an embodiment of the present invention.

FIGS. 70 and 71 are diagrams illustrating an encoding/decoding method according to some embodiments of the present invention.

The intra prediction mode list may not be configured separately as in the above example, but may also be configured by a method of directly referring to the cost calculated for each prediction mode. In this case, the flowchart is as shown in FIG. 70. According to another embodiment of the present invention, as shown in FIG. 71, an intra prediction mode list may be configured without measuring the cost. In this case, the intra prediction mode list may be adaptively configured using the intra prediction mode of the neighboring block adjacent to the current block.

FIG. 72 is a diagram illustrating a method of initializing an intra prediction list according to an embodiment of the present invention.

The intra prediction mode list may not be constructed until intra picture prediction is performed. Accordingly, the encoder or decoder may assign an initial value to the intra prediction mode list. FIG. 72 shows an example of an initialized intra prediction mode list. The encoder or decoder may preferentially assign a low index to the mode that is used most statistically for the intra prediction mode list.

In FIG. 72, PLANAR IDX means a PLANAR mode number of intra prediction, DC IDX means a DC mode number of DC prediction, and VER_IDX is a mode number for directional intra prediction in a vertical direction, and HOR_IDX means a mode number for the directional intra prediction in a horizontal direction. Statistically, when PLANAR IDX, DC IDX, VER_IDX, and HOR_IDX occur frequently, in the example of FIG. 72, the encoder or decoder may allocate indexes 0 to 3 to PLANAR IDX, DC IDX, VER_IDX, and HOR_IDX. Next, the encoder or decoder may sequentially add modes of adding and subtracting offset values to directional modes VER_IDX and HOR_IDX, to the intra prediction mode list. In the example of FIG. 72, offset1 and offset2 correspond to the offset values, and as the index increases in the list, the offset value may increase.

That is, in FIG. 72, offset2>offset1. In this manner, the encoder or the decoder may initialize the intra prediction mode list by using the intra prediction mode statistically having a high occurrence frequency. The directional prediction mode having a small difference from the intra prediction mode having a high occurrence frequency may be set as an initial value, whereby the possibility of referring to the intra prediction mode list may be increased.

In addition, as an example, offset2 may be determined by adding or subtracting a predetermined value to an offset1 value. In the example of FIG. 72, VER_IDX and HOR_IDX are set as directional modes of adding or subtracting an offset. However, this is a value arbitrarily determined for convenience of description, and this value may vary depending on an encoding/decoding situation. In addition, as a method of determining a directional mode set as an initialization value, a method of using the first directional intra prediction mode number determined as the prediction mode may be utilized.

Table 1 below is a table showing representation bits that may indicate an intra prediction mode in intra prediction.

TABLE 1

|  | Embodiment1 (35 modes) | Embodiment2 (67 modes) |
| --- | --- | --- |
| MPM Flag | 1 bit | 1 bit |
| MPM modes | 2 bits (3 modes) | 2 bits (3 modes) |
| Non MPM modes | 5 bits (32 modes) | 6 bits (64 modes) |

According to Table 1, 1 bit may be allocated to the MPM Flag, and 2 bits may be allocated to represent three MPM modes. As the representation bits for the non-MPM mode, five bits may be used when allocating 32 modes, and six bits may be used when allocating 64 modes.

Table 2 below is a table showing an example of a representation bit of the intra prediction mode according to the present invention.

TABLE 2

|  |  | Embodiment1 (35 modes) | Embodiment2 (67 modes) |
| --- | --- | --- | --- |
| MPM Flag |  | 1 bit | 1 bit |
| MPM modes |  | 2 bits (3 modes) | 2 bits (3 modes) |
| Non MPM modes | Intra mode list flag | 1 bit | 3 bit |
|  | Intra mode list modes | 2 bits (4 modes) | 3 bits (8 modes) |
|  | Non Intra mode list modes | 5 bits (28 modes) | 6 bits (56 modes) |

In Embodiment 1 using 35 modes, the length of the intra prediction mode list may be set to four, and in Embodiment 2 using 67 modes, the length of the intra prediction mode may be set to eight.

For convenience of description below, an intra prediction mode list is defined as an Intra mode list, a flag indicating whether an intra prediction mode list is selected as an Intra mode list flag, and a mode of an intra prediction mode list as an Intra mode list modes.

In Embodiment 1, 1 bit may be allocated to the Intra mode list flag, and 2 bits may be allocated to represent four modes included in the intra prediction mode list. Five bits may be allocated as bits for representing the remaining intra prediction modes not included in the intra prediction mode list. In Example 1 of Table 1, 5 bits are fixedly allocated for the mode in which the MPM is not selected. However, when the intra prediction mode list is used, the intra prediction mode may be encoded using 3 bits including a flag, thereby improving the coding efficiency.

Similarly, in Embodiment 2, 1 bit may be allocated to the Intra mode list flag, and 3 bits may be allocated to represent 8 modes included in the intra prediction mode list. Six bits may be allocated as bits for representing the remaining intra prediction modes not included in the intra prediction mode list. In Example 2 of Table 1, 6 bits are fixedly allocated for the mode in which the MPM is not selected. However, when the intra prediction mode list is used, the intra prediction mode may be allocated using 4 bits including a flag, thereby improving the coding efficiency.

Table 3 shows an example of the representation bits of the intra prediction mode in which the number of MPM prediction modes is reduced and the size of the intra prediction mode list is increased when compared with Table 2. For example, the size of the MPM list and the size of the intra prediction mode list in the encoder and decoder to which the intra prediction mode list is added may be variously set.

TABLE 3

|  |  | Embodiment1 (35 modes) | Embodiment2 (67 modes) |
| --- | --- | --- | --- |
| MPM Flag |  | 1 bit | 1 bit |
| MPM modes |  | 1 bits (2 modes) | 1 bits (2 modes) |
| Non MPM modes | Intra mode list flag | 1 | 1 |
|  | Intra mode list modes | 3 bits (8 modes) | 4 bits (16 modes) |
|  | Non Intra mode list modes | 5 bits (25 modes) | 6 bits (49 modes) |

Table 4 below is a table showing the representation bits of the intra prediction mode that may be utilized when using a plurality of intra prediction mode lists.

TABLE 4

|  |  | Embodiment1 (35 modes) | Embodiment2 (67 modes) |
| --- | --- | --- | --- |
| MPM Flag |  | 1 bit | 1 bit |
| MPM modes |  | 2 bits (3 modes) | 2 bits (3 modes) |
| Non MPM modes | Intra mode list flag | 1 bit | 1 bit |
|  | Multi Intra mode list modes | 2 bits (4 modes) | 3 bits (8 modes) |
|  | Non Intra mode list modes | 5 bits (32 modes) | 6 bits (64 modes) |

In the first embodiment, the intra prediction mode list may have a total of four lists for each direction, the each length being four, and the plurality of intra prediction mode lists may encode a total of 16 modes. In this case, the encoder or decoder may select one list from the plurality of intra prediction mode lists on the basis of the direction of the MPM or neighboring block, and set the intra mode list flag to 1.

Similarly, in Embodiment 2, the intra prediction mode list may have a total of four lists for each direction, the each length being eight, and the intra prediction mode list may indicate a total of 32 modes. Similarly, the encoder or the decoder may select one list from among a plurality of intra prediction lists on the basis of the direction of the MPM or the neighboring block and set the intra mode list flag to 1.

Table 5 shows an intra prediction mode encoding technique including a selected mode and a non-selected mode.

TABLE 5

| Intra prediction modes | MPM flag | Selected flag | Bin string |
|---|---|---|---|
| MPM modes (6) | 1 | | 0 |
| | | | 10 |
| | | | 110 |
| | | | 1110 |
| | | | 11110 |
| | | | 11111 |
| Selected modes (16) | 0 | 1 | 4 bits fixed length code |
| Non-selected modes (45) | 0 | 0 | Truncated binary code |

Table 5 shows an intra prediction mode encoding technique including a selected mode and a non-selected mode. In the encoding method as shown in Table 5, selected-modes may be implemented by using an intra prediction mode list to increase the selectivity. In addition, the representation bit may be reduced by applying the method using the intra prediction mode list to the non-selected modes or by applying only the non-selected modes to the intra prediction mode not included in the intra prediction mode list.

FIG. 73 is a diagram illustrating syntax of an intra prediction mode list according to an embodiment of the present invention.

FIG. 73 shows an example of a syntax configuration including intra prediction mode list information. The decoder according to the present invention may signal Intra mode list flag, whether the intra prediction mode list is selected for modes not included in the MPM. When Intra mode list flag is 1, the decoder may restore the intra prediction mode by signaling Intra mode list index, which is an index in the intra prediction mode list.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding an image, the method comprising:
deriving a merge candidate list for a current block by using information of a first neighboring block of the current block; and
generating a final prediction block for the current block by using the merge candidate list, wherein
the final prediction block for the current block is generated based on a first prediction block and a second prediction block,
the first prediction block is generated based on a first candidate of the merge candidate list,
the second prediction block is generated based on a second candidate of the merge candidate list,
the first prediction block is used to determine a first partial region of the final prediction block for the current block,
the second prediction block is used to determine a second partial region of the final prediction block for the current block,
the final prediction block for the current block is generated using a weighted sum using the first prediction block and the second prediction block,
different weights are applied to a plurality of regions in the first prediction block to generate the final prediction block, respectively, and
different weights are applied to a plurality of regions in the second prediction block to generate the final prediction block, respectively.

2. The method of claim 1, further comprising:
deriving a first candidate list for the current block by using motion information of a second neighboring block of the current block; and,
deriving a second candidate list for the current block by using previously reconstructed motion information,
wherein the merge candidate list for the current block is derived using the first candidate list and the second candidate list,
wherein the deriving of the second candidate list comprises:
adding the previously reconstructed motion information to the second candidate list,
wherein the previously reconstructed motion information is motion information of a coding block decoded immediately before decoding of the current block.

3. The method of claim 2, further comprising:
initializing the second candidate list,
wherein the second candidate list is initialized for each coding tree unit (CTU) row in a slice comprising a plurality of CTU rows.

4. The method of claim 2, further comprising:
when the number of motion information included in the second candidate list is a predetermined value, deleting motion information included in the second candidate list first among the motion information included in the second candidate list.

5. The method of claim 2, further comprising:
when same motion information as the previously reconstructed motion information is already included in the second candidate list, deleting the same motion information from the second candidate list.

6. The method of claim 5, wherein the previously reconstructed motion information is added in a next order of motion information included in the second candidate list last.

7. The method of claim 1, further comprising:
deriving average motion information by calculating an average of a plurality of motion information included in the merge candidate list; and
adding the average motion information to the merge candidate list.

8. The method of claim 1, wherein the merge candidate list is used to generate an intra block copy (IBC) prediction block for the current block.

9. A method of encoding an image, the method comprising:
deriving a merge candidate list for a current block by using information of a first neighboring block of the current block; and
generating a final prediction block for the current block by using the merge candidate list, wherein
the final prediction block for the current block is generated based on a first prediction block and a second prediction block,
the first prediction block is generated based on a first candidate of the merge candidate list,
the second prediction block is generated based on a second candidate of the merge candidate list,
the first prediction block is used to determine a first partial region of the final prediction block for the current block,
the second prediction block is used to determine a second partial region of the final prediction block for the current block,
the final prediction block for the current block is generated using a weighted sum using the first prediction block and the second prediction block,
different weights are applied to a plurality of regions in the first prediction block to generate the final prediction block, respectively, and
different weights are applied to a plurality of regions in the second prediction block to generate the final prediction block, respectively.

10. The method of claim 9, further comprising:
deriving a first candidate list for a current block by using motion information of a neighboring block of the current block; and
deriving a second candidate list for the current block by using previously reconstructed motion information,
wherein the merge candidate list for the current block is derived using the first candidate list and the second candidate list, wherein the deriving of the second candidate list includes:
adding the previously encoded motion information to the second candidate list,
wherein the previously encoded motion information is motion information of a coding block encoded immediately before encoding of the current block.

11. The method of claim 10, further comprising:
when the number of motion information included in the second candidate list is a predetermined value, deleting motion information included in the second candidate list first among the motion information included in the second candidate list.

12. The method of claim 10, further comprising:
when same motion information as the previously encoded motion information is already included in the second candidate list, deleting the same motion information from the second candidate list.

13. A non-transitory computer readable recording medium storing a bitstream, the bitstream comprising:
information about a current block,
wherein the information about the current block is used to derive a merge candidate list for the current block,
the merge candidate list for the current block is derived using information of a first neighboring block of the current block,
the merge candidate list is used to generate a final prediction block for the current block,
the final prediction block for the current block is generated based on a first prediction block and a second prediction block,
the first prediction block is generated based on a first candidate of the merge candidate list,
the second prediction block is generated based on a second candidate of the merge candidate list,
the first prediction block is used to determine a first partial region of the final prediction block for the current block,
the second prediction block is used to determine a second partial region of the final prediction block for the current block, and
the final prediction block for the current block is generated using a weighted sum using the first prediction block and the second prediction block,
different weights are applied to a plurality of regions in the first prediction block to generate the final prediction block, respectively, and
different weights are applied to a plurality of regions in the second prediction block to generate the final prediction block, respectively.

14. The non-transitory computer readable recording medium of claim 13, wherein a first candidate list for the current block is derived using motion information of a second neighboring block of the current block,
a second candidate list for the current block is derived using previously reconstructed motion information,
the merge candidate list for the current block is derived using the first candidate list and the second candidate list, and
the second candidate list is initialized on the basis of a boundary of a coding tree unit (CTU) row.

15. The method of claim 1, further comprising:
decoding partition direction information indicating a partition direction which defines the first partial region and the second partial region to have non-rectangular shapes in the current block for which the merge candidate list is configured, respectively,
wherein at least one of the first partial region and the second partial region has a triangle shape defined by the partition direction.

16. The method of claim 9, wherein the
encoding partition direction information indicating a partition direction which defines the first partial region and the second partial region to have non-rectangular shapes in the current block for which the merge candidate list is configured, respectively,
wherein at least one of the first partial region and the second partial region has a triangle shape defined by the partition direction.

17. The method of claim 1, wherein the weighted sum is derived using a first weight applied to the first prediction block and a second weight applied to the second prediction block.

18. The method of claim 2, wherein the second candidate list is shared with blocks in a region comprising the current block,
the number of rows of the blocks in the region is greater than or equal to 2, and
the number of columns of the blocks in the region is greater than or equal to 2.

19. The method of claim 2, wherein the second candidate list is updated only after prediction for all blocks in a region comprising the current block is complete.

20. The method of claim 1, wherein the merge candidate list is shared with blocks in a region comprising the current block,
the number of rows of the blocks in the region is greater than or equal to 2, and
the number of columns of the blocks in the region is greater than or equal to 2.

* * * * *